(12) United States Patent
Elkotby et al.

(10) Patent No.: US 12,224,595 B2
(45) Date of Patent: Feb. 11, 2025

(54) METHOD OF NETWORK-ASSISTED BEAMFORMED ENERGY HARVESTING SIGNALING AND CORRESPONDING APPARATUS

(71) Applicant: Interdigital Patent Holdings, Inc., Wilmington, DE (US)

(72) Inventors: Hussain Elkotby, Conshohocken, PA (US); Ravikumar Pragada, Warrington, PA (US); Mahmoud Abdelgelil, San Diego, CA (US); Tanbir Haque, Jackson Heights, NY (US); Patrick Cabrol, Bayshore, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 234 days.

(21) Appl. No.: 17/795,933

(22) PCT Filed: Jan. 22, 2021

(86) PCT No.: PCT/US2021/014670
§ 371 (c)(1),
(2) Date: Jul. 28, 2022

(87) PCT Pub. No.: WO2021/154610
PCT Pub. Date: Aug. 5, 2021

(65) Prior Publication Data
US 2023/0057994 A1 Feb. 23, 2023

Related U.S. Application Data

(60) Provisional application No. 63/051,451, filed on Jul. 14, 2020, provisional application No. 62/967,782, filed on Jan. 30, 2020.

(51) Int. Cl.
*H02J 50/00* (2016.01)
*H02J 50/20* (2016.01)
(Continued)

(52) U.S. Cl.
CPC ............ *H02J 50/001* (2020.01); *H02J 50/20* (2016.02); *H04B 7/0695* (2013.01); *H04W 72/0453* (2013.01); *H04W 72/046* (2013.01)

(58) Field of Classification Search
CPC ............ H04B 5/79; H02J 50/001; H02J 50/80
See application file for complete search history.

(56) References Cited

U.S. PATENT DOCUMENTS 10,779,279 B2 * 9/2020 Takahashi ............ H04B 17/336
2017/0353869 A1 12/2017 Sen et al.
(Continued)

FOREIGN PATENT DOCUMENTS

| JP | 2019083621 A | 5/2019 |
| KR | 20170064808 A | 6/2017 |
| KR | 101887526 B1 | 8/2018 |

OTHER PUBLICATIONS

Bateni et al., "A Chaotic Direct-Sequence Spread-Spectrum Communication System", Institute of Electrical and Electronics Engineers (IEEE), IEEE Transactions on Communications, vol. 42, Issue 234, Feb./Mar./Apr. 1994, 4 pages.
(Continued)

*Primary Examiner* — Kevin Kim
(74) *Attorney, Agent, or Firm* — VOLPE KOENIG

(57) ABSTRACT

A wireless transmit/receive unit, WTRU, may include an Energy Harvesting device, EH, a Zero Energy transceiver, ZE, and a main transceiver. The WTRU may initialize operation using the main transceiver, and receive beam detection configuration and mapping information. The WTRU may initialize beam (re-) selection procedure using
(Continued)

(a)

(b)

the ZE transceiver, and use the received beam detection configuration to determine detectable beam IDs. and use the received mapping information to retrieve EH signaling configuration. The WTRU determines expected EH performance for each detected beam, and selects the beam with best expected EH performance. On condition that the WTRU determines necessity of dynamic EH signaling for the selected beam, it proceeds with presence declaration procedure to request optimized dynamic EH signaling. The WTRU utilizes control signaling channel parameters to dynamically receive optimized EH signal configuration, and configures its EH circuitry, and harvests energy.

14 Claims, 37 Drawing Sheets

(51) Int. Cl.
*H04B 7/06* (2006.01)
*H04W 72/044* (2023.01)
*H04W 72/0453* (2023.01)

(56) References Cited

U.S. PATENT DOCUMENTS

| | | | |
|---|---|---|---|
| 2019/0044392 A1 | 2/2019 | Chowdhury et al. | |
| 2019/0326970 A1 | 10/2019 | Ma et al. | |
| 2020/0271708 A1 | 8/2020 | Kobayashi | |
| 2020/0314752 A1 | 10/2020 | Haque et al. | |
| 2022/0225402 A1 | 7/2022 | Elkotby et al. | |
| 2022/0247230 A1* | 8/2022 | Kim | H02J 50/60 |
| 2023/0140156 A1* | 5/2023 | Swaans | H04B 17/17 |
| | | | 324/764.01 |

OTHER PUBLICATIONS

Clercx et al., "Waveform Design for Wireless Power Transfer", Institute of Electrical and Electronics Engineers (IEEE), IEEE Transactions on Signal Processing, vol. 64, Issue 23, Dec. 1, 2016, 16 pages.

English Translation for KR 101887526 B1, entitled: System Parameter Setting Device, Wireless Powered Communication Network System and Operating Method Thereof, 33 pages.

Michaels, Alan J., "Digital Chaotic Communications", Georgia Institute of Technology, PhD Thesis, Aug. 2009, 220 pages.

Boaventura et al., "Spatial Power Combining of Multi-Sine Signals for Wireless Power Transfer Applications", Institute of Electrical and Electronics Engineers (IEEE), IEEE Transactions on Microwave Theory and Techniques, vol. 62, Issue 4, Apr. 2014, 9 pages.

Mangal et al., "An Ultra-Low-Power Wake-Up Receiver with Voltage-Multiplying Self-Mixer and Interferer-Enhanced Sensitivity", Institute of Electrical and Electronics Engineers (IEEE), 2017 IEEE Custom Integrated Circuits Conference (CICC), Austin, Texas, USA, Apr. 30, 2017, 4 pages.

Collado et al., "Optimal Waveforms for Efficient Wireless Power Transmission", Institute of Electrical and Electronics Engineers (IEEE), IEEE Microwave and Wireless Components Letters, vol. 24, Issue 5, May 2014, 3 pages.

Alsaba et al., "Beamforming in Wireless Energy Harvesting Communications Systems: A Survey", Institute of Electrical and Electronics Engineers (IEEE), IEEE Communications Surveys & Tutorials, vol. 20, Issue 2, Jan. 25, 2018, 32 pages.

Pan et al., "Multi-sine Wireless Power Transfer with a Realistic Channel and Rectifier Model", Institute of Electrical and Electronics Engineers (IEEE), 2017 IEEE Wireless Power Transfer Conference (WPTC), Taipei, Taiwan, May 10, 2017, 4 pages.

Chen et al., "Enhancing Wireless Information and Power Transfer by Exploiting Multi-Antenna Techniques", Institute of Electrical and Electronics Engineers (IEEE), IEEE Communications Magazine, vol. 53, Issue 4, Apr. 2015, 18 pages.

Zhou et al., "Wireless Information and Power Transfer: Architecture Design and Rate-Energy Tradeoff", Institute of Electrical and Electronics Engineers (IEEE), IEEE Transactions on Communications, vol. 61, Issue 11, Nov. 2013, 6 pages.

Trotter et al., "Power-Optimized Waveforms for Improving the Range and Reliability of RFID Systems", Institute of Electrical and Electronics Engineers (IEEE), 2009 IEEE International Conference on RFID, IEEE RFID Virtual Journal, Orlando, Florida, USA, Apr. 27, 2009, 8 pages.

\* cited by examiner

METHOD OF NETWORK-ASSISTED BEAMFORMED ENERGY HARVESTING SIGNALING AND CORRESPONDING APPARATUS

CROSS-REFERENCE TO RELATED APPLICATIONS

This application is a U.S. National Stage Application under 35 U.S.C. 371 of International Patent Application No. PCT/US2021/014670, filed Jan. 22, 2021, which is incorporated herein by reference in its entirety.

This application claims the benefit of U.S. Provisional Patent Application No. 62/967,782 filed 30 Jan. 2020, and claims the benefit of U.S. Provisional Patent Application No. 63/051,451 filed 14 Jul. 2020, each of which is incorporated herein by reference in their entirety.

BACKGROUND

In recent years, many compelling use cases for long-battery-life devices have emerged. These include various IoT devices, small form factor handsets, wearable devices and implantable devices to name a few. Passive and semi-passive receivers are thought to be key enablers of these emerging use cases. These new classes of passive and semi-passive devices require over-the-air delivery of both energy and information. Going forward, networks will have to deal with a heterogeneous mix of active, semi-passive and passive devices. The network will have to concurrently transmit signals bearing information and signals optimized to deliver power. In many deployment scenarios these different types of signals may have to be supported in the same frequency band.

SUMMARY

This disclosure describes, among others, methods and devices for improving the energy harvesting efficiency (EH) without degrading the information transfer performance utilizing beamformed energy harvesting signal transmissions and introducing per-beam frequency resources randomization. For example, an EH device may receive per-beam semi-static frequency resources (EH band) hopping scheme that may be chosen by the serving eNB to improve the energy harvesting efficiency using historical information transfer statistics. For example, the EH device dynamically may receive per-beam dedicated configuration to further optimize the energy harvesting efficiency based on real-time information signal transmissions. The dedicated configuration may be as simple as frequency resources (EH sub-band) hopping scheme or a combination of EH sub-band randomization and auxiliary signal augmentation.

BRIEF DESCRIPTION OF THE DRAWINGS

Furthermore, like reference numerals in the figures indicate like elements, and wherein.

EXAMPLE NETWORKS FOR IMPLEMENTATION OF THE EMBODIMENTS

Figure 1A:
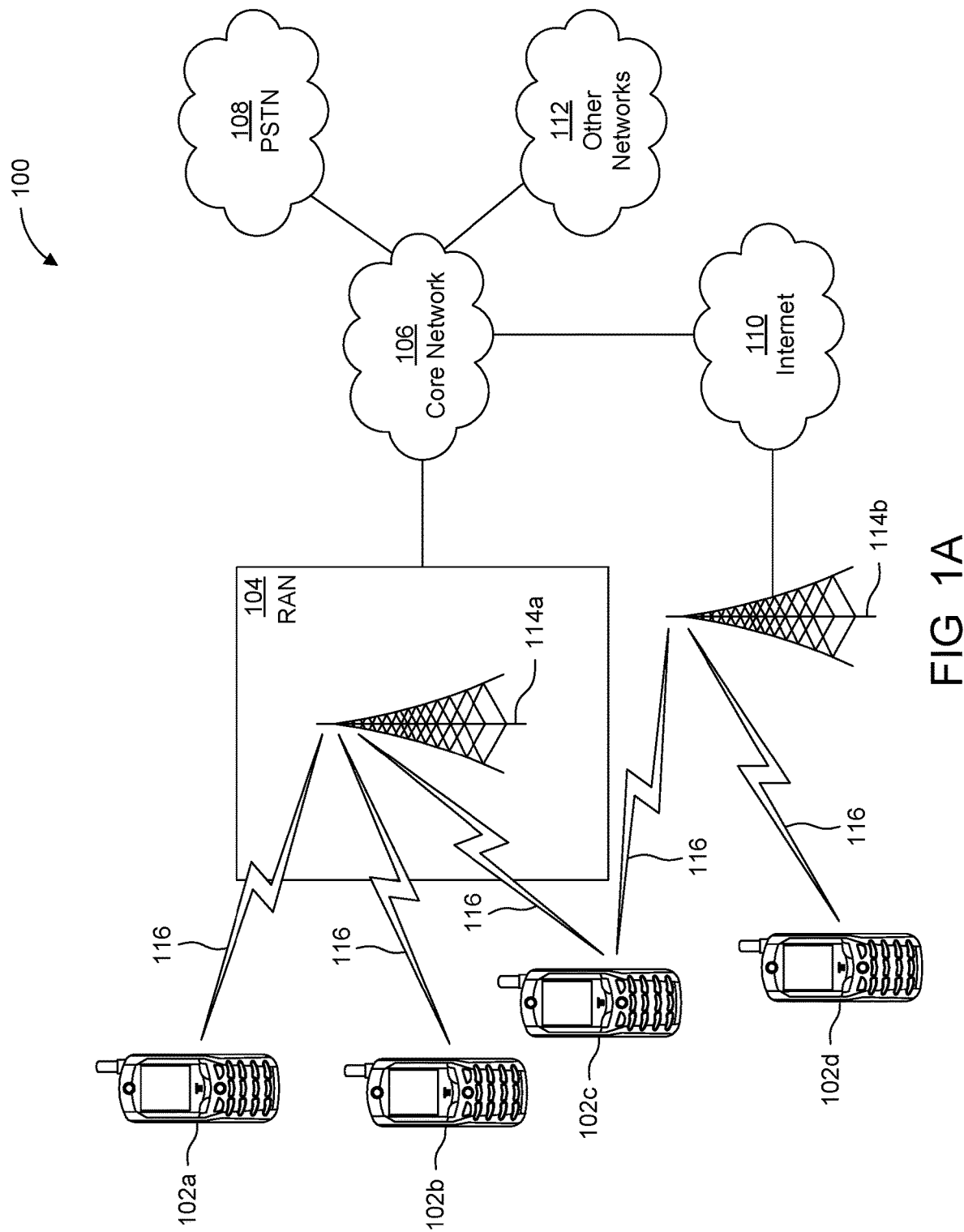
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
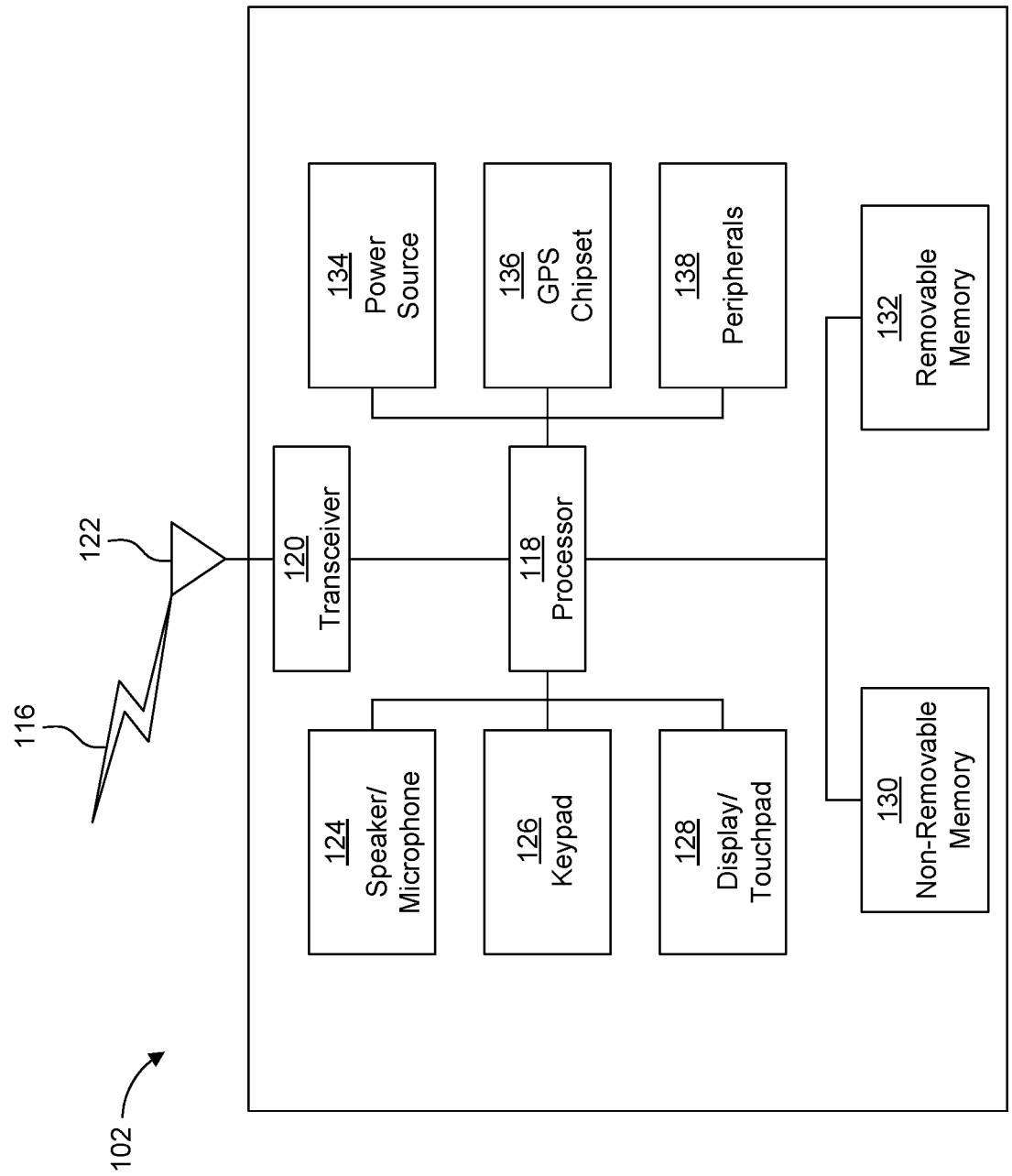
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
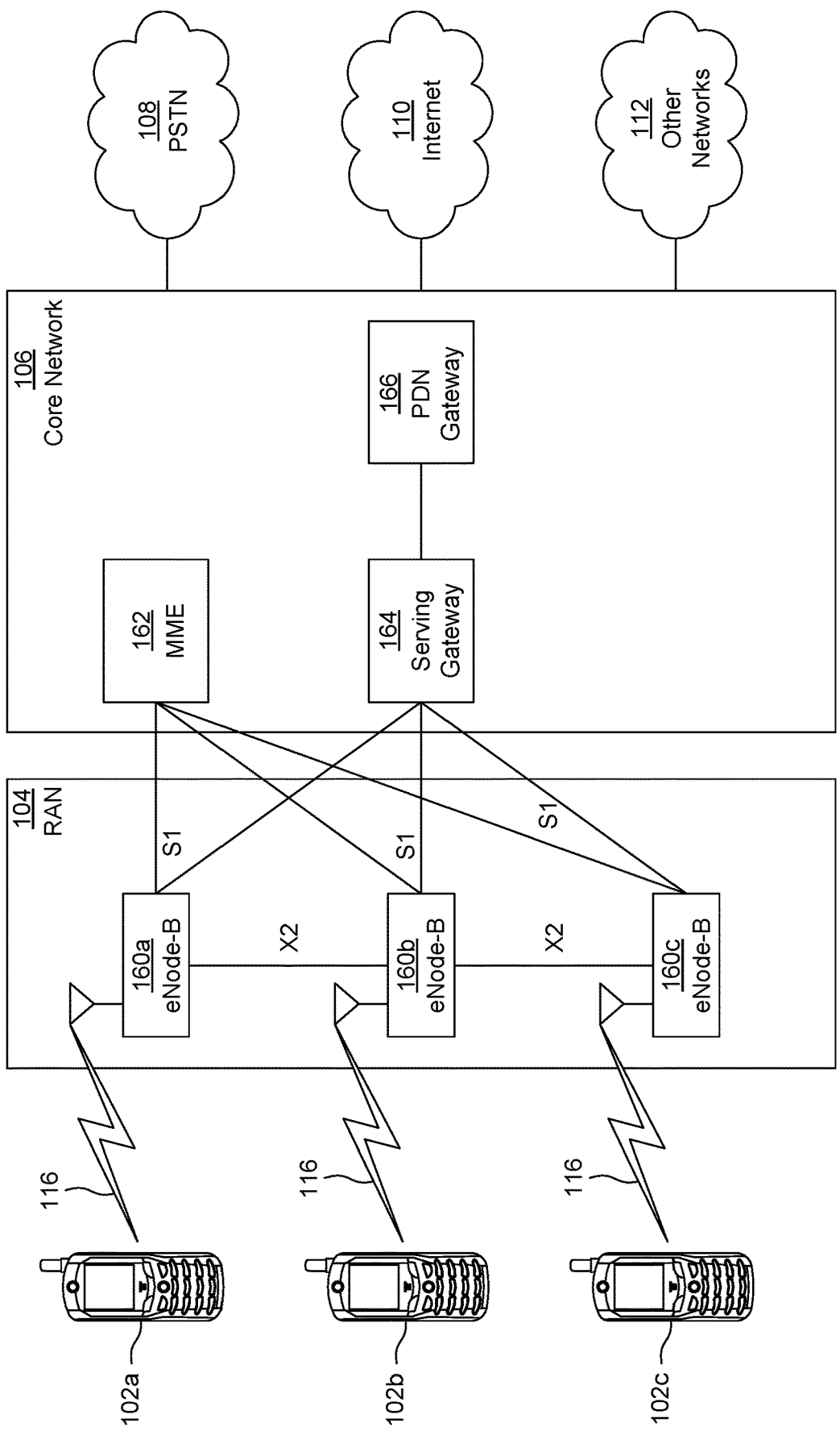
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11 ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11 ah is 6 MHz to 26 MHz depending on the country code.

Figure 1D:
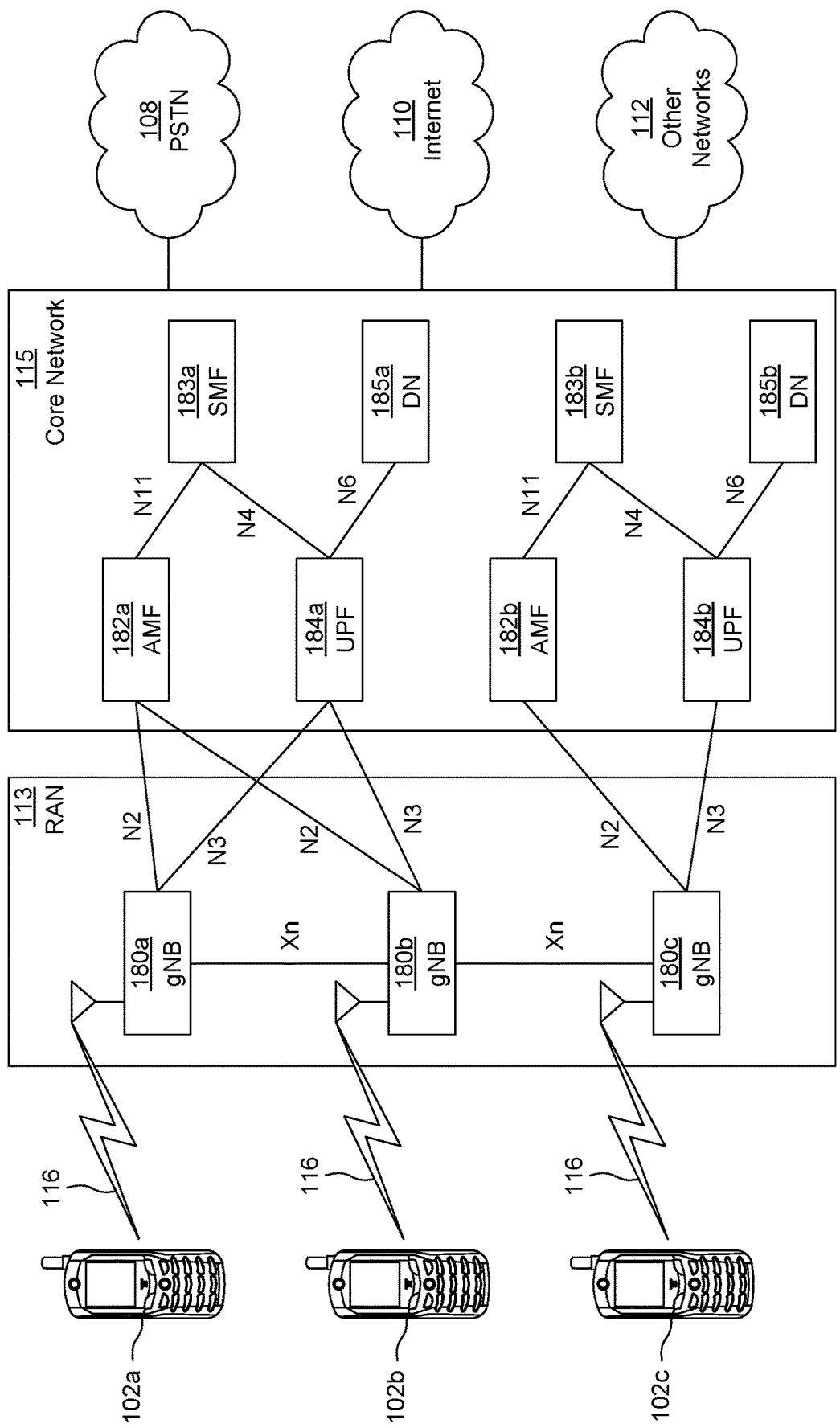
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION

In state-of-the-art wireless technology such as cellular and WLAN, RF front-ends are usually a mix of passive and active components. For example, passive components include Rx antennas, Tx/Rx path switches and filters. These components require little if any power in order to function. On the other hand, active components require power in order to function. For example, the oscillator to tune to the carrier frequency, the low noise amplifier and the A/D converters in the Rx path are active components.

Advances in RF component design over the past years have made it possible to use novel type of RF circuitry that may process received RF waveforms which are collected through the antenna front-end by the receiving device in absence of an active power supply. For example, such a device may harvest energy from the received RF waveform to run the necessary circuitry to process signals. These passive receivers use RF components such as Schottky diodes or MEMS RF transformers to implement the functionality required for voltage amplification, multiplication and signal rectification. It is worth considering that passive receivers may operate in the antenna far-field and may support large link budgets. This allows reception of radio signals by passive receivers over significant distances. In the following, the terms passive receiver and zero-energy receiver may be used interchangeably. Additionally, the terms energy harvester, energy harvesting passive receiver and energy receiver may be used interchangeably.

Figure 3:
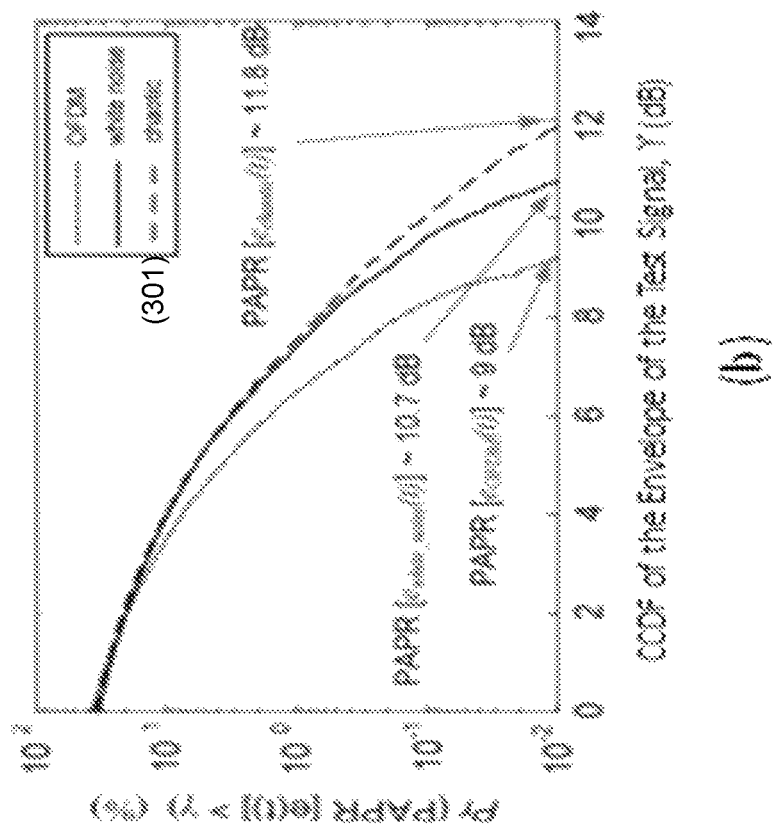
FIG. 3 illustrates conversion efficiency of a diode rectifier based energy harvesting passive receiver as a function of the received power and type of received waveform.
Figure 3:
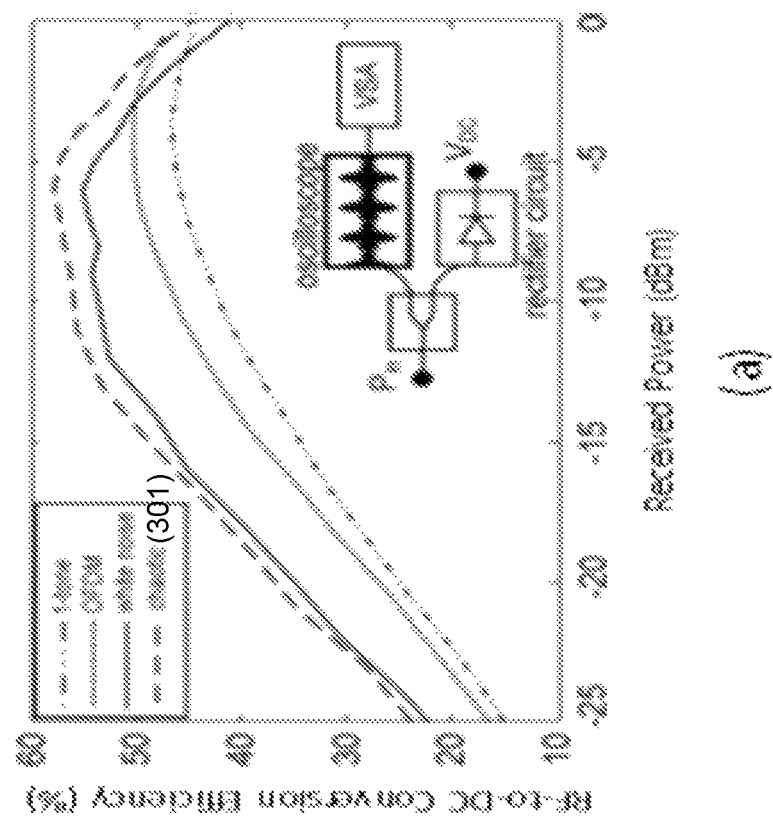

Operational range and energy harvesting efficiency are important characteristics of a passive receiver. The power received by a diode rectifier-based energy harvesting passive receiver as a function of distance from the transmitter and the type of transmitted waveform is illustrated in FIG. 3. It is seen that for a desired received power level, the operational distance may be optimized by properly selecting the parameter (number of tones) of e.g. a power optimized waveform (POW). The operational range of the energy receiver is increased by increasing the number of tones used in the transmitted POW or equivalently increasing the PAPR of the POW.

Figure 2:
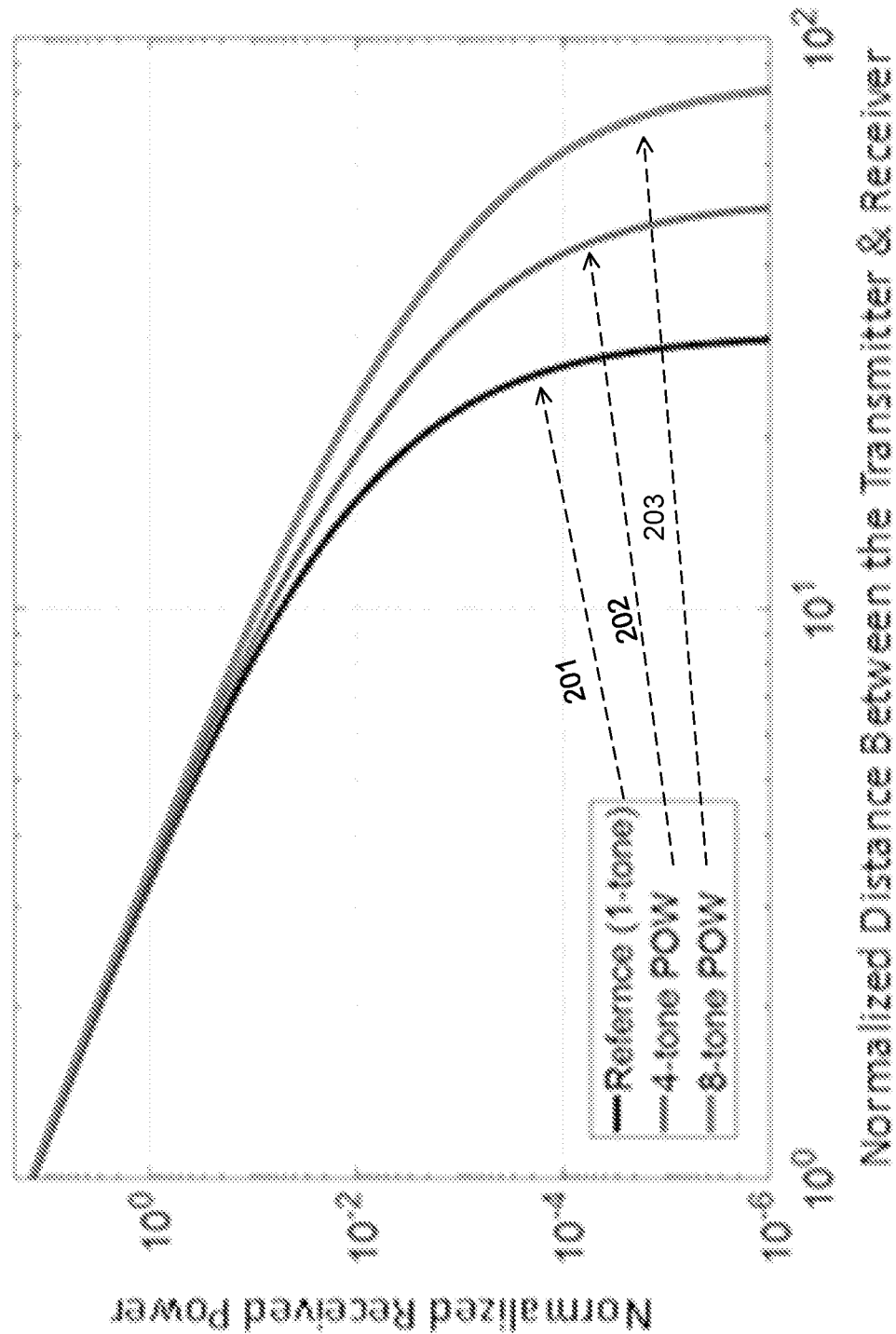
FIG. 2 illustrates power received by a diode rectifier-based energy harvesting passive rectifier as a function of the received signal power and the type of received signal.

The efficiency of a diode rectifier-based energy harvesting passive receiver as a function of the received signal power and the type of received signal is illustrated in FIG. 2; reference curve (1-tone) 201, 4-tone POW 202, and 8-tone POW 203. It is seen in FIG. 3 (a) that the highest level of RF-to-DC conversion efficiency is achieved with a chaotic signal 301. The PAPR of the various test signals is shown in FIG. 3 (b). It is seen that the chaotic signal 301 delivers the highest PAPR.

Figure 4:
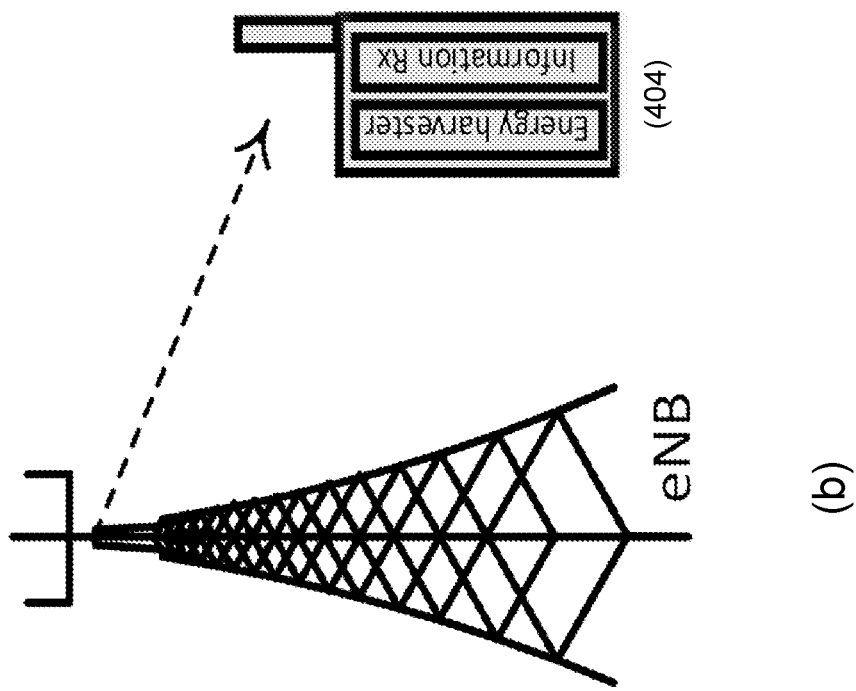
FIG. 4 illustrates concurrent delivery of energy and information to multiple energy and information receivers (a) and collocated in a same device (b)
Figure 4:
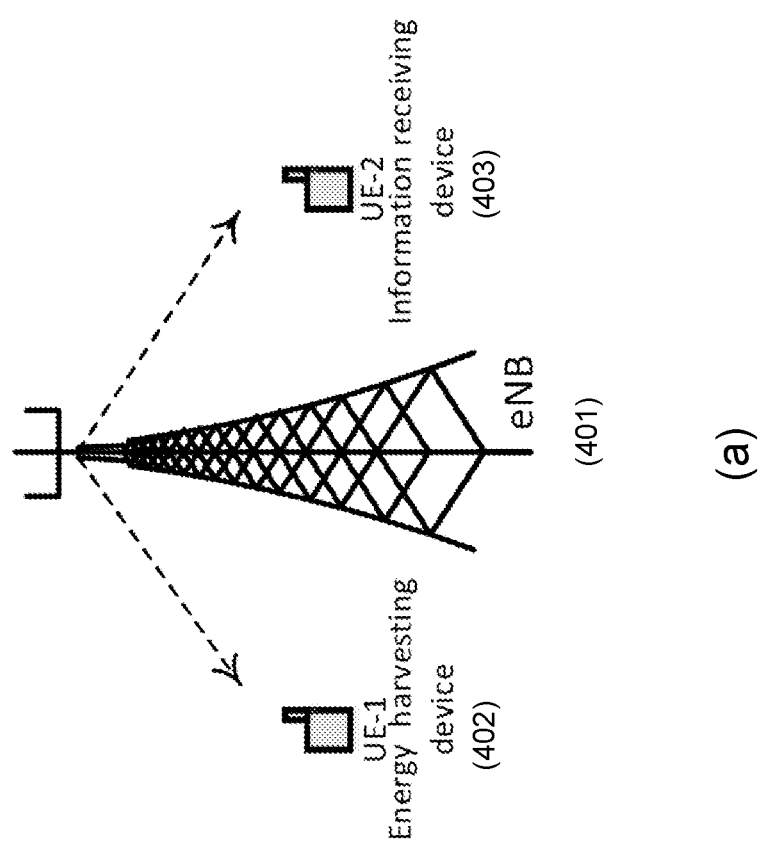

Consider the system shown in FIG. 4 (a), and FIG. 4 (b). In FIG. 4 (a) the eNB 401 is servicing two mobile users, one of which (402) is in energy harvesting mode, while the other mobile (403) is in information receiving mode. The objective of the eNB is to transmit an appropriate signal that may concurrently provide energy harvesting for WTRU-1 (Wireless Transmit/Receive Unit), while enabling information reception for WTRU-2 in the same band. Alternately, for a prespecified fixed information requirement for WTRU-2, the objective of the eNB is to maximize energy harvesting for WTRU-1.

In FIG. 4 (b), the energy harvester, and the information receiver are collocated in the same device 404. The goal here is to maximize energy harvesting for a fixed information delivery rate requirement or to maximize the rate of information delivery for a fixed energy transfer rate requirement.

Figure 5:
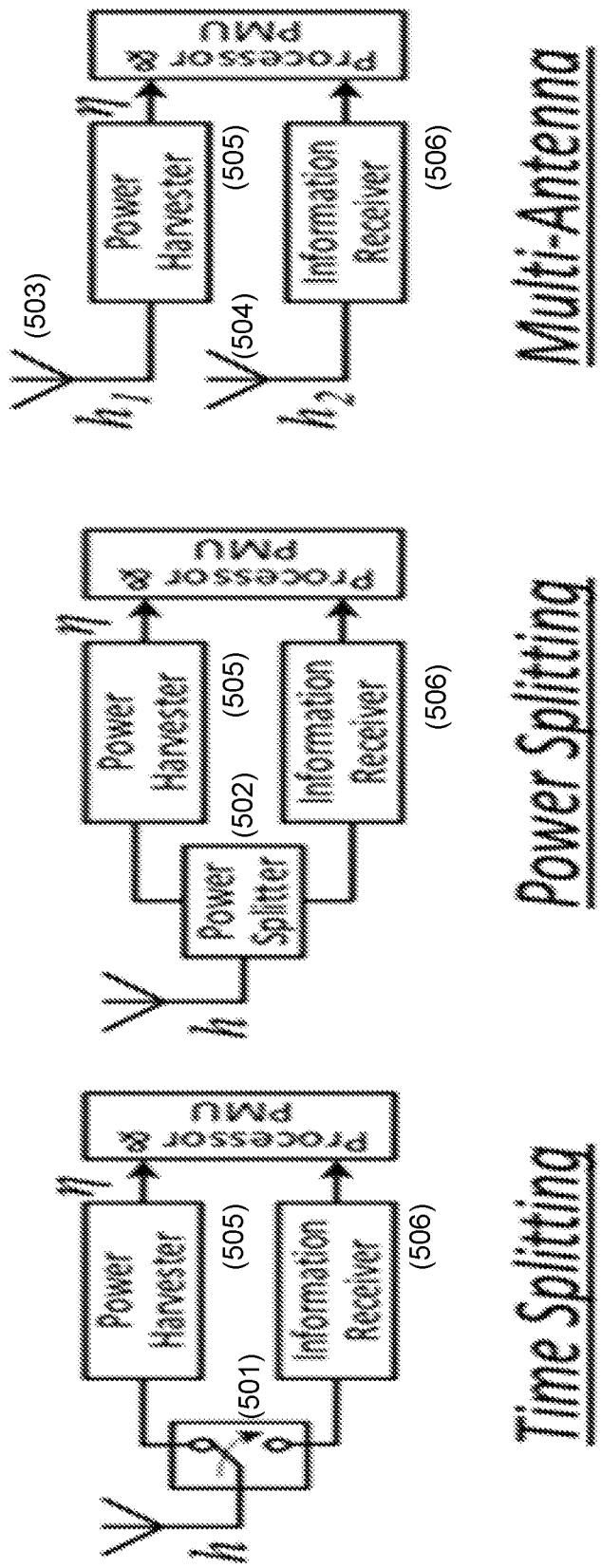
FIG. 5 shows possible antenna interfaces for energy harvester and information receivers collocated in a same device.

Note that the information requirement for the collocated scenario may be obtained by an appropriate power split 502, time split 501 between the information and energy harvesting receiver, or individual antennas 503, 504 for the information receiver 505, and energy receiver 506 as illustrated in FIG. 5.

In legacy communication systems, one of the key parameters that a transmitter minimizes is the peak average to power ratio (PAPR). The main reason for doing so is to maximize power amplifier efficiency and to minimize unwanted signal distortions. Hence a legacy information receiver is expected to receive signals that have relatively low PAPR. On the other hand, the energy harvesting efficiency of a device depends on the PAPR of the received signal. Higher received PAPR results in higher energy harvesting efficiency. In legacy communication systems there is an inherent energy and information transfer tradeoff associated with an eNB that is concurrently serving a heterogeneous mix of two or more energy and information receiving devices. These devices may be in spatial proximity of one another, collocated in a single device or situated anywhere in the cell.

Beamformed Default EH and Common Signaling Channel

Figure 6:
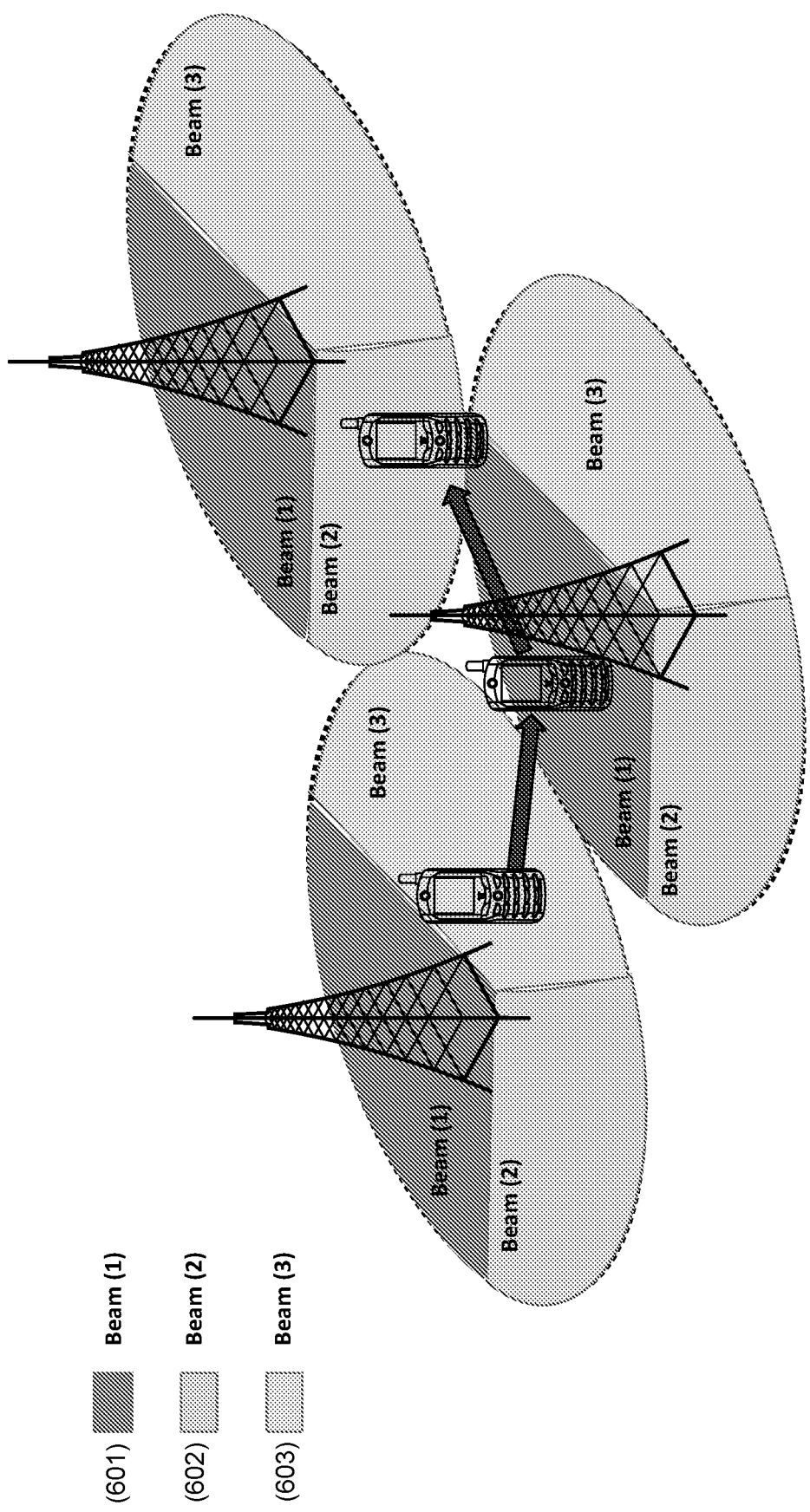
FIG. 6 shows example network supporting three beam transmissions per cell.

In this section are considered the different configurations that may be supported by a network to provide efficient beamformed energy transfer. In order for the network to provide/support EH in a more efficient way, a set of information may be exchanged with the served WTRUs. The set of information may be WTRU-specific and/or beam-specific EH signal configuration, a subset may provide common EH signal configuration and another subset may be used to provide WTRU/Group-dedicated EH signal configuration; below are provided more details on how this may be done via mapping information. A BS/eNB/gNB may support up to N beams, a special case is shown in FIG. 6 for the specific example when N=3. Each beam (1), (2), and (3) with references 601, 602 and 603 respectively may carry a default EH signaling with a semi-static configuration(s) that may have a direct mapping with the beam identifier where the beam identifier might be unique within a single cell or across multiple cells. In addition, each beam is associated with a specific common signaling channel that may be utilized to convey information about the beam identifier and/or an optimized EH signaling configuration. Mapping information between the beam identifiers and default EH signaling as well as common signaling channel configuration may be provided by the network to the served WTRU when connected over the Uu air interface and after authentication to limit unauthorized access to network's resources. Beam identifiers detected over the ZE air-interface may be used then to retrieve information about default EH and common signaling channels configurations associated with the identified beams.

In this section are considered three different cases of beam transmission configurations based on the considered BS/eNB/gNB supported capabilities: time switching beams transmission, simultaneous beams transmission, and mixed time switching and simultaneous beams transmission.

In the time switching transmission, the BS/eNB/gNB may support the transmission of the default EH signal and/or the common signal on only one beam at a time.

In the simultaneous beams transmissions, the BS/eNB/gNB may support the transmission EH-related signaling on all available beams at the same time.

In the mixed beams transmission, each beam is divided into sub-beams, where a transmission may be done over sub-beams from different beams simultaneously while transmissions over different sub-beams is carried out using the time-switching option.

Figure 7:
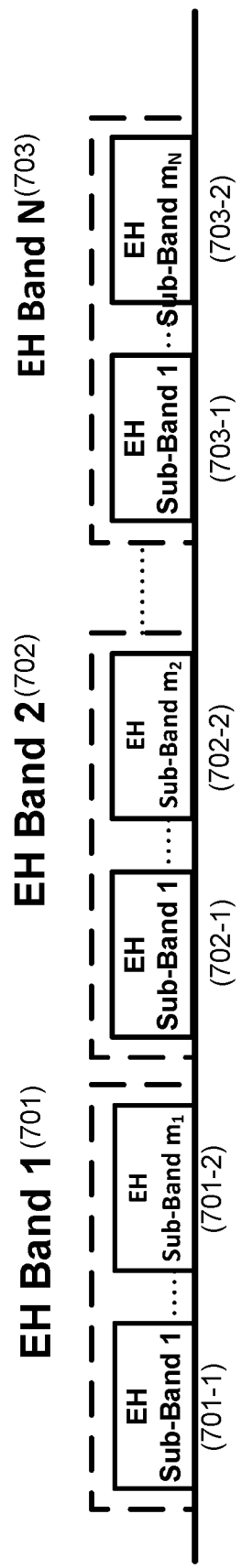
FIG. 7 is an illustrative figure of EH sub-band grouping into multiple EH frequency bands.

For all transmission configurations, an N frequency bands may be available for EH and common signaling transmission(s). Each EH band i may be divided into $m_i$ sub-bands as exemplified in FIG. 7 where the number of sub-bands within each EH band 1 (701), 2 (702) to n (703) may be set to the same value, i.e. $m_i = m \forall i$. The bandwidth of an EH sub-band (701-1, 701-2, 702-1, 702-2, 703-1, 704-1) may approximately correspond (or be close) to the front-end bandwidth of a single channel in an EH device. In what follows is described the various options frequency as well as time resources that may be allocated/scheduled for each of the common and default EH signaling channels according to the supported beam transmission scheme.

Time Switching Beams Transmission

This section is focused on the scenario where a BS/eNB/gNB may support the transmission of a single beam of beamwidth $\varphi$ at any specific point in time. Therefore, the BS will need to switch between at least $N=2\pi/\varphi$ beams over N time slots to provide full 360° cell coverage. Allowing each beam to carry a default or optimized EH signal may significantly enhance the power transfer efficiency compared to the omni-directional power transfer option. As mentioned earlier, a WTRU may use beam detection configuration that is provided by the network over the Uu air interface to identify a current serving beam. The beam identifier may be transmitted over a common signaling channel or encoded on top of a power optimized waveform over a default EH signaling channel. Here are described the options for frequency and/or time multiplexing of the two channels.

Frequency Allocation Options of Common and Default EH Signaling Channels

To simplify, focus is set on the frequency allocation of common and default EH signaling channels across EH sub-bands and, for now, the discussion of the criteria for EH sub-band grouping into EH bands is disregarded. Consider $n = \Sigma_j m_j$ sub-bands to be available for the transmission of common and default EH signaling channels, each is centered at a carrier frequency f_i where $i \in \{0, \ldots, n-1\}$.

The common (or default EH) signaling channel for each beam supported by a BS/eNB/gNB may be allocated to frequency resources according to one of the following options:
  a. A single EH sub-band shared by the common (or default EH) signaling channels of all the beams and may or may not be dedicated only for common (or default EH) signaling channels.
  b. An EH sub-band is dedicated for each beam's common (or default EH) signaling channel and may or may not be shared with default EH (or common) signaling channels.
  c. One or more EH sub-band(s) are allocated to a single beam's common signaling channel and are shared amongst a subset of the remaining beams' common signaling channels. The EH sub-band(s) may also be shared with default EH signaling channels.

Subsequently, the default EH signaling channel of a specific beam may be or may not be multiplexed in frequency, within the same EH sub-band, with the common signaling channel of the same beam or a subset (or the whole set) of the beams supported by the BS/eNB/gNB.

To list a few, without limitation, of the possible frequency allocation and multiplexing scenarios for the common and default EH signaling channel, consider an n EH sub-bands and N different beams, that are switched in time, where n≥N. Based on the previous list of options, one of the following five different scenarios, among others, may be considered.

Figure 8:
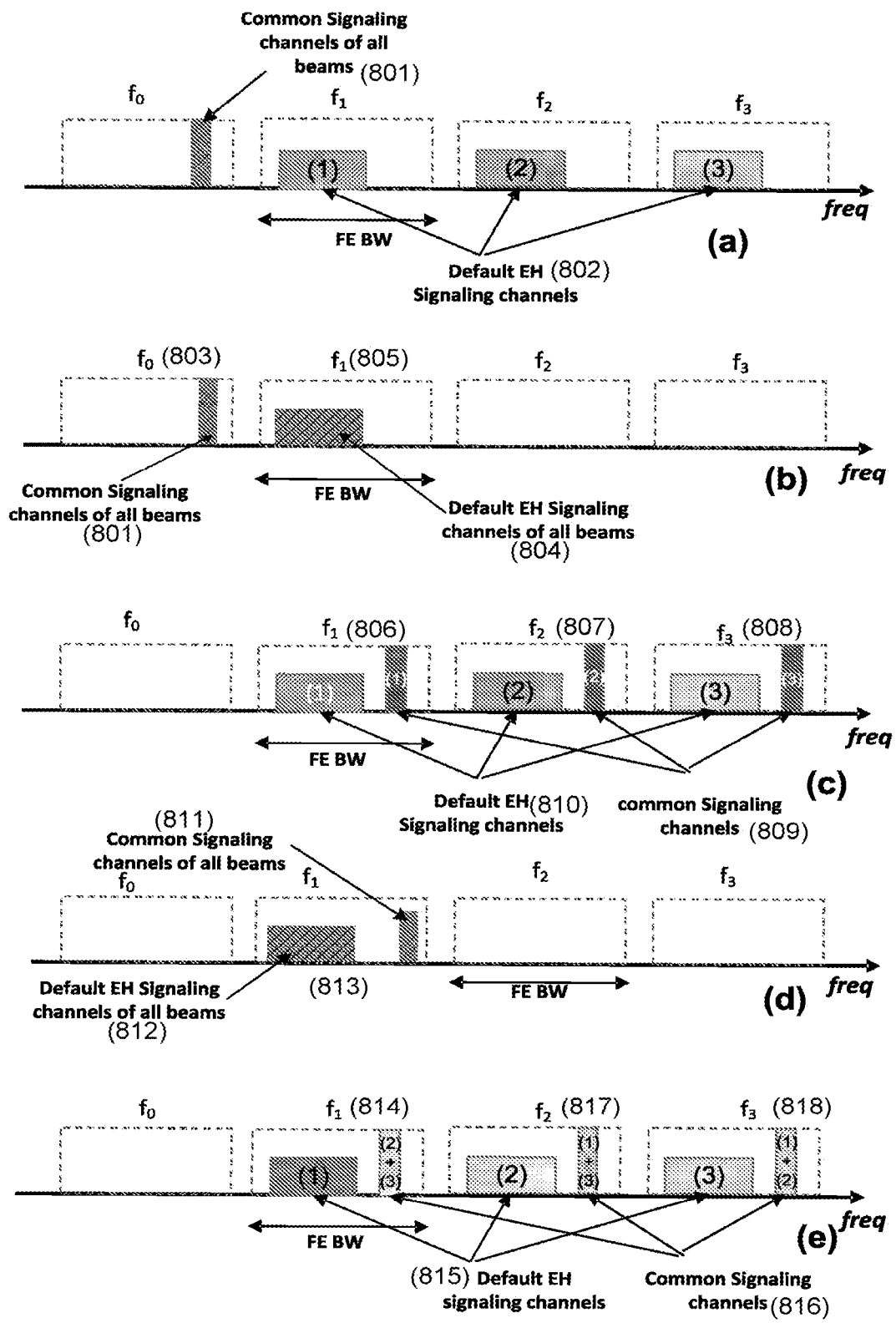
FIG. 8 illustrates example frequency allocation options for default EH signals and common signals.

In a first scenario, the common signaling channels of all beams may exclusively share the same EH sub-band that is dedicated only for common signaling channels whereas each of the default EH signaling channels may exclusively be allocated its own dedicated EH sub-band. For example, the special case when n=4 and N=3 is shown in FIG. 8 (*a*) where the EH sub-band with carrier $f\_0$ is dedicated only for common signaling channels and shared by all the beams in the cell, and each of the 3 beams' default EH signaling channels is allocated one of the EH sub-bands with carriers $\in\{f_1, f_2, f_3\}$.

In a second scenario, the common signaling channels of all beams 801 may exclusively share the same EH sub-band that is dedicated only for common signaling channels whereas the default EH signaling channels 802 of all beams share exclusively another dedicated EH sub-band. For example, the special case when n=4 and N=3 is shown in FIG. 8 (*b*) where the EH sub-band 803 with carrier $f_0$ is dedicated only for common signaling channels 801 and shared by all the beams in the cell, and all 3 beams' default EH signaling channels 804 share the dedicated EH sub-bands with carrier $f_1$ 805.

In a third scenario, the common and default EH signaling channels of each beam are multiplexed in frequency within a single EH sub-band that is dedicated only for that beam. For example, the special case when n=4 and N=3 is shown in FIG. 8 (*c*) where the EH sub-band with carrier $f_i$, i$\in\{1,2,3\}$ (806-808) is dedicated for the common 809 and default 810 EH signaling channels of beam i where the two channels per beam are frequency multiplexed within that EH sub-band.

In a fourth scenario, the common 811 and default 812 EH signaling channels of all beams share the same EH sub-band 813 where the common and default EH signaling channel are multiplexed in frequency within the same EH sub-band. For example, the special case when n=4 and N=3 is shown in FIG. 8 (*d*) where the EH sub-band with carrier $f_1$ is shared by the common and default EH signaling channels of all beams and the two common and default EH signaling channels are frequency multiplexed within that EH sub-band.

In a fifth scenario, the default EH signaling channel of a specific beam may exclusively (with no other beams' default EH signaling channels) be allocated a specified EH sub-band. The common signaling channel of that beam may be repeatedly allocated to each of the EH sub-bands allocated to the other beams' default EH signaling channels. Subsequently, the default EH signaling channel of that beam shares the same EH sub-band with the common signaling channels of all other beams where all signaling channels are spatially multiplexed and frequency multiplexing may also be considered for the default EH and common signaling channels. For example, the common and default EH signaling channels transmission of beam (1) for the special case when n=4 and N=3 is shown FIG. 8 (*e*) where, in this example, the default EH signaling channel 815 of beam (i) is allocated EH sub-band at $f_i$, i$\in\{1, 2, 3\}$ 814, 817, 818 and the common signaling channel 816 of beam (i) is allocated EH sub-bands at $f_i, \forall j \in\{1, 2, 3\}\backslash i$.

Common and Default EH Signaling Channels Time Scheduling Aspects

Figure 10:
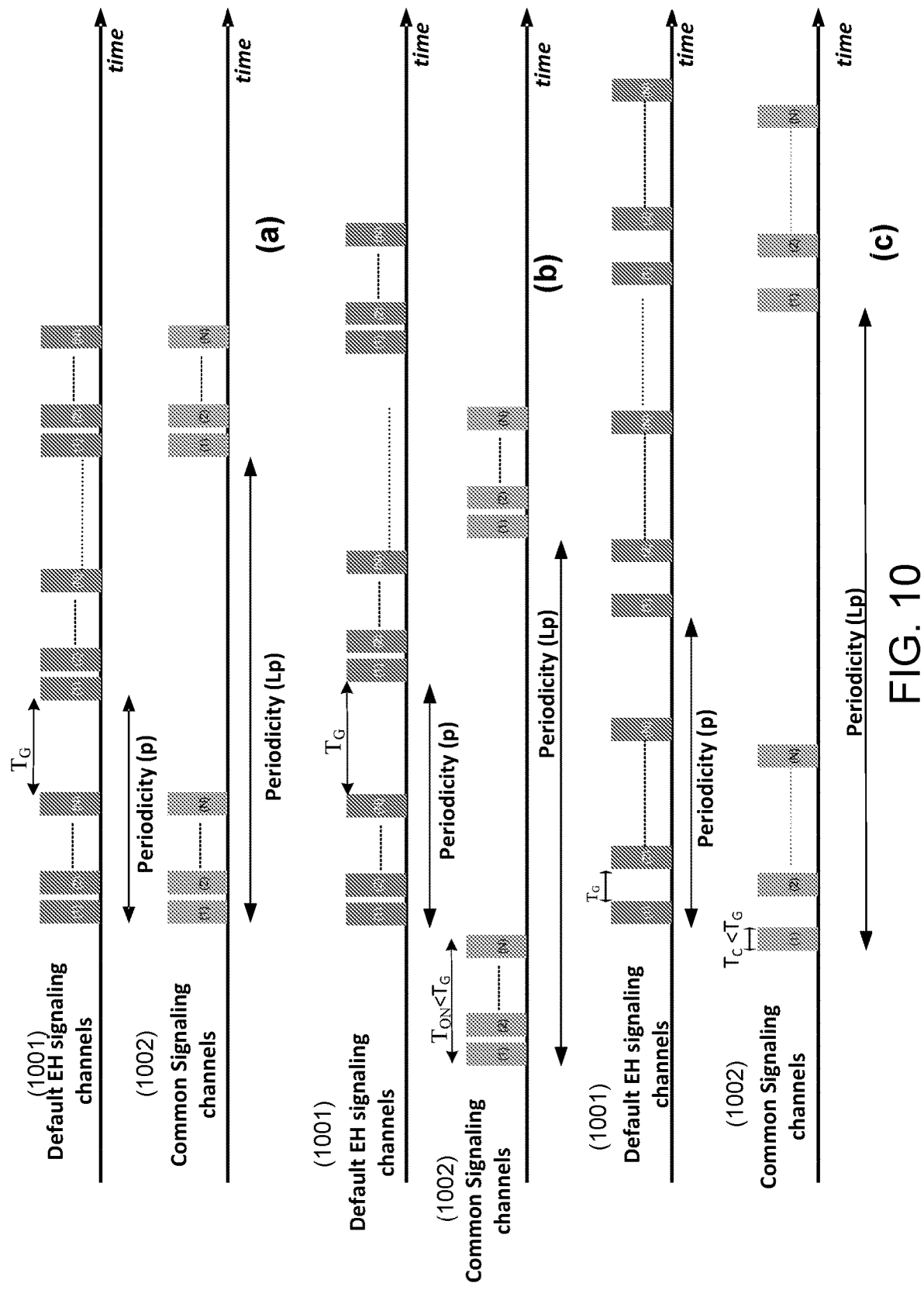
FIG. 10 shows a few example common and default EH signaling channels timing schedules for time switched beam transmissions.

Since the beam are time switched, the simultaneous transmission of two channels from two different beams is forbidden. Thus, transmissions over the common (and/or default EH) signaling channels of different beams should be consecutive in time, i.e. the transmissions of common 1002 and default 1001 EH signaling channels of the same beam may be simultaneous or time multiplexed and are time multiplexed with other beams' transmissions as shown in FIG. 10(*a*) and FIG. 10(*b*) respectively. The time duration over which the common signaling channels' transmissions from all beams occur is denoted as the common signal reception ON duration $T_{ON}$. Common signaling channels transmissions may be considered periodic with a periodicity that might be the same or different than the default EH signaling channel transmissions periodicity. The period of the common signals is defined as the time difference between beginnings of two consecutives ON durations.

The common signaling channels' timing schedule may be dependent on one or more of the following parameters:
a. Each beam's default EH signaling channels transmission periodicity, where the transmissions of default EH signaling channels over different beams might have the same periodicity or not.
b. The frequency allocation format for the common and default EH signaling channels for each beam.

Figure 9:
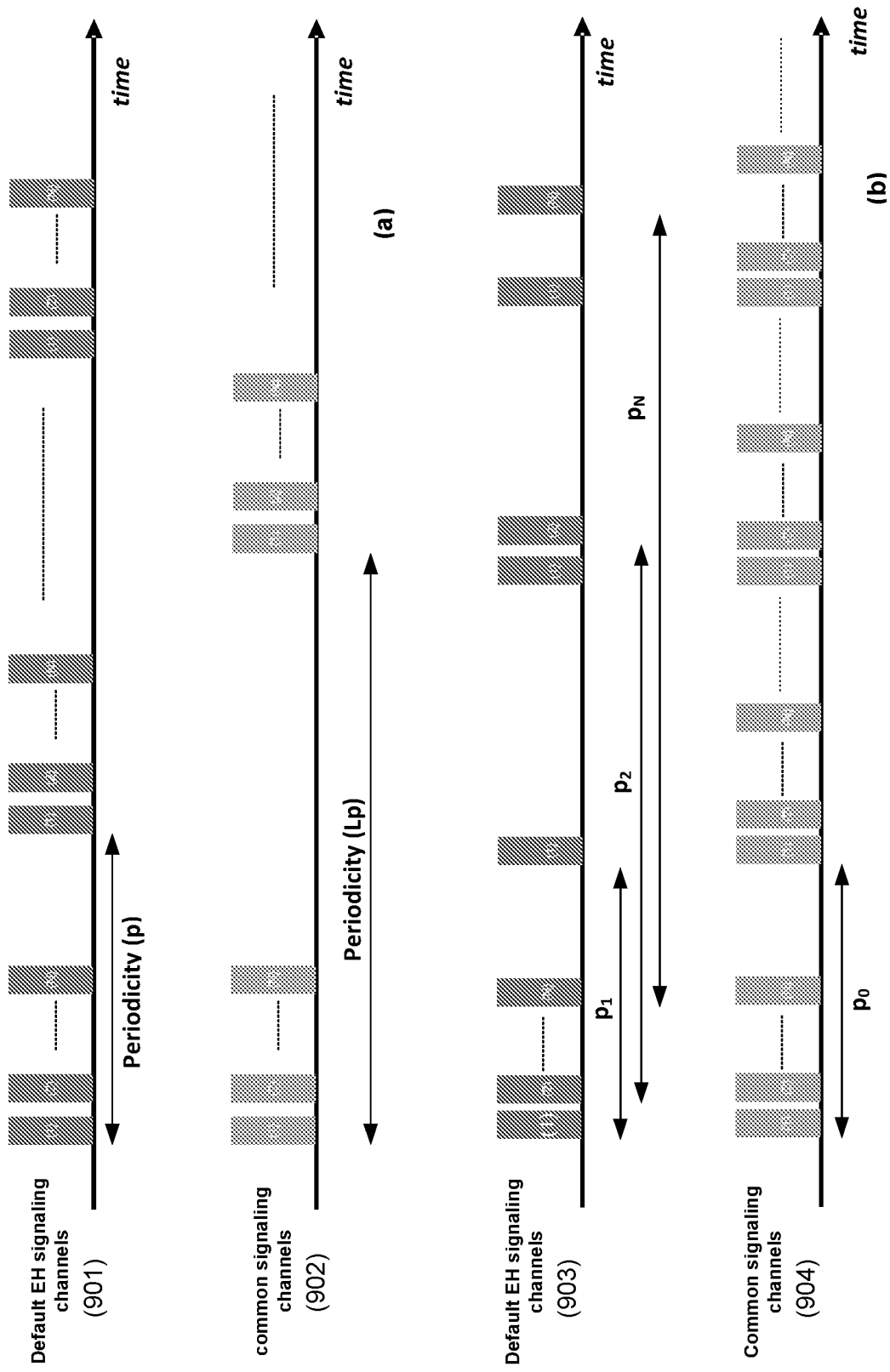
FIG. 9 is an illustration of different periodicity configurations of default EH and corresponding signaling channels.

In the case that, the default EH signaling channels 901 of all beams have the same transmission periodicity p, the periodicity of the common signaling channels 902 might be chosen as Lp where L is an arbitrary integer number as shown in FIG. 9(*a*). On the other hand, if the default EH signaling channel 903 for each beam has a different transmission periodicity, e.g. $p_i$, the common signaling channels 904 period ($p_0$) might be determined as the least common multiple of all default EH signaling channels' periods, i.e. LCM($p_i$), or the greatest common divisor of them, i.e. GCD($p_i$) as in FIG. 9(*b*).

LCM might be reasonable if common signaling channels are desired to have a lower rate of transmission than default EH signaling channels. For example, if the common signaling channels are thought to be a waste of resources, i.e. they consume a lot of resources without any improvement in the energy transfer efficiency.

GCD might be more reasonable if common signaling channels are desired to have higher rate of transmission than default EH signaling channels. For example, if the common signaling channels have other tasks like carrying the number of beams transitions per period as an indication of mobility status.

Next, the frequency allocation of different signaling channels (common and default EH) may affect the timing schedule of common signaling channels. A common signaling channel of a certain beam may be transmitted at the same time with the default EH signaling channel of the same beam if both channels are allocated different EH sub-bands. Also, they may be transmitted simultaneously if they are modulated in a way that both may be correctly detected, e.g. both are multiplexed in frequency within the same front-end bandwidth (EH sub-band), AM modulation is considered for common signaling channel, OOK is considered for default EH signaling channel, and self-mixing architecture is utilized. If such a capability of distinguishing same beam's common and default EH signaling channels transmissions is not available and both channels are allocated the same EH sub-band, the common signaling channel of that beam should not be scheduled at the same time as the default EH signaling channel of the same beam. For consecutive common signaling channels' transmissions and given that beams are time switched, common signaling channels 1002 transmissions must lie in the gaps between default EH signaling channels 1001 transmissions as shown in FIG. 10(*b*) and FIG. 10(*c*).

Considering a same transmission periodicity for the default EH signaling channels of all beams, are listed a following few, non-exhaustive, set of examples for time scheduling possibilities based on the frequency allocation scenarios discussed above.

For the first, second and fifth frequency allocation scenarios mentioned earlier, the default EH signaling channels are scheduled for consecutive transmission in time due to beam time switching while common signaling channels transmissions may be scheduled for simultaneous transmission, each with the corresponding default EH signaling channel transmission of the same beam as in FIG. 10(*a*). Alternatively, common signaling channel transmissions may be scheduled for transmission during the default EH signaling channels' transmission gaps as shown in FIG. 10(*b*)-(*c*) or part thereof.

For the third and fourth frequency allocation scenarios mentioned earlier, two different cases may be considered when establishing a timing schedule. In one case, if the common and default EH signaling channels of each beam cannot be detected simultaneously, the default EH and common signaling channels of the same beam should be scheduled for consecutive transmission in time. There are different options for time coordination among common and default EH signaling channels transmissions across all beams. One option is to schedule the common signaling channels transmissions of all beams consecutively in time followed by the default EH signaling channels' consecutive transmissions, as shown in FIG. 10(*b*), where the gap between the last transmitted default EH signaling and the first one coming next should be larger than the ON duration $T_{ON}$. Another option is to schedule the transmission of the common signaling channel of a specific beam right before the default EH signaling channel's transmission of the same beam where the gap between the transmission of the default EH signaling channels of two consecutively time switched beams should be larger than the duration of one common signaling channel transmission as shown in FIG. 10(*c*). Other options may involve a combination of the two previously mentioned ones. In another case, if the signaling channels (default EH and common) are transmitted with the capability to be detected simultaneously, the timing schedule may be established as discussed in the previous example.

Simultaneous Beams Transmissions

This subsection, is focused on a discussion on time scheduling of common and default EH signaling channels assuming BS's capability of supporting simultaneous transmissions of all beams providing the overall cell coverage. It is noted that there is no difference in terms of how frequency may be allocated to common and default EH signaling channels across beams compared to the beam time switching assumption due to the fact that different beams' transmissions are already spatially multiplexed.

Common and Default EH Signaling Channels Time Scheduling Aspects

Unlike the time-switched beam transmission, the restriction on simultaneous transmission over multiple beams is alleviated. This provides more flexibility in the time scheduling of any channel, common or default EH signaling, transmission regardless of the associated beam. Subsequently, transmission over common (and/or default EH) signaling channels across different beams might be carried out simultaneously or consecutively in time.

The time duration over which the common signaling channels' transmissions from all beams occur is still denoted as the common signal reception ON duration $T_{ON}$ similar to the time switched beam transmission. Additionally, common signaling channels' transmissions may be considered periodic with a periodicity that might be the same or different than the default EH signaling channel transmissions' periodicity where this periodicity may be determined as in the time switched beam transmission case.

Figure 11:
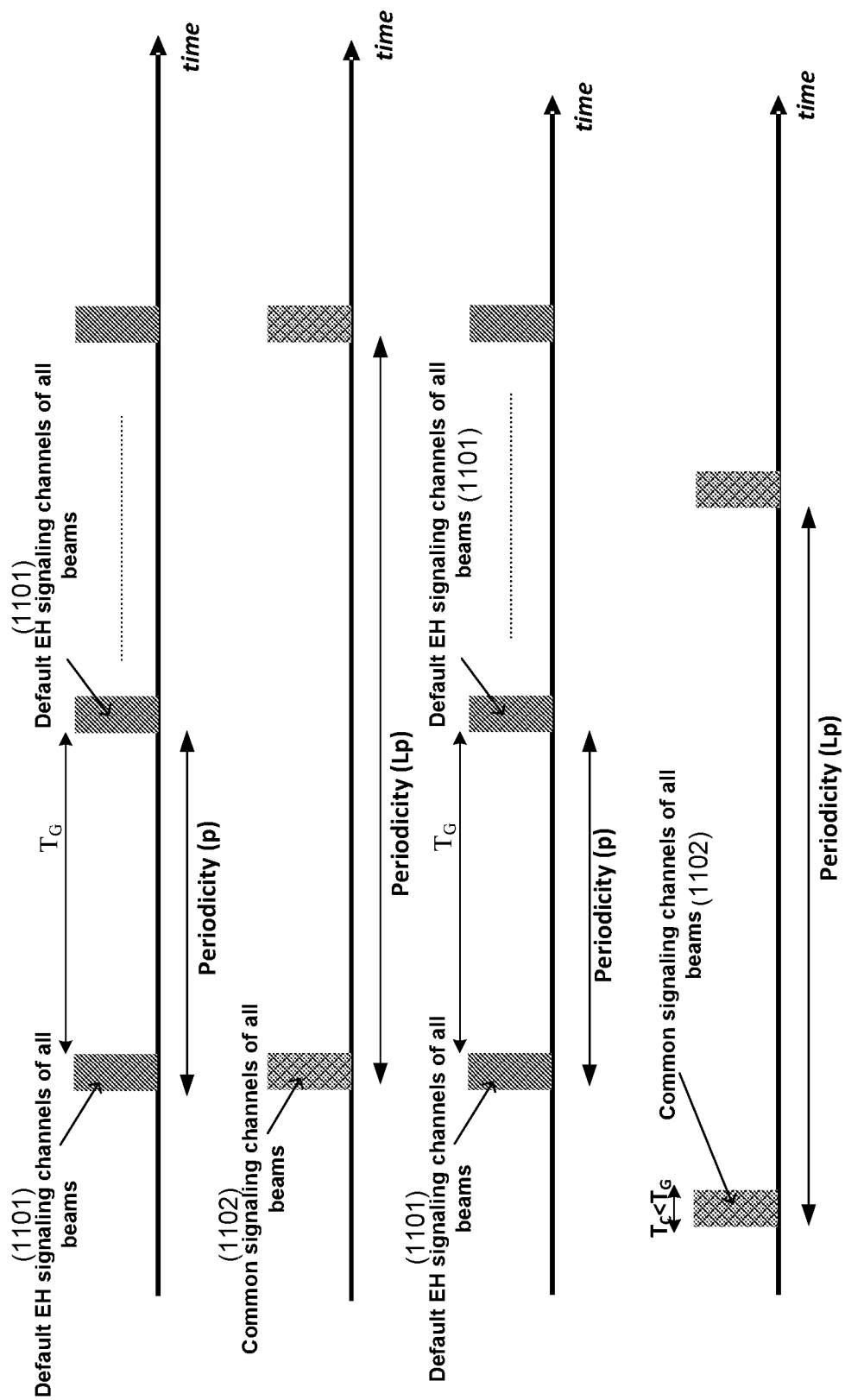
FIG. 11 shows a few example common and default EH signaling channels timing schedules for simultaneous beam transmissions.

Compared to time switched beam transmission, the same time scheduling aspects may still be considered for the simultaneous beam transmission in addition to the applicability of the simultaneous transmission over all the default 1101 EH (and/or common 1102) signaling channels across all beams as shown in FIG. 11(*a*). Another possibility might be the applicability of the consecutive scheduling in time of simultaneous transmissions over sub-sets of beams' common and/or default EH signaling channels.

Without limitation, the same set of time scheduling examples described in the time switched beams case are considered with the assumption that transmissions over the default EH (common) signaling channels of all beams are scheduled at the same time. In this special case, the common signal reception ON duration is the same as the duration of any single common signaling channel transmission, i.e. $T_{ON}=T_C$.

The simultaneous beam-specific common and default EH signaling channels transmissions example associated with the first, second and fifth frequency allocation scenarios mentioned earlier is depicted in FIG. 11(*a*) for the case when common (default EH) signaling channels transmissions for all the beams are scheduled at the same time.

For the second example described in the time switched beam section and is associated with the third and fourth frequency allocation scenarios mentioned earlier, two different cases may still be considered when establishing a timing schedule. In one case, if the common and default EH signaling channels of each beam cannot be detected simultaneously, the default EH and common signaling channels of the same beam should be scheduled for consecutive transmission in time. The timing schedule may be established such that the common signaling channels of all beams are transmitted simultaneously then followed by the simultaneous transmission over the default EH signaling channels for all beams as shown in FIG. 11(*b*) where the gap between two default EH signaling 1101 channels' transmissions ($T_G$) is kept larger than the common signaling channels 1102 ON duration ($T_{ON}$) to guarantee the correct detection of information transmitted separately over the common and default EH signaling channels. In the other case, if the signaling channels (default EH and common) are transmitted with the capability to be detected simultaneously, the timing schedule may be established as in the first example and shown in FIG. 10(*a*).

Mixed Time Switched and Simultaneous Beam Transmission

Beside the time switched and simultaneous beam transmission cases, a mix of the two cases might also be considered. In this transmission scheme, each of the N beam may be divided into M sub-beams where each sub-beam $i \in \{1, 2, \ldots, M\}$ in every beam may be switched on at the same time and a simultaneous transmission over all of them becomes viable. More generally, one may think of beams as sectors where each sector $i \in \{1, 2, \ldots, N\}$ has an angular coverage $\phi=2\pi/N$ that may be covered by $M_i$ sub-beams each of beamwidth $\psi_i=\phi/M_i$, the whole set of sub-beams may then be grouped into sub-sets, regardless of the sub-beams' sector association, where simultaneous transmission may be considered for all sub-beams within a sub-set and time switching may be considered across the different sub-sets.

Figure 12:
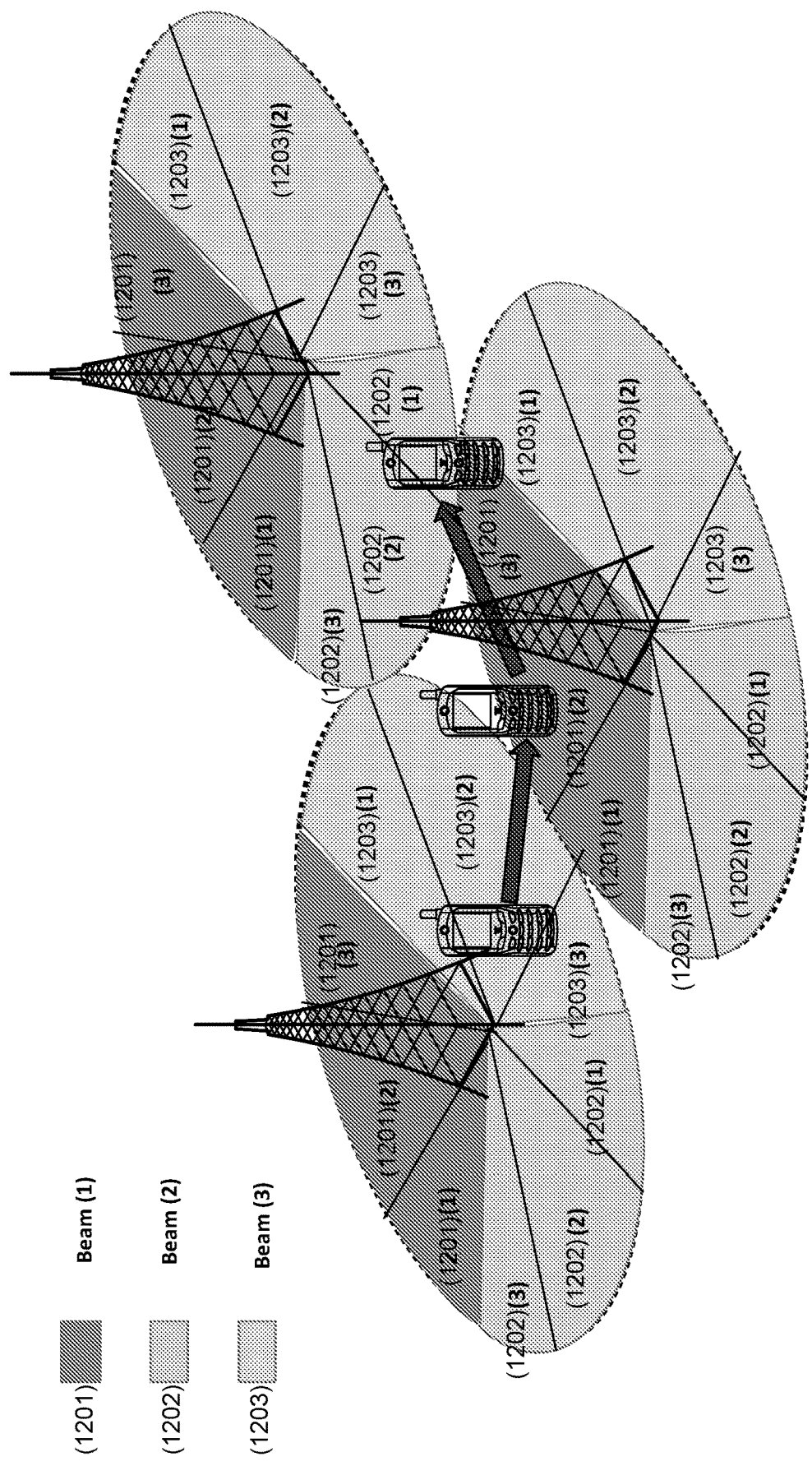
FIG. 12 is an illustrative example of mixed time switched and simultaneous beam transmissions.

As a special case, one may consider $M_i=M$ different sub-sets where each sub-set includes a sub-beam from each of the N beams/sectors $\{b_1, b_2, \ldots b_N\}$, i.e. $s_i=\{b_{1,i}, b_{2,i}, \ldots, b_{N,i}\}$, $i \in \{1, 2, \ldots, M\}$ where $b_{n,m}$ denotes sub-beam m within beam/sector n. The transmission within each sub-set will be carried out simultaneously whereas transmissions across different sub-sets will be scheduled consecutively in time. For the example where N=M=3, the sub-beam sub-sets will be $s_1=\{b_{1,1}, b_{2,1}, b_{3,1}\}$, $s_2=\{b_{1,2}, b_{2,2}, b_{3,2}\}$ and $s_3=\{b_{1,3}, b_{2,3}, b_{3,3}\}$, as shown in FIG. 12, where transmissions over sub beams within $s_1$ are simultaneous and transmissions associated with sub-sets $s_1$, $s_2$ and $s_3$ are scheduled consecutively in time.

The transmission characteristics/configuration (e.g. EH band/frequency allocation, EH band hopping pattern, EH enhancement approach, . . . etc.) set by a BS/eNB/gNB for signaling channels (default EH or common) associated with a specific sub-beam might be the same across all sub-beams within a specific beam/sector or each might have its own unique configuration. For example, a BS might allocate a specific EH sub-band for the default EH signaling channels within beam i and therefore all sub-beams $b_{i,j} \forall j$ within that beam use the same EH sub-band for default EH signaling. It is noted here again that there is no difference in terms of how frequency may be allocated to common and default EH signaling channels across sub-beams compared to the beam simultaneous or time switching assumption due to the fact that different sub-beams' transmissions are already spatially multiplexed.

Common and Default EH Signaling Channels Time Scheduling Aspects

As in the simultaneous and time switched beam transmission cases, time scheduling of common and default EH signaling channels depends on the transmission periodicity (-ies) of default EH signaling channels as well as frequency allocation across different EH sub-bands. Time scheduling for the mixed transmission case should take into account the restrictions imposed by the time switched beam transmissions and the flexibility provided by the simultaneous transmission case.

For example, all the sub-beams within a sub-set $s_1$ may follow the time scheduling rules of the simultaneous beam transmissions case discussed earlier and, therefore, the transmissions over common (and/or default EH) signaling channels associated with those sub-beams could be scheduled simultaneously or consecutively in time.

Figure 13:
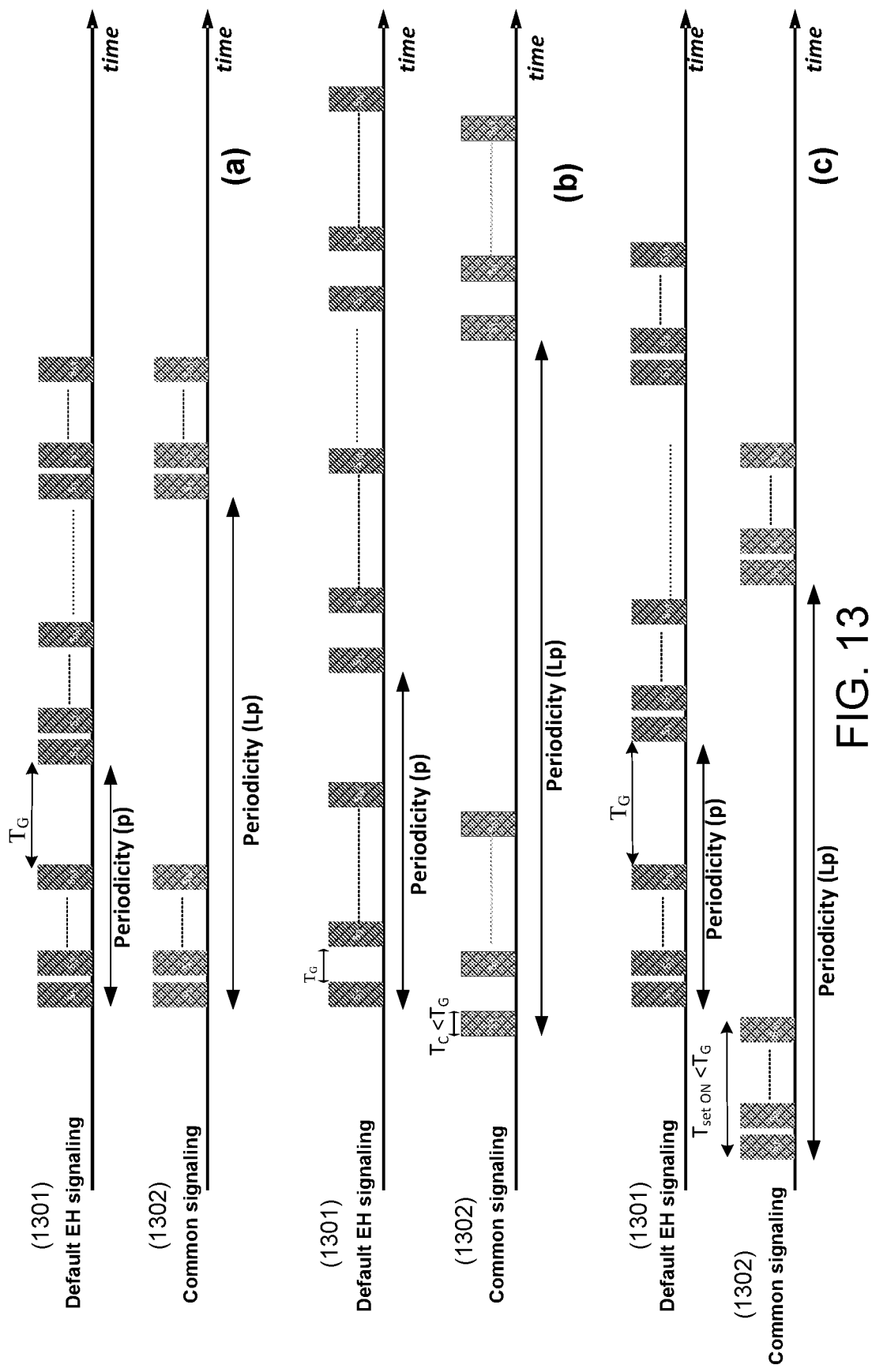
FIG. 13 shows a few example common and default EH signaling channels timing schedules for mixed simultaneous and time switched beam transmissions.

Additionally, transmissions over the common and default EH signaling channels of a certain sub-beam may be scheduled simultaneously if both channels are allocated different EH sub-bands or if they are modulated in a way that enable the correct detection of both of them, e.g. both are multiplexed in frequency within the same front-end bandwidth (EH sub-band), AM modulation is considered for common signaling channel, OOK is considered for default EH signaling channel, and a self-mixing architecture is utilized to separate them. Alternatively, transmissions over the common and default EH signaling channels of a certain sub-beam may be scheduled consecutively in time if both channels are allocated the same EH sub-band and the self-mixing architecture is not a viable option. In this later case, common signaling channels' transmissions must lie in the gaps between default EH signaling channels transmissions as shown in FIG. 13(*b*).

On the other hand, time scheduling across different sub-sets will be established as in the time switched beam transmission case where transmissions over common (and/or default EH) signaling channels associated with each sub-set of sub-beams are scheduled consecutively in time. Given the two-tier scheduling architecture, i.e. time scheduling across sub-sets and across sub-beams within each sub-set, are defined two common signaling reception durations instead of just one. The first ON duration is defined as the transmission duration over the common signaling channels within each sub-set $T_{ON}^{sub}$ while the second ON duration is defined as the transmission duration over all common signaling channels across all sub-sets $T_{ON}^{set}$.

For the following specific set of examples, without limiting the possibilities of other configurations, are considered the two following assumptions:

Transmissions over common (or default EH) signaling channels of the sub-beams within each sub-set are scheduled simultaneously, i.e. $T_{ON}^{sub}=T_C$.

Transmissions over default EH signaling channels within each sub-set are periodic and have the same periodicity.

The simultaneous beam-specific common and default EH signaling channels transmissions example associated with the first, second and fifth frequency allocation scenarios mentioned earlier is depicted in FIG. 13(*a*) for the case when common 1302 (default 1301 EH) signaling channels transmissions for the sub-beams within a specific sub-set are scheduled at the same time and transmissions across different sub-sets are scheduled consecutively in time, i.e. for the specific scenario shown in FIG. 12 where N=M=3, channels associated with the sub-beams in $s_1=\{b_{1,1}, b_{2,1}, b_{3,1}\}$ (where $b_1$ is beam (1) 1201, $b_2$ is beam (2) 1202, and $b_3$ is beam (3) 1203; and $b_{1,1}$ is beam (1) (1) (1201-1 (referenced as "(1201)(1)") and so on) are scheduled simultaneously, followed in time by transmissions of the channels associated with the sub-beams in $s_2=\{b_{1,2}, b_{2,2}, b_{3,2}\}$ followed in time by the transmissions of the channels associated with the sub-beams in $s_3=\{b_{1,3}, b_{2,3}, b_{3,3}\}$.

For the second example described in the time switched beam section and is associated with the third and fourth frequency allocation scenarios mentioned earlier, two different cases may still be considered when establishing a timing schedule. In one case, if the common and default EH signaling channels of each sub-beam cannot be detected simultaneously, the default EH and common signaling channels of the same sub-beam within any sub-set should be scheduled for consecutive transmission in time. The timing schedule may be established such that the common signaling channels of all sub-beams within a specific sub-set are transmitted simultaneously then followed by the simultaneous transmission over the default EH signaling channels for all sub-beams within the same sub-set and schedule is then repeated for all other sub-sets as shown in FIG. 13(*b*) where the gap between two default EH signaling channels' transmissions ($T_G$) is kept larger than the sub-set-specific common signaling channels ON duration ($T_{ON}^{sub}$) to guarantee the correct detection of information transmitted separately over the common and default EH signaling channels. An alternative schedule could be established such that the common signaling channels' transmissions associated with different sub-sets are scheduled consecutively in time and then followed by the consecutive default EH signaling channels' transmissions associated with the different sub-sets as shown in FIG. 13(*c*) where the gap between two periodic transmissions over the default EH signaling channels ($T_G$<p) is kept larger than the overall common signaling channels ON duration ($T_{ON}^{set}$). In the other case, if the signaling channels (default EH and common) are transmitted with the capability to be detected simultaneously, the timing schedule may be established as in the first example and shown in FIG. 13(*a*).

EH Efficiency Enhancement Approaches

This section is focused on solutions that optimize the energy harvesting capability/efficiency of an energy harvesting device that might or might not be collocated with the information receiver when this device may harvest energy over one or more EH sub-bands, each has a bandwidth that is considerably less than the system bandwidth, within a beam specified EH band. The per-beam EH bands configuration will be covered in more detail in section "Procedures supporting beamformed EH signal transmissions" further on in this document. The system bandwidth may contain one or more EH bands that may be contiguously allocated or separated by frequency gaps. The system bandwidth may also be dedicated to a single information receiver or shared amongst more than one information receiver. For example, the EH device might be limited to harvesting energy from a specific 200 KHz sub-band within a 1 MHz EH band at a time due to the design of its MEMS RF transformer while the information channel is configured with a 20 MHz bandwidth.

EH Signal Characteristics

Energy harvesting signal design methods and parameters may be adaptive and may be based on current reported circuit capabilities of the served energy harvesting devices. Therefore, EH signal design may be the sole responsibility of serving cells or the joint responsibility of serving cells as well as served EH devices and/or willing EH assisting devices. Energy harvesting methods may be one or combination of the following options Fixed EH sub-band with auxiliary signal augmentation: the serving base station designs the EH signal by superimposing an auxiliary signal over an information signal within a fixed sub-band where the auxiliary signal is chosen/optimized to maximizes the resulting signal PAPR within that sub-band.

EH sub-band dynamic hopping: the serving base station designs the EH signal by optimizing/choosing a sub-band hopping pattern over a period $T_p$, where each hop spans a time duration $T_h$, that maximizes the resulting signal PAPR in each period.

EH sub-band hopping with auxiliary signal augmentation: the serving base station designs the EH signal by optimizing/choosing a sub-band hopping pattern over a period $T_p$, where each hop spans a time duration $T_h$, that maximizes the resulting signal PAPR in each period. The serving base station further enhances the resulting signal PAPR by complementing the chosen sub-band information signal by an auxiliary signal.

For an EH device, the sub-band filtered signal does not have to carry any fully decodable information since the information signal might span a larger bandwidth than the considered EH bandwidth. The EH device, however, is not interested in receiving any information over that filtered sub-band, it is only interested in receiving a signal that is characterized by a high PAPR such that its energy harvesting efficiency is maximized. Due to the variation/randomness in the part of information signal that is carried over the filtered sub-band, the resulting information time-domain signal, on its own, does not necessarily have to be characterized by a high PAPR. Therefore, were proposed the three aforementioned approaches and next is expanded the discussion on these approaches that optimize the filtered sub-band signal for energy harvesting purposes.

Fixed Sub-Band Signal Enhancement

Figure 14:
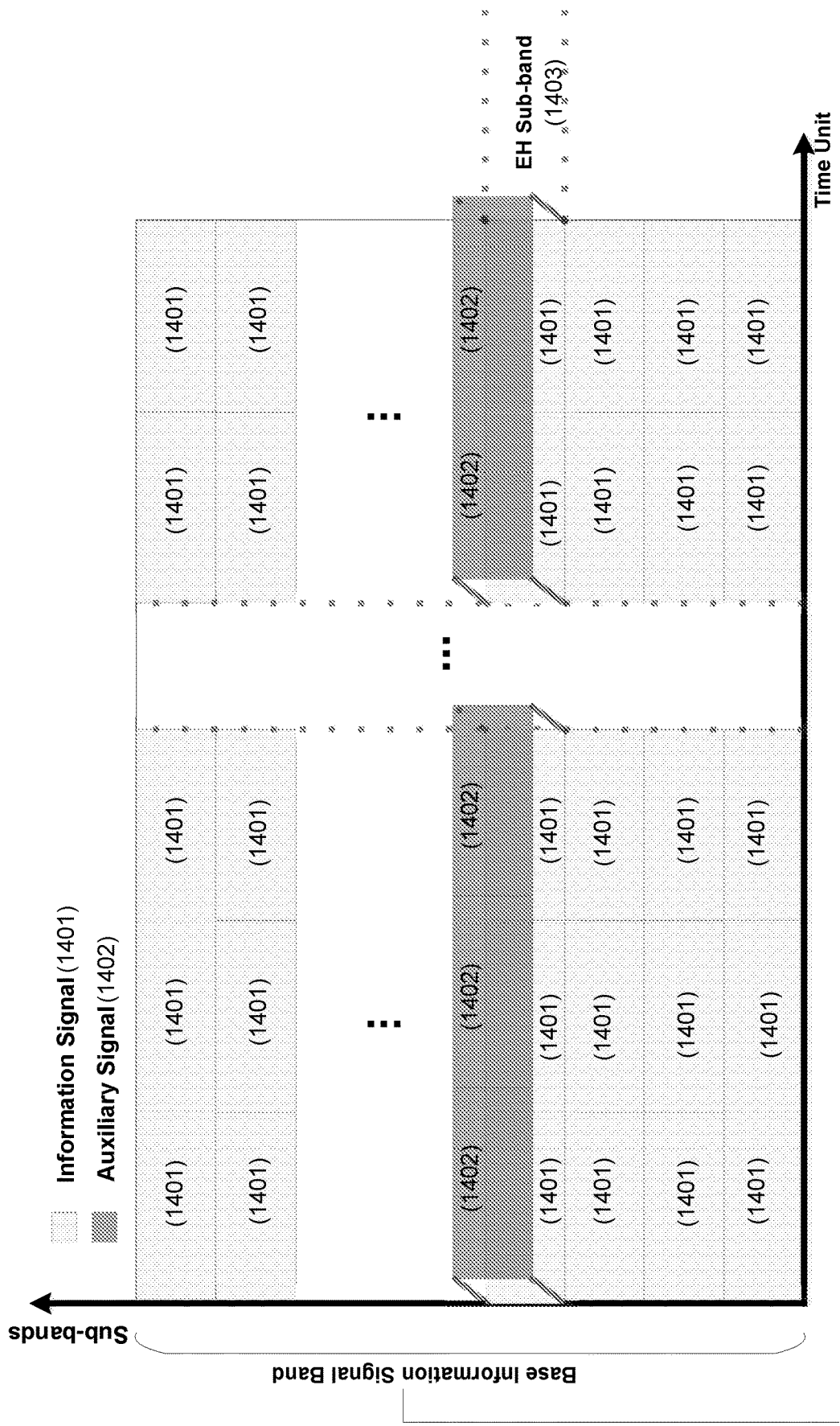
FIG. 14 illustrates fixed sub-band signal enhancement approach for EH signal PAPR maximization.

In this approach the EH device is assumed to either have a limited capability to adapt its EH sub-band or is specifically configured to harvest energy from a single sub-band within the considered channel/system bandwidth. Due to the variation/randomness in the part of information signal that is carried over this specified sub-band, the resulting time-domain signal does not necessarily have to be characterized by a high PAPR. Therefore, is considered an auxiliary signal 1402 that may be superimposed over the portion of the information signal 1401 spanning the frequency sub-band 1403 considered by the EH device as shown in FIG. 14. The goal of the auxiliary signal would be to maximize the PAPR of the time-domain signal resulting from the superposition with the information signal part.

There are a couple of characteristics that are of interest when considering narrowband base information signal enhancement using auxiliary signals. First, the PAPR characteristics of the overall time-domain signal generated at the transmitter/BS is not expected to change significantly given the much smaller bandwidth considered for PAPR enhancement compared to the overall system/base information signal bandwidth. This is particularly important to maintain the transmitter/BS's power amplifier efficiency. Second, the flexibility in narrowband resources scheduling allows for backward compatibility with information receivers that do not support advanced auxiliary signal mitigation techniques.

The auxiliary signal may be constructed as one from a set of predefined signals such that the average/minimum PAPR over a set of one or more OFDM symbols, slots, subframes, or frames is maximized. Additionally, the set of predefined signals may also be chosen such that the PAPR variance is minimized. Depending on the chosen period of optimization, i.e. the period corresponding to the considered number of OFDM symbols/slots/subframes/frames, the selected auxiliary signal will need to be signaled to the information receiver correspondingly.

For example, consider an OFDM system with 100 RBs, each RB consists of 12 SCs with SCS of 15 KHz, and 2 RBs are dedicated for EH. A codebook of M vectors is generated, each vector of length 24 (2 RBs×12 SCs) represents a potential auxiliary signal to augment a base information signal, in the frequency domain before the IFFT module, and enhance the PAPR of the combined auxiliary and base information signal. The M vectors are generated randomly using $2^N$ elements that are obtained as $$e_i = 1 - s_i, i \in \{1, 2, \ldots, 2^N\}$$

where $2^N$ is the base information signal QAM modulation order and $s_i$ are the base information signal constellation. For each OFDM symbol, an auxiliary signal vector is chosen from the codebook such that the PAPR of the time-domain signal corresponding to the 2 EH dedicated RBs is maximized. A sample PAPR CDF for M∈{1 (1503), 5(1504), 10(1505), 50(1506)} and assuming QPSK and 16-QAM modulation is shown in FIG. 15 and FIG. 16, respectively.

Figure 15:
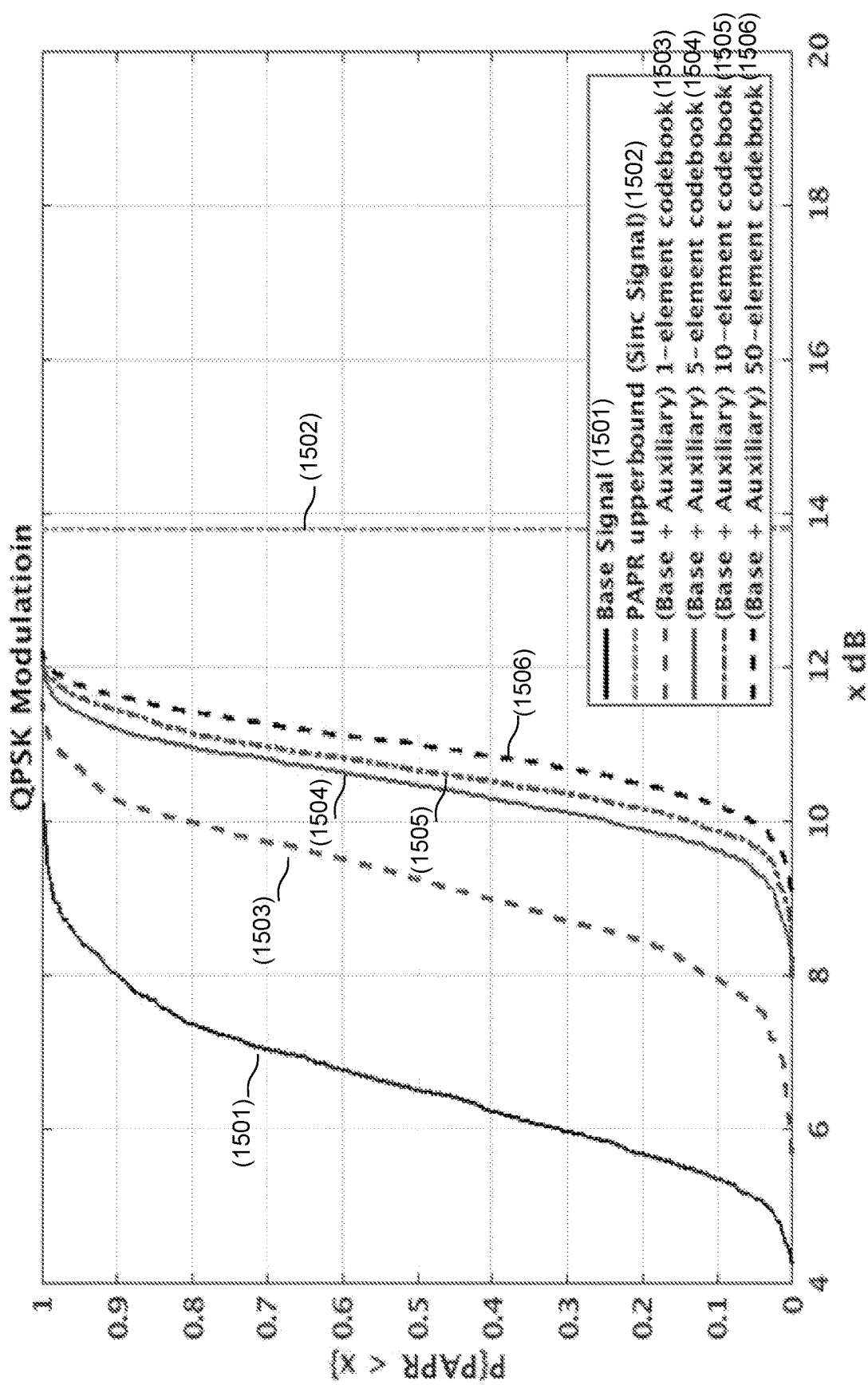
FIG. 15 illustrates PAPR CDFs using sample codebooks of length M∈{1, 5, 10, 50} and enhancing a QPSK modulated base information signal.
Figure 16:
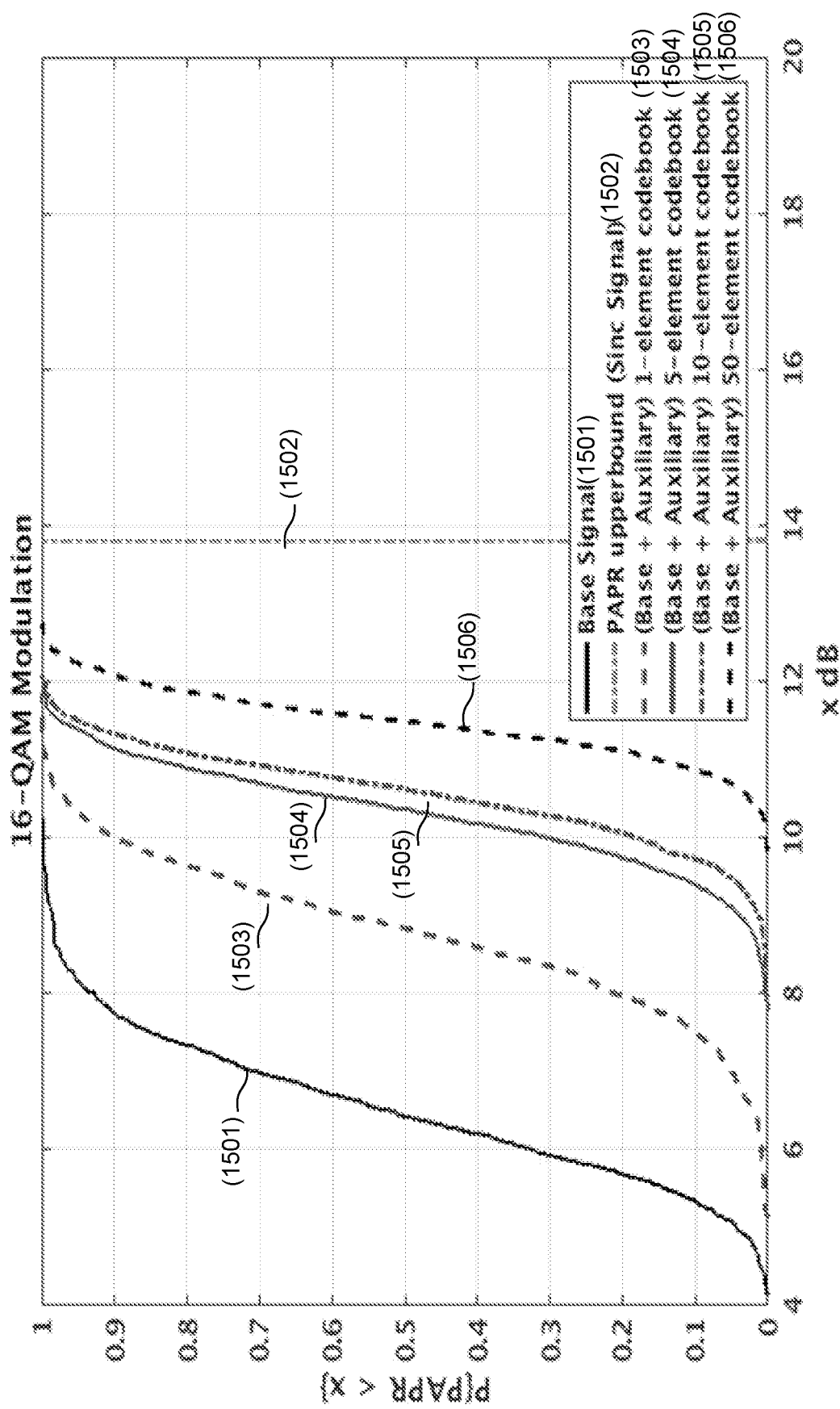
FIG. 16 illustrates PAPR CDFs using sample auxiliary signal codebooks of length ME{1, 5, 10, 50} and enhancing a 16-QAM modulated base information signal.

It is noted that the PAPR enhancement gain relationship among different codebook sizes in FIG. 15 and FIG. 16 is not consistent between QPSK and 16-QAM modulation scenarios due to the random generation of codebooks as described above. However, for well-designed codebooks, it is expected that this PAPR enhancement gain relationship among codebooks of different sizes to be consistent between the two modulation scenarios. A higher (or at the very least similar) PARP enhancement gain is also expected with respect to the base signal PAPR values using a well-designed auxiliary signal codebook and of the same size as the randomly generated one. It may be observed in FIG. 16 that the minimum PAPR for a 16-QAM base signal may be enhanced by at least 5 dB utilizing a randomly generated auxiliary signal codebook of length (50). This may correspond to an improvement in RF-DC conversion efficiency greater than 8 dB for an input power less than −3 dB as suggested in FIG. 3(a) comparing OFDM signal to a chaotic signal which have a maximum PAPR difference of 2.8 dB]. It is also noted that the PAPR upperbound 1502 shown in the figures could be achievable using a well-designed auxiliary signal codebook of length $M=2^{24 \times N}$ but this will require a signaling overhead proportional to 24×N bits.

Figure 17:
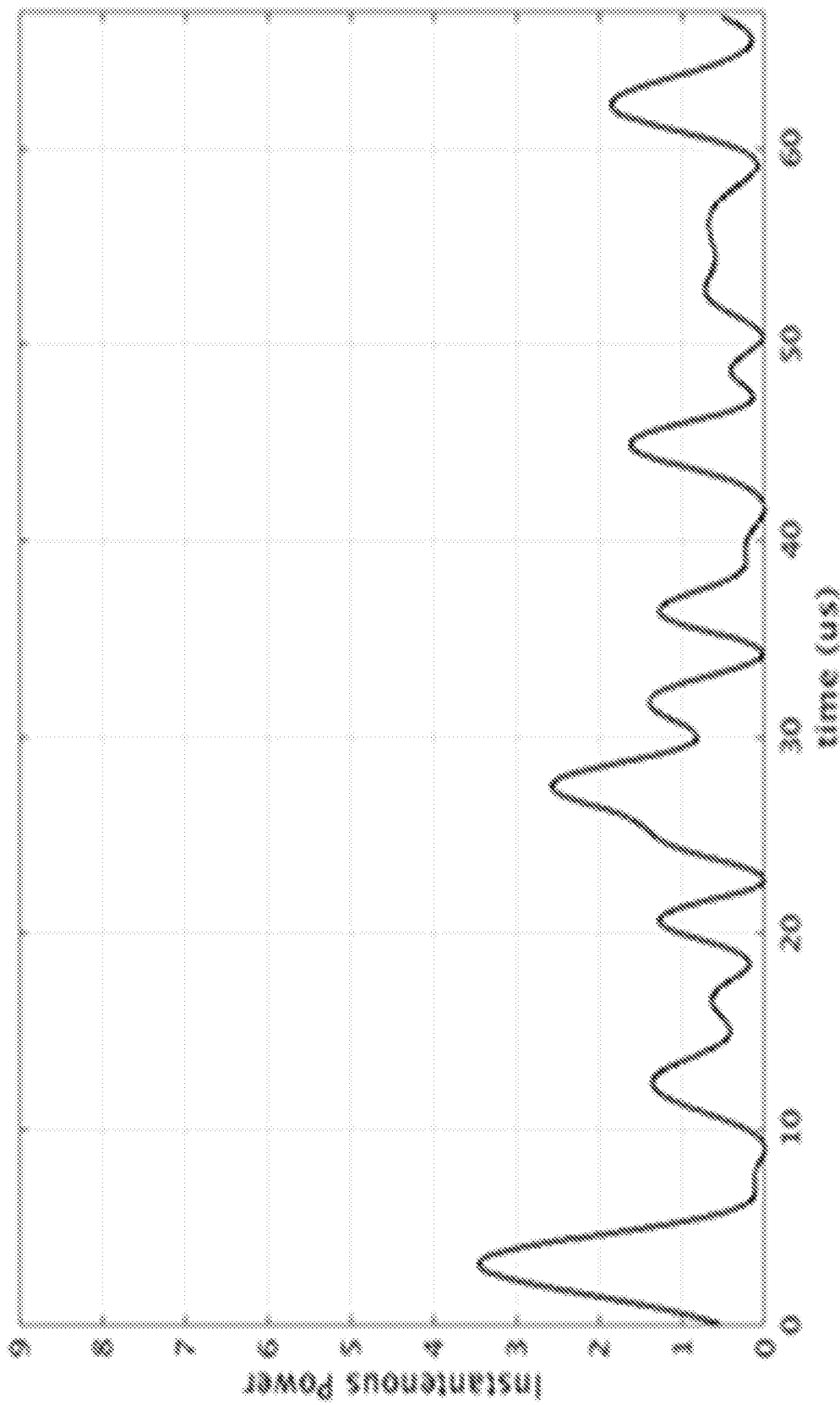
FIG. 17 is a sample realization of an EH signal, a 2 RB-portion of a 16-QAM base information signal, in the time domain before auxiliary signal enhancement.
Figure 18:
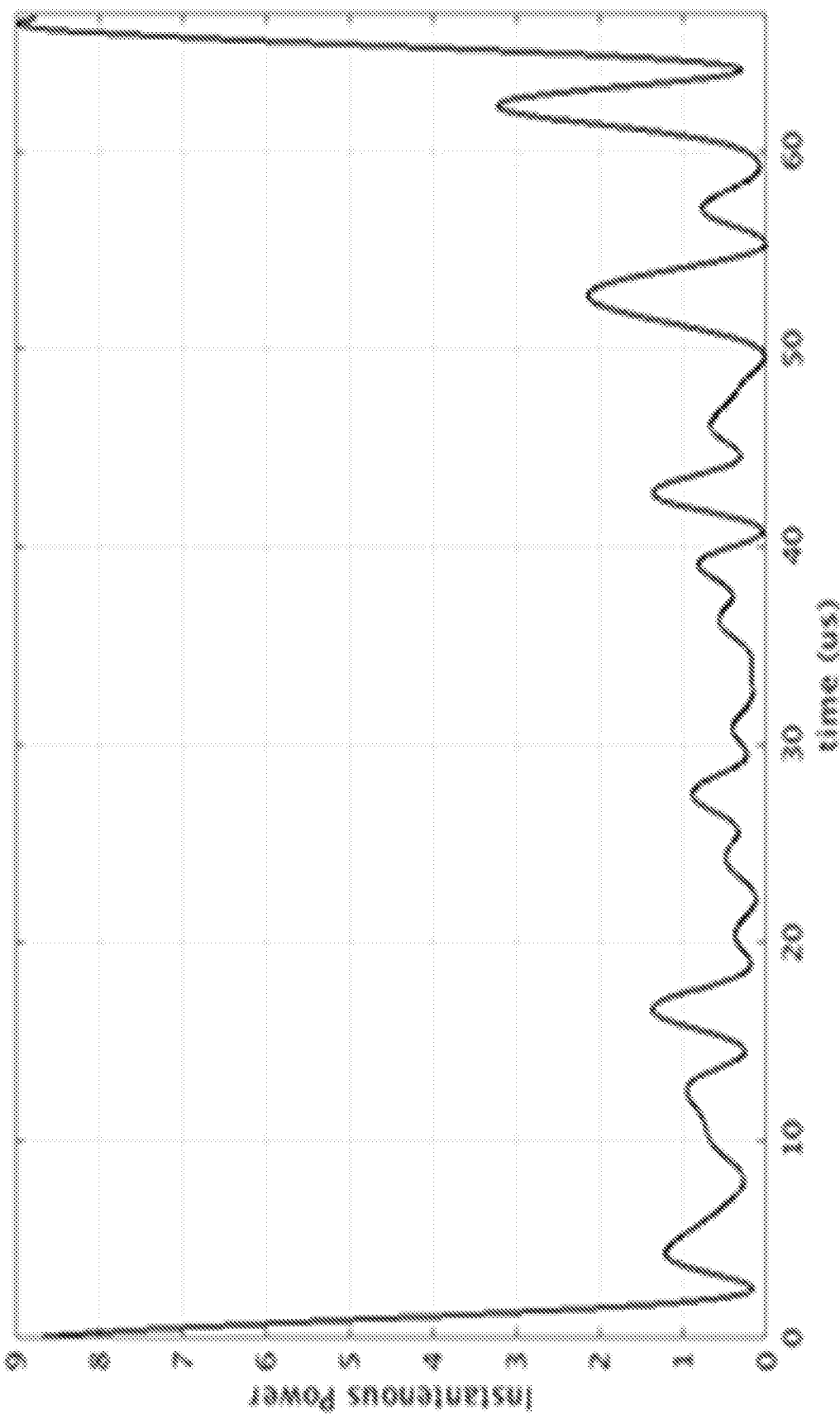
FIG. 18 is a sample realization of an EH signal, a 2 RB-portion of a 16-QAM base information signal, in the time domain after auxiliary signal enhancement.

A sample realization of the generated OFDM symbol time-domain signal before and after base information signal enhancement using the auxiliary signal is shown in FIG. 17 and FIG. 18, respectively, for a 16-QAM modulated signal. It is clear from the example in those two figures how the auxiliary signal may enhance the PAPR of the combined time-domain signal where for that specific example the maximum instantaneous power increased by a factor ~157%.

Adaptive Sub-Band Hopping

An alternative approach, assuming that the EH device is capable of adapting/switching its EH sub-band within a considered channel bandwidth in a reasonable period of time, involves the BS/eNB/gNB configuring the EH device with a sub-band hopping pattern. The goal of the hopping pattern would be to maximize the average/minimum PAPR and optionally minimize the PAPR variance. The duration of each hop will be dependent on the EH device capability, i.e. how quickly it may hop between sub-bands and how tight its synchronization is with the serving BS/eNB/gNB transmissions, as well as the signaling and configuration options. The overall duration of the hopping pattern, on the other hand, will be dependent on the information signal schedule as well as the level of processing complexity/capability that the radio access network will support, i.e. the BS/eNB/gNB capability to perform hopping pattern optimization over a number of OFDM symbols/slots/subframes/frames.

Figure 19:
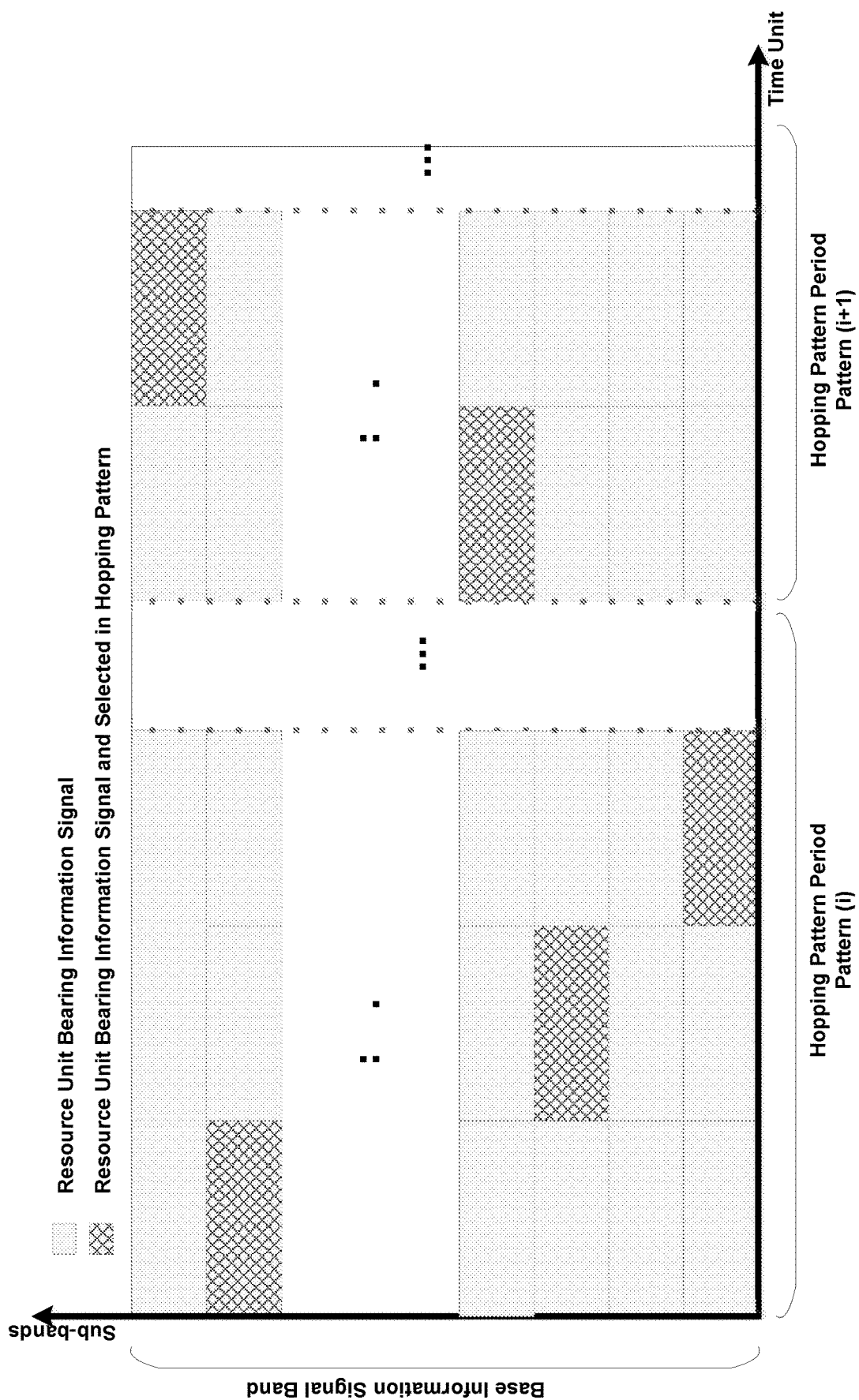
FIG. 19 is an illustration of the adaptive sub-band hopping approach for EH signal's PAPR maximization.

In this approach, the sub-band hopping pattern may be agnostic to the information receiver as it does not impact its signal detection efficiency. On the other hand, the sub-band hopping pattern is of paramount importance for the EH device to maximize its EH efficiency. An illustration of the approach is shown in FIG. 19.

Figure 20:
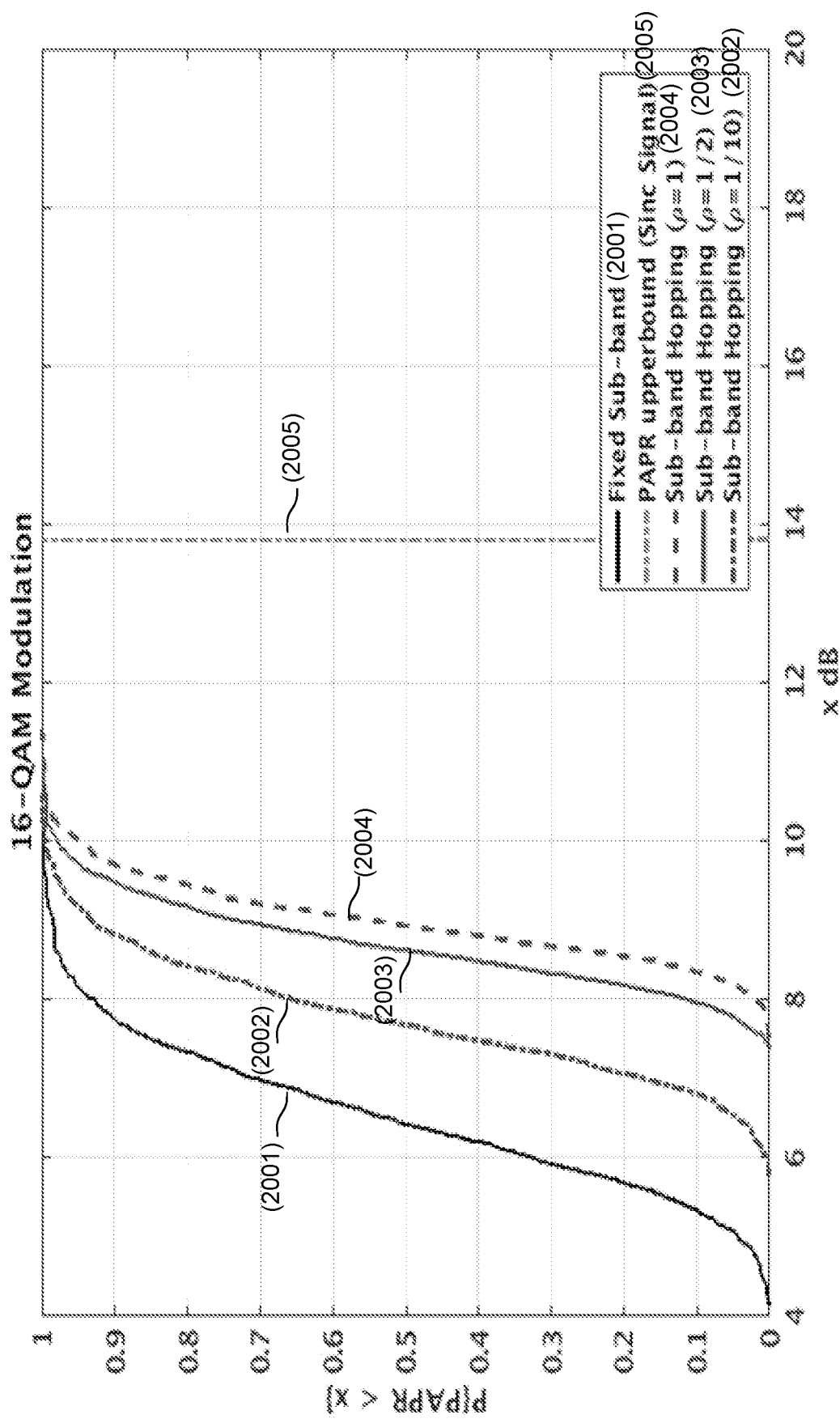
FIG. 20 illustrates PAPR CDFs using disjoint/non-overlapping sub-band frequency hopping for system RBs support fractions $\rho \in \{1, \frac{1}{2}, \frac{1}{10}\}$ and 16-QAM modulated signals.

Given the OFDM system example described for the fixed sub-band signal enhancement approach, the system's 100 RBs along with the 2 EH RBs result in a total of 50 disjoint/non-overlapping sub-bands. The EH device might be able to support only a fraction p of those sub-bands. FIG. 20 shows the PAPR CDFs for the optimal sub-band hopping patterns that maximize the EH signal PAPR assuming 16-QAM modulation and when the EH device supports $\rho \in \{1 \ (2004), \frac{1}{2} \ (2003), \frac{1}{10} \ (2002)\}$. It is clear from the figure that as the size of the frequency resources pool increases (i.e. number of EH sub-bands available for hopping), the effective PAPR experienced by the EH device increases, additionally the effective PAPR experienced by the EH device is in general higher with EH sub-band hopping than fixed sub-band energy harvesting.

Adaptive Sub-Band Hopping with Signal Enhancement

Figure 21:
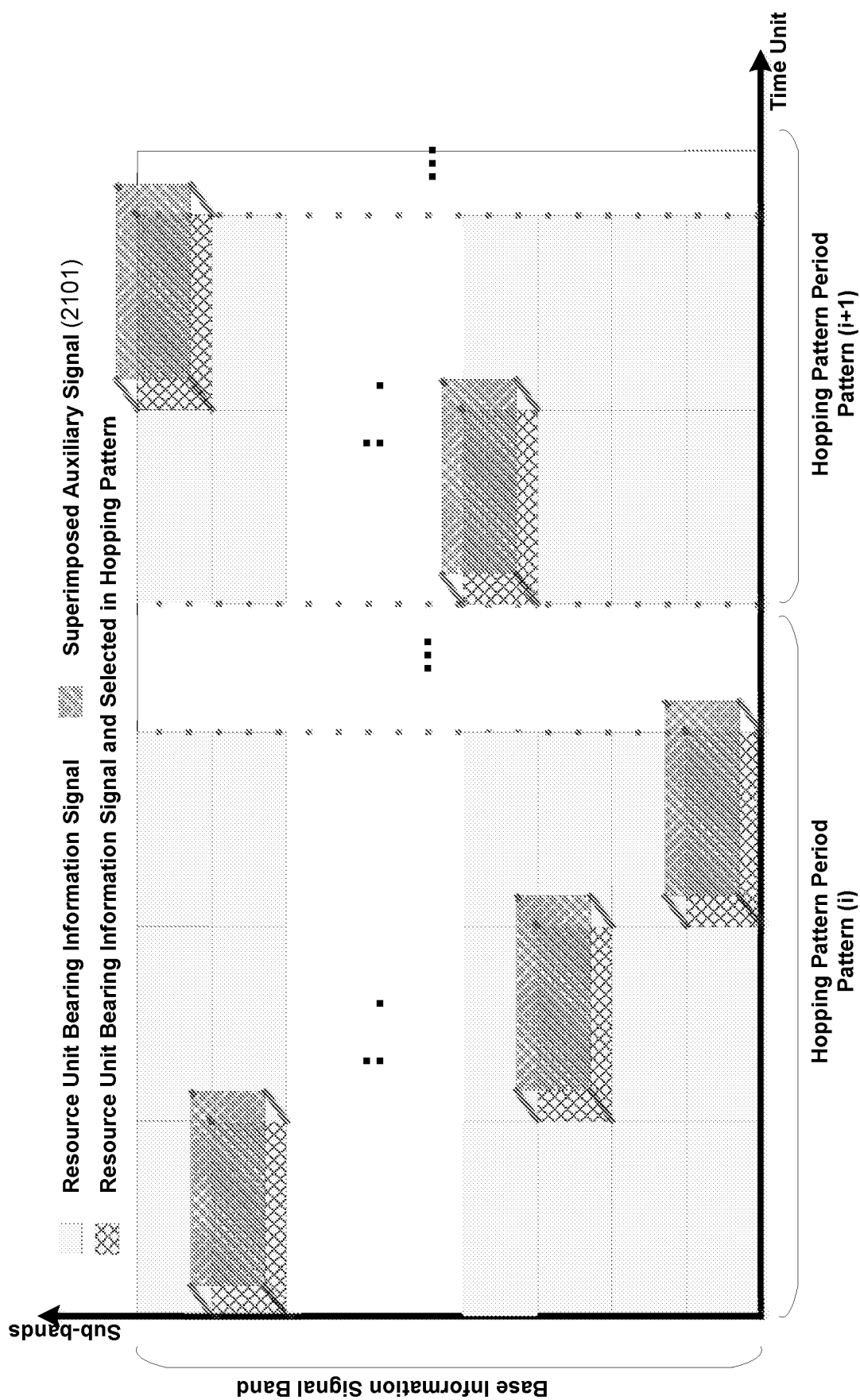
FIG. 21 is an illustration of adaptive sub-band hopping with auxiliary signal enhancement approach for EH signal's PAPR maximization.

In another approach, a combination of sub-band hopping and information signal PAPR enhancement using auxiliary signals may be considered. This approach is expected to offer the greatest level of design flexibility that may result in an improved energy harvesting efficiency at the EH device, but potentially at the expense of processing complexity and signaling overhead. The serving BS/eNB/gNB may jointly optimize the sub-band hopping pattern and the selected auxiliary signal at each hop for energy harvesting efficiency maximization. Alternatively, it might decide to decouple the optimization problem into two disjoint problems for processing complexity reduction, but potentially at the expense of loss in the energy harvesting efficiency. An illustration of the approach is shown in FIG. 21.

For this approach, the sub-band hopping pattern as well as the auxiliary signal (2101) selected for each hop will need to be signaled to the information receiver for efficient information signal decoding. On the other hand, only the sub-band hopping pattern will need to be signaled to the EH device.

EH Device Configuration

An EH device is responsible of accurately providing/declaring its EH capability to the serving BS/eNB/gNB to help optimize the energy harvesting operation. The EH capability information may involve one or combination of the following features:

a. The supported energy harvesting sub-band bandwidth, the number of sub-bands that may be simultaneously supported, and a list of all the sub-bands that may be supported for devices with fixed configurations. The whole channel bandwidth may be considered as a special case. For example, in a 20 MHz channel, the EH device might report the support of 2 simultaneous sub-bands each is 2 RBs wide (24×15 kHz=360 kHz bandwidth) and a gap spacing of 3 RBs between the supported sub-bands (i.e., for a 100 RBs' channel, total number of supported sub-band would be 20).

b. EH sub-band adaptation/switching capability. For example, the total number of supported sub-bands within a specific channel and their characterization (e.g. their center frequencies), the time required for the EH device to switch between any two of the supported sub-bands. For example, an EH device may declare a minimum switching time equivalent to 1 slot in a 15 KHz SCS OFDM system.

c. A mapping between EH signal formats and device's achievable energy harvesting efficiency, e.g. a minimum PAPR to achieve a certain efficiency. For example, the EH device might declare/request a 30% harvesting efficiency and a standardized mapping is used to determine the minimum required PAPR for the EH signal to achieve that efficiency. Alternatively, the EH deice might declare/request the minimum required PAPR directly.

The device's EH capability information may be signaled/provided to the serving BS/eNB/gNB using one of the following options:

a. As part, i.e. information element/field, of an existing PUCCH/UCI format transmission over the Uu air interface, for example during a scheduling request and/or CSI reporting. For example, a WTRU may consider PUCCH format 4 to multiplex $K_{CSI}$ UCI bits corresponding to one or more CSI report(s), $K_{SRs}$ UCI bits corresponding to ($2^{K_{SRs}}-1$) scheduling resources (SRs), and dedicating/allocating e.g. $K_{EHbw}=3$ UCI bits to convey information about supported EH sub-band bandwidth in terms of equivalent RBs for a total number of UCI bits in the PUCCH of $K_{UCI}=K_{EHbw}+K_{SRs}+K_{CSI}$.

b. As a new PUCCH/UCI format that is dedicated for energy transfer configuration and reporting. For example, a PUCCH format 5 that may contain $K_{EHbw}$ UCI bits for EH sub-band bandwidth reporting, $K_{nSBs}$ for the number of supported sub-band in a channel, . . . etc.

c. As a backscattered signal format transmission in response to a poll/control message initiated by the network/BS over the ZE air interface.

The BS/eNB/gNB serving the EH device should utilize the served devices' capability information to figure out the optimal resource efficient allocation of sub-bands to deliver the EH signal to the served devices. The BS needs then to signal the selected configuration parameters to the EH devices. The BS's EH signaling information may be conveyed using any of the options and might contain any of the information elements presented therein in addition to any of the following:
- a. The selected EH signaling approach(es), i.e. fixed sub-band signal enhancement, adaptive sub-band hopping, or adaptive sub-band hopping with signal enhancement.
- b. List of the sub-bands considered for EH signal transmissions, e.g. as a list of center frequencies or a list of indices associated with a set of pre-configurations. For example, a BS signaling a reference subcarrier/PRB number such as PRB #0 and an index to a set of preconfigured parameters such as a 2 PRB sub-band bandwidth and an 18 PRB spacing between allocated sub-bands for EH. Alternatively, a BS signaling a list of indices, a first index corresponds to a sub-band starting at subcarrier #0 and has a 1 PRB equivalent bandwidth, a second index corresponds to a sub-band starting at subcarrier #48 and has a 2 PRB equivalent bandwidth, . . . etc.
- c. Bandwidth/number of sub-carriers and/or target PAPR/ efficiency associated with each of the sub-bands considered for auxiliary signal superposition. For example, a BS signaling a list of discretized EH efficiencies corresponding to each allocated EH sub-band or a single value that is applicable to all sub-bands.
- d. Sub-band hopping pattern signaled as one of the following options:
    A sequence of sub-band indices that is explicitly signaled
    An index to a row in a table, that is preconfigured in the EH device or signaled as part of a separate control or system information message, that contains a sequence of sub-band indices.
    A mapping function that is selected from a set of preconfigured functions at the EH device. The mapping function may use as an argument the index/indices of the current OFDM symbol/slot/subframe/frame and/or one or more arguments that are signaled to the EH device.
    A seed to a random sequence generator and the corresponding sequence type.
- e. The time duration or number of OFDM symbols/slots/subframes/ . . . etc. associated with each hop in sub-band hopping approaches.
- f. A number identifying the number of hops in a sub-band hopping pattern.
- g. The number of times a sub-band hopping pattern is expected to be repeated for a given/specific information signal transmission.

Information Receiver Signal Detection Assistance

Any modification in part of or the whole information signal bandwidth is a source of interference for the information receiver. The modifications may be the introduction/addition of specific auxiliary signals at fixed sub-band(s) over the duration of information signal transmission, as in the fixed sub-band signal enhancement approach, or the introduction/addition of specific auxiliary signals at sub-bands that adaptively change according to some pattern over the duration of the information signal transmission, as in the adaptive sub-band hopping with signal enhancement approach.

For the information receiver to efficiently decode the received information signal, it needs to obtain assisting information from the serving BS/eNB/gNB on how to effectively eliminate/cancel the source of interference. The assisting information may be the sub-band hopping pattern, delivered using any of the options described in previous section "EH Device Configuration", in addition to any considered auxiliary signal(s) that get introduced to the information signal frequency spectrum. The parameters of the auxiliary signal(s) and its(their) adaptation may be signaled to the information receiver as:
- a. An index in a table of auxiliary signals that are preconfigured at the information receiver or signaled as part of system information
- b. An argument and a mapping function that is chosen from a set of functions that are preconfigured at the information receiver or signaled as part of system information.

The information receiver may as well receive information only on the sub-band hopping pattern and determine the auxiliary signal(s) that were transmitted using blind decoding/detection. This will, however, come at the expense of more processing requirements/complexity at the information receiver where the complexity increases as the number of auxiliary signals to be detected increases. For example, for the information receiver to match the performance of a codebook that requires 5 bits of signaling using blind decoding, it will require the blind detection of 32 different auxiliary signals assuming that the information receiver already knows the sub-band within its allocated resources that will be considered for auxiliary signal enhancement. In the case when the information receiver is unaware of the location of the EH sub-band, the complexity will become significant and unpractical. For example, assuming that EH devices may support 10 different EH sub-bands within an information receiver allocated bandwidth, the information receiver will need to go through $32^{10}$ combinations to blindly detect the auxiliary signal and cancel it from the received signal.

(Sub-)Beam (Re-)Selection

A WTRU presented within the coverage of several (sub-)beams that needs to (re-)select a (sub-)beam, would perform a figure of merit (FOM) calculations for each (sub-)beam to choose among the available (sub-)beams that may support it. A WTRU that is under the coverage of n (sub-)beams might calculate a FOM for each of the n (sub-)beams. A WTRU receives a unique preamble for each of the (sub-)beams that covers the WTRU, then it measures the strength of each signal transmitted from each (sub-)beam. The WTRU, for each (sub-)beam, will map the received signal strength alongside with other received and/or saved parameters such as EH signal configuration, number of EH occasion, corresponding resources and POW format within a configured window to a set of m parameters $\{p_{i,1}, p_{i,2}, \ldots, p_{i,m}\}$, where i is the (sub-)beam index. Based on those parameters, the WTRU will compute an FOM for each (sub-)beam ($FOM_i$). The FOM might be defined in several ways according to the WTRU capability. For example, the FOM might be defined as the following:
1) For each (sub-)beam i, an $FOM_i$ is calculated based on a predefined set of parameters $p_i$'s as $FOM_i = f(p_{i,1}, p_{i,2}, \ldots, p_{i,m})$, where $f(\cdot)$ is a predefined mapping function at the WTRU. The mapping function could be different for each WTRU and the WTRU may change it from time to another. For example, the mapping function could be a sum of the parameters ($FOM_i=\Sigma_k p_{i,k}$) a weighted sum ($FOM_i=\Sigma_k w_k p_{i,k}$) or a sum/weighted-sum of the square of the parameters ($FOM_i=\Sigma_k p_{i,k}^2$, $FOM_i=E_k w_k p_{i,k}^2$). Also, this mapping function could be a more sophisticated function such as applying a logarithmic compression mapping function after the sum $FOM_i=\log(\Sigma_k p_{i,k}^2)$. The function also could be the sum of different functions performed on the parameters such as $f(p_{i,1}, p_{i,2}, \ldots, p_{i,m})=\Sigma_{k=1}^{m} g_k(p_{i,k})$ where $g_k(\cdot)$ is an arbitrary function (linear or nonlinear) that operates on $p_{i,k}$. Based on the function used to compute the FOM, the optimal (sub-)beam could be the one with the highest/lowest FOM. Alternatively, for a set of n (sub-)beams the largest/smallest two figures of merit could be chosen and another operation is applied over them like comparing them to a certain threshold.

2) Based on the WTRU capability, the WTRU with the network could configure an optimal figure of merit for that WTRU according to the coverage area it is allocated in, which is called the reference figure of merit ($FOM_r$). This $FOM_r$ is computed based on a reference set of m parameters $\{p_{r,1}, p_{r,2}, \ldots, p_{r,m}\}$ that the WTRU and the network generate. This reference set could depend on the WTRU capability and would be changed according to the area that the WTRU is presented in. For example, the WTRU with certain capabilities that may receive a signal with certain strength and may support dynamic or semi-static EH signaling will have the information of the surrounding areas such as the frequencies, bands, available slots, . . . etc. The WTRU, then, with the network aid would calculate an optimum (reference) set of parameters that will be used as in the previous point to calculate the $FOM_r$. Next, the WTRU will proceed as in the first point to calculate the FOM of each (sub-)beams that it could be considered as a serving beam. To decide the best optimal (sub-)beam, these figures of merit could be compared to the reference FOM and the nearest one could be chosen. Alternatively, the nearest two FOMs to the reference FOM could be chosen then a different mapping function could be applied to the sets of parameters that are corresponding to these two (sub-)beams and to the reference set of parameters, then the new figures of merit could be compared to the new reference FOM. Also, as an Alternative, the two FOMs could be compared to each other and then the WTRU choose the highest/lowest according to a predefined criterion.

3) Based on a reference set of parameters that was mentioned in the previous point, the WTRU could calculate the FOM of the ith (sub-)beam with the aid of these reference set of parameters. The figure of merit of the ith (sub-)beam could be calculated as
$FOM_i=f(\{p_{r,1}, p_{i,1}\}, \{p_{r,2}, p_{i,2}\}, \ldots, \{p_{r,m}, p_{i,m}\})$ or each pair of parameters may be associated with a different function as $FOM_i=f(g_1(p_{r,1}, p_{i,1}), g_2(p_{r,2}, p_{i,2}), \ldots, g_m(p_{r,m}, p_{i,m}))$ where the function $f(\cdot)$ is used to combine the g's functions. For example, the FOM of the ith (sub-)beams could be computed as $FOM_i=\Sigma_k|p_{r,k}-p_{i,k}|^2$. After the calculation of the FOMs of different (sub-)beams that cover the WTRU, the WTRU will compare them and pick the largest/smallest or compare them to a certain threshold according to a predefine criterion. Alternatively, the WTRU may pick the best two (sub-)beams and perform different operation on them as in the last two points then decide based on that which one to pick.

Procedures Supporting Beamformed EH Signal Transmissions

This section handles the procedures that support beamformed EH signal transmissions with optimized energy harvesting efficiency. The procedures will cover beam detection aspects, per-beam semi-static default EH signal configuration (e.g. EH band hopping pattern, hop duration, pattern duration, . . . etc.), as well as the dynamic configuration of the per-beam/EH-band optimized EH signal (e.g. control signaling configuration, optimization method, and parameters associated with the EH optimization method).

In one embodiment, a WTRU equipped with an EH device utilizes, in a first step, the Uu air interface to receive configuration parameters pertaining to serving beam detection over the ZE air interface. In a second step, the WTRU utilizes its ZE receiver and operate over the ZE air interface to harvest energy and/or perform IDLE/INACTIVE mode operations. In a third step, the WTRU utilizes the beam detection configuration to identify the serving beam as it moves around the network.

The serving beam detection may be based on signaling received over the ZE common channel defined in section "Beamformed EH and Common Signaling Channel" and one or combination of the following parameters may be used as configuration to assist the WTRU in beam detection:

a. Fixed or beam dependent common channel configuration consisting of one of the following parameters:
   A global index to an EH sub-band within the system bandwidth that is dedicated for common ZE signaling,
   A local index to an EH sub-band within a fixed or dynamically changing beam-dependent EH band.
   A carrier frequency indicator along with the associated considered bandwidth,
   An OFDM subcarrier index and number of subcarriers within the system bandwidth b. Multiplexing configuration of the ZE common signaling channel and default EH signal consisting of one or combination of the following parameters:
   Multiplexing option, i.e. whether the considered EH sub-band (or defined common signaling channel band) is dedicated for common ZE signaling only or shared between common ZE signaling and default EH signaling.
   Multiplexing method, e.g. time multiplexed, frequency multiplexed, code multiplexed, or frequency and modulation type multiplexed.
   Modulation type(s), coding type(s), and transmission rate(s) considered for the common channel signal and the default EH signal.

c. —Beam identification parameters consisting of one or combination of the following:
   The channel used to carry beam identity signaling whether it is the common ZE signaling channel or the default EH signaling channel.
   Type and length of the sequences that are assigned uniquely for each beam
   Type and length of the unique sequence that is assigned for all the beams and order of time-multiplexed beam transmissions within a correlation window
   A synchronization frame/preamble characteristics used to identify the beginning of a sequence correlation window, e.g. duration of the frame, frame/preamble format/sequence, modulation type, transmission data rate.

Correlation window duration and gap between individual beams transmissions

A frame format containing the beam identifier as an explicit index.

In another embodiment, a WTRU equipped with an EH device utilizes the Uu air interface, in a first step, to report its EH circuitry capability in order to help serving cell(s) determine an appropriate/accommodating EH signal design/parameters. In a second step, the WTRU receives beam detection configuration over the Uu air interface. In a third step, the WTRU utilizes its ZE receiver and operate over the ZE air interface to harvest energy and/or perform IDLE/INACTIVE mode operations. In a fourth step, the WTRU utilizes the beam detection configuration to identify the serving beam as it moves around the network. In a fifth step, the WTRU may utilize the main transceiver or backscattering techniques to report the detected serving beam (i.e. declare WTRU's presence within a specific beam coverage) and allow the serving BS to optimize the EH signal characteristics within the detected beam.

The WTRU equipped with the EH device may use one or combination of the following parameters to report its EH circuitry/ZE receiver capability:

a. Number of supported EH sub-bands and their parameters, e.g. bandwidth associated with each sub-band and the distribution of sub-bands over the system bandwidth b. Number of concurrently supported EH sub-bands c. Synchronization capability and requirements, e.g. a preamble of specific duration and format is required to achieve a level of synchronization equivalent to a slot duration in a 15 Khz subcarrier spacing OFDM system d. EH sub-band switching delay, e.g. a duration equivalent to 2 OFDM symbols is required by the ZE receiver to switch between two different EH sub-bands.

e. An energy harvesting efficiency associated with each EH sub-band for a specific EH signal format.

In one technical realization, a WTRU may utilize its ZE transceiver to report a detected serving beam using backscattering techniques. In a first step, the WTRU receives a poll message with backscattering configuration (e.g. an offset duration, backscattering resource grid configuration, collision or collision-free resource access criteria). In a second step, the WTRU uses the backscattering configurations to determine when and at what frequencies (carriers/EH sub-bands) it may declare its presence. In a third step, the WTRU utilizes the interrogating carrier(s) at the determined time slot to declare its presence under the coverage of a specific beam by backscattering a unique identifier (e.g. C-RNTI, I-RNTI, s-TMSI, or a uniquely assigned ZE identifier). Alternatively, the identifier does not have to be WTRU-specific but WTRU capability-specific.

The beam detection reporting poll message may be transmitted over the ZE common signaling channel or using the default EH signal transmission configuration. Backscattering configuration and reporting procedures may follow any of known techniques. Beam detection reporting or WTRU's presence declaration under the coverage of a specific beam may be of interest to WTRUs that are characterized by low-to-no mobility.

In another embodiment, a WTRU equipped with an EH device/ZE receiver utilizes its main transceiver to receive beam detection configuration as well as (beam identifier) to (semi-static default EH signal configuration) mapping over the Uu air interface where the beam identifier might be unique within a single cell or across multiple cells. The semi-static default EH signal configuration may be optimized by the BS to provide efficient energy harvesting for the served WTRUs based on the historical traffic and scheduling statistics of transmitted information signals per beam. Alternatively, the semi-static configuration may be utilized by the network to limit unauthorized access to its resources for energy harvesting purposes. The mapping information may include one or combination of the following elements:

a. Beam support of dynamic optimization of the energy harvesting efficiency based on the information signals to be transmitted within a considered EH band b. Common signaling channel configuration, e.g. an EH sub-band index within an allocated EH band, type of modulation and coding, transmission rate c. Default EH signaling configuration, e.g. type of multiplexing with the common signaling channel, type of modulation and coding, transmission rate d. An EH band hopping pattern consisting of an EH band index, a duration for each hop, and a pattern periodicity.

e. Configuration of the EH bands within a hopping pattern, e.g. bandwidth of each band, number of EH sub-bands within each band, bandwidth of each sub-band f. A validity period for each beam's mapping information g. Indexing information for multiple mappings associated with the same beam A WTRU detecting a beam identifier and determining beam's support of dynamic optimization of the energy harvesting efficiency may receive any of the information elements/parameters associated with the EH efficiency enhancement approaches and presented in previous section "EH Device Configuration" either over the ZE common signaling channel or default EH signaling channel to determine the characteristics of the optimized EH signal transmission that will maximize its energy harvesting efficiency.

Figure 22:
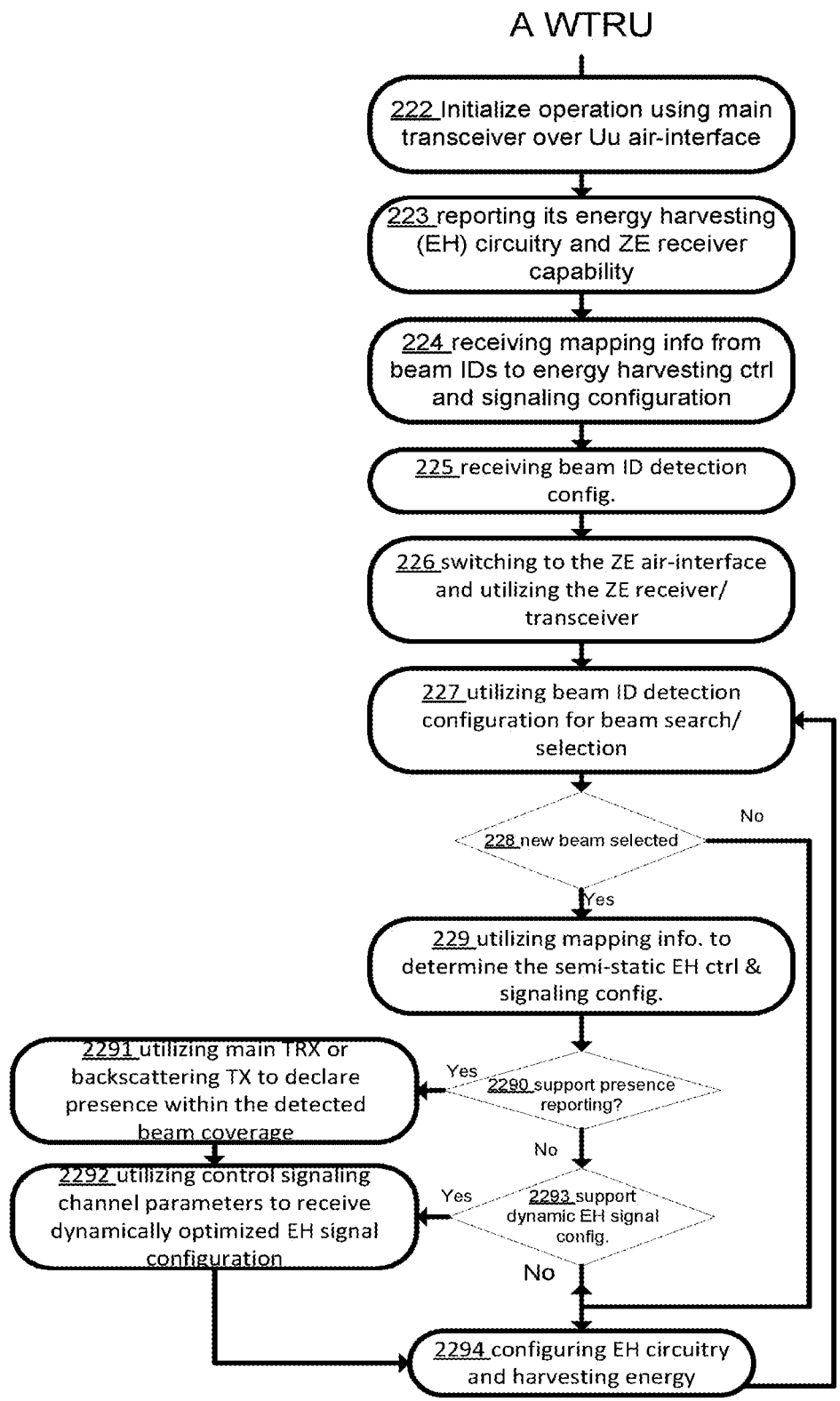
FIG. 22 is a flow chart describing an embodiment of a WTRU decision sequence for optimized beamformed energy harvesting.

In another embodiment described as a flow chart in FIG. 22, a WTRU equipped with an EH device/ZE receiver and supporting beamformed energy harvesting initializes, in 222, cellular operation using its main transceiver over the Uu air-interface. In 223, the WTRU reports its EH circuitry and ZE receiver capability to the serving BS/network. In 224, the WTRU receives one-to-one or one-to-many mapping information from beam identifiers to EH control and signaling configuration. Additionally, the WTRU receives (225) beam identifiers detection configuration. In 226, the WTRU switches to the ZE air-interface and utilizes the ZE receiver/transceiver for energy harvesting and/or performing IDLE/INACTIVE mode operations. In 227, the WTRU utilizes the beam identifiers detection configuration, that might or might not be beam specific, for serving beam search/selection. In 228, the WTRU may detect and select a new beam identifier and utilize 229 the mapping information to determine a semi-static EH control and signaling configuration. Then, a WTRU, supporting presence declaration/reporting under the coverage of a specific beam, may determine the serving BS/network support of that feature and if supported (2290—Yes), subsequently utilizes (2291) either its main transceiver or a backscattering transmitter to declare its presence within a detected beam coverage. Alternatively, if the WTRU does not support presence declaration/reporting under the coverage of a specific beam (2290—No), the WTRU checks (2293) its support of dynamic EH signal configuration as well as the serving BS/network support. In 2292, a WTRU, supporting dynamic EH signal configuration (2293—Yes), utilizes control signaling channel parameters to receive dynamically optimized EH signal configuration. In a ninth step, the WTRU either utilizes the semi-static or the dynamically optimized EH signal parameters to configure (2294) its EH circuitry and initiates energy harvesting.

Figure 23:
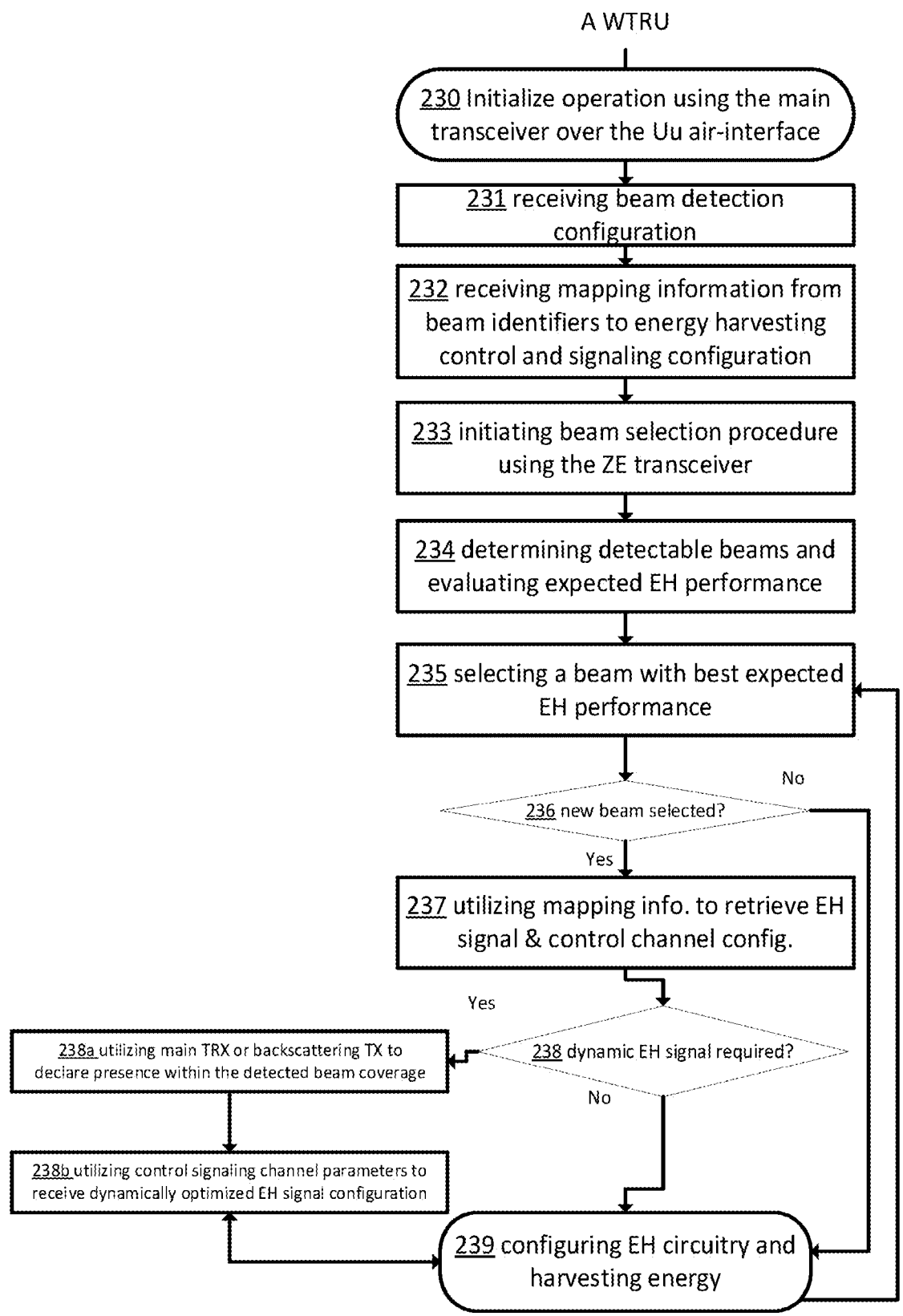
FIG. 23 is a flow chart describing a further embodiment of a WTRU decision sequence for optimized beamformed energy harvesting.

In a different embodiment shown in FIG. 23, a WTRU initializes (230) operation using the main transceiver over the Uu air-interface. In 231, the WTRU receives beam detection configuration and in 232 mapping information. In 233, the WTRU initializes beam (re-)selection procedure using the ZE transceiver. In 234, the WTRU utilizes the received beam detection configuration to determine detectable beam IDs where detectability might be determined based on beam-specific received reference signal strength greater than a threshold. Then, in 237, it utilizes the received (available) mapping information to retrieve EH signaling configuration, e.g. the semi-static default EH signaling configuration, the support of dynamic EH signaling, and the dynamic EH signaling configuration. In 234, the WTRU determines the expected EH performance for each detected beam e.g. utilizing the received signal strength measurements as well as the determined EH signaling configuration. In 235, the WTRU selects (236—Yes) the beam with best expected EH performance based on number of EH occasions/resources configured, additional EH resources margin, and measured received signal strength. Alternatively, selection in 235 can be based (236—No) on a most optimized EH signal configuration (semi-static/default and/or dynamic) for the WTRU's device capability at a measured received signal strength. Then, on a condition 238—Yes that WTRU determines necessity of dynamic EH signaling for the selected beam, e.g. based on the evaluation of the actual EH performance, proceeds in 238a with presence declaration procedure to request optimized dynamic EH signaling. Alternatively, proceeding with presence declaration might be contingent on WTRU determining it beneficial in terms of overall EH performance, e.g. taking into account current mobility status and expected power consumption associated with presence declaration (determining an expected EH performance gain over a case where PD is not performed (e.g. ratio of expected EH performance with PD to no PD is greater than a threshold)). In 238b, the WTRU utilizes control signaling channel parameters to dynamically receive optimized EH signal configuration, and configures in 239 its EH circuitry, and harvest energy. Alternatively (238—No), the WTRU configures in 239 its EH circuitry utilizing the semi-static default EH signal configuration and harvests energy.

Figure 24:
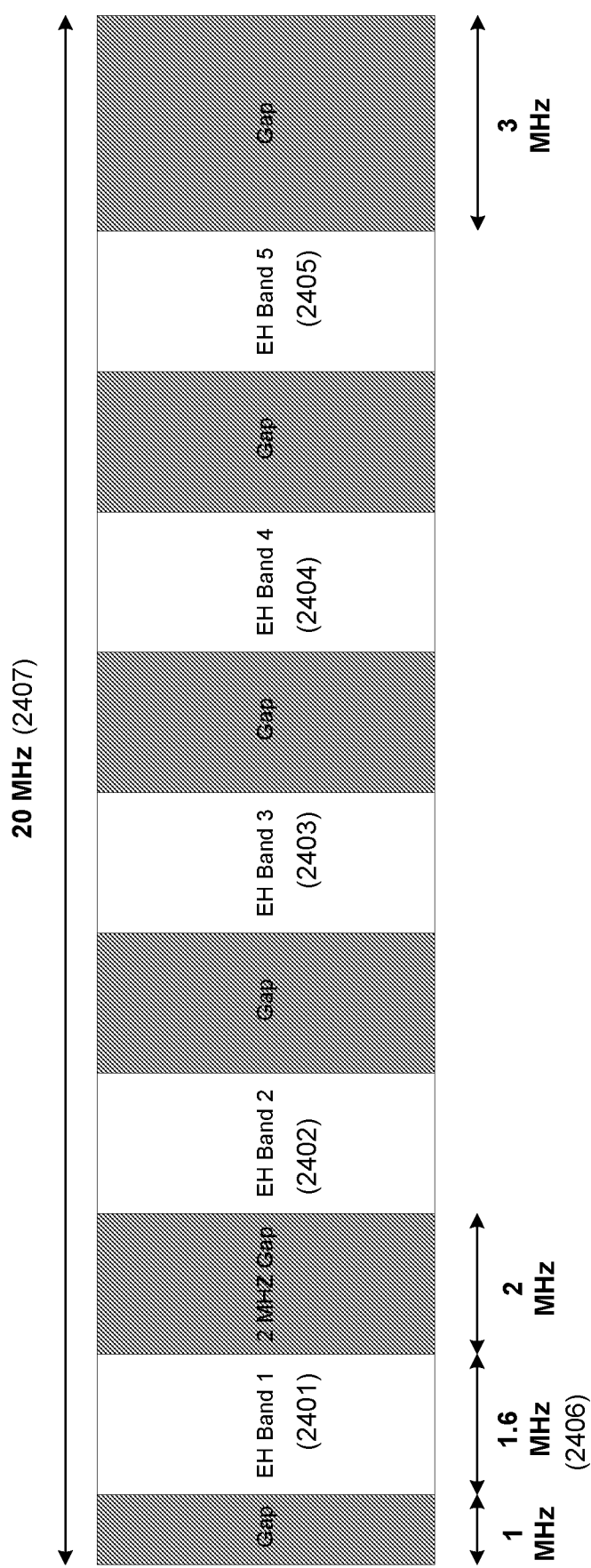
FIG. 24 is an example system configuration illustrating potential distribution of EH bands and their frequency allocation.

For the next technical realizations is considered the following system configuration as defined by the network. Each cell in the network is supporting a total number of N=5 beams with beam IDs∈{0, 1, . . . , 4} that can be transmitted simultaneously, a system bandwidth of 20 MHZ (2407) that is divided into 50 sub-bands each of 400 KHz, a total of five EH bands (2401-2405) each consisting of 4 sub-bands for a total of 1.6 MHz bandwidth (2406) for each band. The example system configuration is described in FIG. 24. The configuration of EH bands, sub-bands, common signaling channel, and default EH signaling channel can be provided by the network as fixed configuration or updated periodically based on the served UEs' reported energy harvesting circuits capabilities.

Additionally, and without loss of generality, it is assumed that beam (0) has the following semi-static EH signaling configuration without dynamic EH signaling support:
  a. EH band hopping pattern with sub-band (3) dedicated for both common channel and default EH signaling It is also assumed that beam (i) has the following semi-static and dynamic EH signaling configuration:
  a. EH band hopping pattern with sub-band (1) identified for both common channel and default EH signaling
  b. EH sub-band (1) may be shared by EH signaling and information signal(s) transmissions
  c. EH sub-band hopping is chosen as the dynamic EH enhancement approach where information signal transmissions are utilized to optimize power transfer.

It is additionally assumed that beam (N-1) has the following semi-static and dynamic EH signaling configuration:
  a. EH band hopping pattern with sub-band (2) identified for both common channel and default EH signaling
  b. EH sub-band (2) may be shared by EH signaling and information signal(s) transmissions
  c. Fixed EH sub-band with auxiliary signal enhancement is chosen as the dynamic EH enhancement approach where information signal transmissions within the selected EH sub-band are complemented by auxiliary signal(s) to optimize power transfer efficiency.

Figure 25:
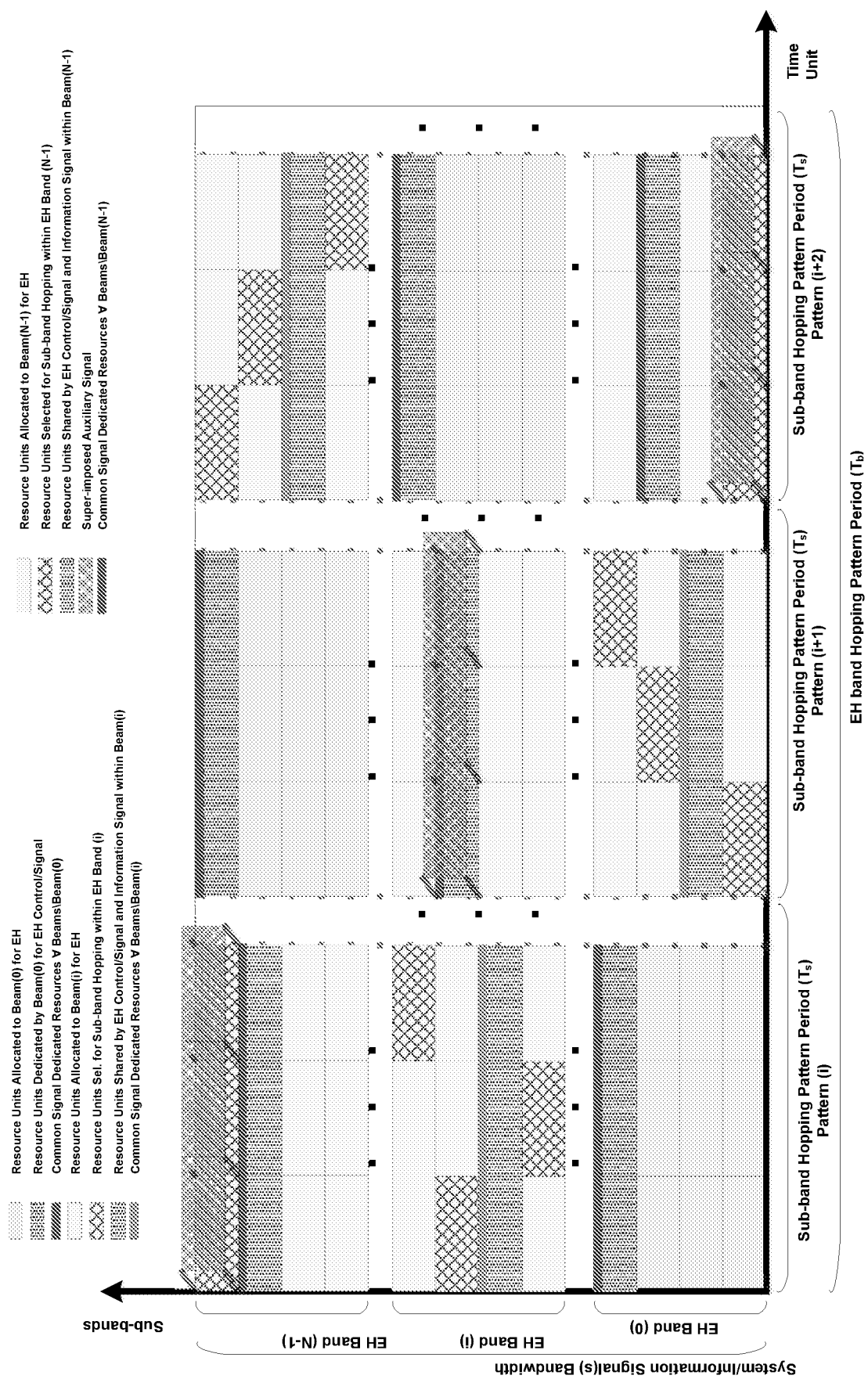
FIG. 25 is an example EH band, EH sub-band, common and default EH signaling channels, and dynamic EH enhancement configuration.

FIG. 25 shows the example system, EH bands, sub-bands, common signaling channel, default EH signaling channel, and dynamic EH enhancement approaches described above.

For the following set of technical realizations, it is also assumed the following set of steps to be in common. A WTRU under the coverage of a specific beam (i), utilizes its main transceiver to report its EH circuitry and ZE receiver capabilities over the Uu air-interface. The WTRU then receives one-to-one or one-to-many mapping information from different beams identifiers to semi-static common and default EH signaling configuration as well as beam identifier detection configuration over the Uu air-interface. Afterwards, the WTRU utilizes its ZE receiver and switches to operation over the ZE air-interface.

In a first technical realization is considered a WTRU that is located under the coverage of beam (0) where the common and default EH signaling channels are transmitted over the same EH sub-band, but are time multiplexed. The WTRU utilizes the beam identifier detection configuration and mapping information to determine that for beam (0), beam identifiers are encoded as a sequence that is transmitted over the common signaling channel. In a second step, the WTRU uses the beam detection configuration to keep track of the current serving beam. The WTRU then, in a third step, utilizes the mapping information associated with beam (0) to determine the semi-static configuration of the default EH signaling. In a fourth step, the WTRU determines that the current serving beam does not support dynamic EH enhancement. In a final step, the WTRU configures its EH circuitry and initiate energy harvesting from the default EH signaling channel.

In a second technical realization, is considered a WTRU that is located under the coverage of beam (i) where the common and default EH signaling channels are transmitted over the same EH sub-band and are frequency multiplexed. The WTRU, in a first step, utilizes the beam identifier detection configuration and mapping information to determine that for beam (i), beam identifiers are encoded as a sequence that is AM modulated and transmitted over the common signaling channel, and optimized EH signal configuration are dynamically transmitted over the default EH signaling channel using OOK modulation. In a second step, the WTRU utilizes an AM demodulator to detect the beam identifier and keep track of the current serving beam. In a third step, the WTRU utilizes the mapping information associated with beam (i) to determine that current serving beam supports dynamic EH enhancement. The WTRU, in a fourth step, utilizes self-mixing architecture (which can enhance the detection of an OOK signal in the presence of a nearby strong narrowband interferer, i.e. the AM modulated common channel signal) to decode/detect the control signal transmitted over the default EH signaling channel and determine the configuration of the optimized EH signal, e.g. a sub-band hopping pattern and a hop duration. In a fifth step, the WTRU configures its EH circuitry and initiates energy harvesting utilizing the optimized EH signal configuration. Alternatively, the WTRU may try to harvest energy from both the default EH signal as well as the optimized EH signal.

In a third technical realization, is considered a WTRU that is located under the coverage of beam (i) where the common and default EH signaling channels are transmitted over the same EH sub-band and are frequency multiplexed. Specifically, EH sub-band (1) contains the default EH signal from beam (i) as well as the sequence encoded beam identifier(s) of all other beams b∈ {0, 1, . . . , N−1}i that is transmitted over the common signaling channel. The WTRU, in a first step, utilizes the mapping information associated with beam (i) to determine that current serving beam supports dynamic EH enhancement. The WTRU, in a second step, decodes/detects the control signal transmitted over the default EH signaling channel and determine the configuration of the optimized EH signal, e.g. a sub-band hopping pattern and a hop duration. In a third step, the WTRU configures its EH circuitry and initiates energy harvesting utilizing the optimized EH signal configuration. The WTRU then, in a fourth step, keep tracking the harvested energy level till it falls below a pre-configured or periodically signaled threshold. In a fifth step, the WTRU utilizes the common signaling channel in EH sub-band (1) to detect the beam identifier of a new serving beam (0). In a final step, the WTRU utilizes the mapping information to determine that the new serving beam only supports default EH signaling and determine the semi-static configuration of that default EH signal, configures its EH circuitry, and initiates energy harvesting.

In another embodiment, a WTRU initiates a (sub-)beam (re-)selection procedure periodically or detects that the FOM of its serving beam is above/below a certain threshold. The WTRU, in a first step, receives reference signals from the nearest (sub-)beams, where each (sub-)beam transmits a unique reference signal. In a second step, the WTRU based on the received reference signals, determines the strength of the received signal from each (sub-)beam. The WTRU, in a third step, retrieves and/or receive a set of parameters for each (sub-)beam such as the EH signal configuration consisting of number of EH occasions, corresponding resources and POW format within a configured window. In a fourth step, the WTRU will map the information of each (sub-) beam to a set of parameters that are used to compute the FOM for each (sub-)beam as in previous section "(Sub-) beam (re-)selection". In a fifth step, the WTRU, according to its capability, will determine the best way to perform the calculation of the FOM such as the examples in the previous section "(Sub-)beam (re-)selection". In a sixth step, the WTRU, according to the criteria used in the FOM calculations, will select a new (sub-)beam or choose to retain the current serving one. If a new (sub-)beam is selected, the WTRU, in a seventh step, will retrieve the semi-static default EH signal configuration of the selected (sub-)beam from the mapping information, otherwise the WTRU will skip to the ninth step. If the WTRU and the network support dynamic EH signaling, the WTRU in an eighth step will receive beam-specific common control message(s) with dynamically changing parameters of an optimized EH signal such as the EH sub-band hopping pattern with the bandwidth and duration of each hop and the pattern length, otherwise the WTRU skips to the ninth step. In a ninth step, the WTRU will configure its EH circuitry to harvest energy from the default semi-static and/or dynamically optimized EH signal.

In an embodiment, a WTRU initiates beam (re-)selection procedure periodically or based on a current serving beam EH Performance Indicator (PI). In a first step, the WTRU utilizes beam detection configuration to determine the identifiers of nearby beams to be considered for evaluation. In a second step, the WTRU utilizes beam-specific reference signal configuration to measure the received signal strength of the detected nearby beams. In a third step, the WTRU utilizes the available mapping information to retrieve EH signaling configuration, e.g. the semi-static default EH signaling configuration, the support of dynamic EH signaling, and the dynamic EH signaling configuration. In a fourth step, the WTRU determines the EH PI for each beam utilizing the received signal strength measurements as well as the EH signaling configuration. The WTRU then determines the beam with largest EH PI, retrieves its semi-static EH signaling configuration, determines its support of dynamic EH signaling, and retrieves its common channel signaling configuration. In a fifth step, the WTRU receives a common control message indicating WTRU's Presence Declaration (PD) requirement for the beam to initiate dynamic EH signaling. In a sixth step, the WTRU evaluates the beam's EH PI using it semi-static EH signaling configuration only. On the condition that the default semi-static EH signaling configuration is determined sufficient, e.g. EH PI>$T_c$ for a signaled or preconfigured threshold $T_c$, the WTRU selects the beam and proceeds with energy harvesting from the default semi-static only. Otherwise, the WTRU considers its mobility status, which is associated with a scale factor $M_s$ that is might be signaled from the network or preconfigured at the WTRU, and PD energy requirements to determine the return on EH PI when considering PD. On the condition that the WTRU determines high return on PI, e.g.

$$\frac{PI_{PD}}{PI_{no,PD}} > M_s T_g$$

>$M_s T_g$ where $T_g$ is a gap threshold which might be signaled from the network or preconfigured at the WTRU, it selects the determined beam for energy harvesting. In a seventh step, the WTRU utilizes backscattering or main transceiver to declare its presence and receive beam-specific common control messages with dynamically changing parameters of an optimized EH signal. In an eighth step, the WTRU configures its EH circuitry to harvest energy from the default semi-static and/or dynamically optimized EH signals.

EH-Aware RRC Connected State Beam Management

Figure 26:
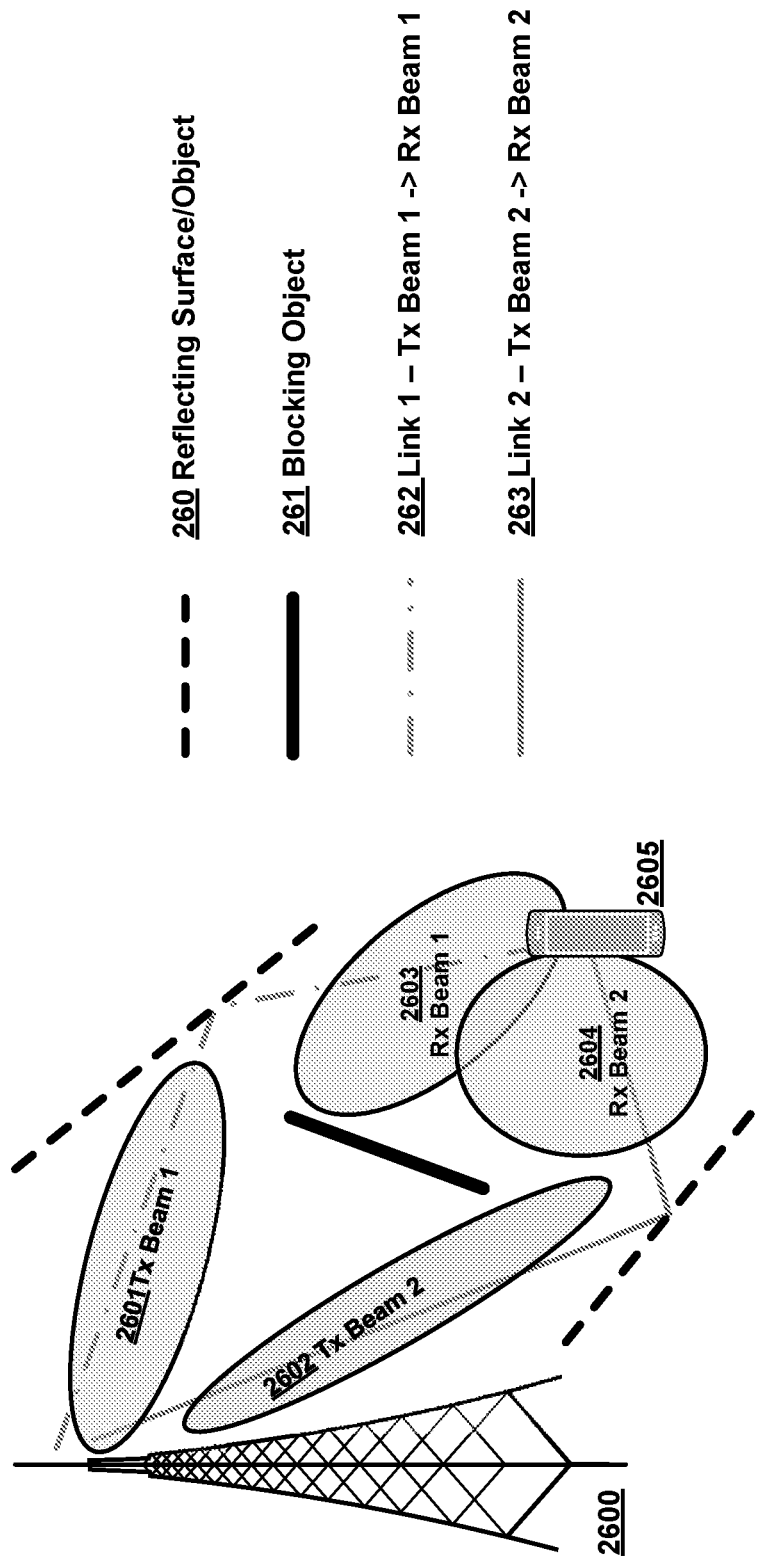
FIG. 26 is an exemplary NLOS information/energy transfer scenario where an optimal information transfer link is different than an energy transfer link.

In this section are discussed the procedures that support beam management for WTRUs that are in RRC_Connected state while taking into account the WTRUs' EH requirements. This contrasts with beam tracking procedures in RRC_Idle/Inactive states presented in the previous section. The purpose of this section is to enable efficient and optimized beamformed information and energy transfer when the WTRU is in RRC connected state. This is particularly interesting when the WTRU is operating in a non-line-of-sight (NLOS) environment due to the fact that utilization of beam-specific default EH signaling configuration, as discussed in prior sections, in conjunction with directional transmit/receive beams in NLOS environments can result in discrepancy between information and energy transfer goals. As an example, considering the scenario shown in FIG. 26 where the UE/WTRU (2605) can receive a signal from the serving BS (2600) over two different links, Link 1 (262) constituting of transmit beam 1 (2601) and receive beam 1 (2603) whereas Link 2 (263) constitutes of transmit beam 2 (2602) and receive beam 2 (2604). In this example, even though the measured received signal strength determined by L1-RSRP over Link 1 might be larger than the corresponding one for Link 2, the expected EH PI associated with Link 1 might be worse than that associated with Link 2 due to the different EH signaling configuration associated with transmit beams 1 and 2. Therefore, Link 1 might be optimal for information transfer whereas Link 2 might be optimal for energy transfer. Further in this example, it is assumed for simplicity that the WTRU may consider only one beam for a single function, but this does not have to be the case.

According to an embodiment, a WTRU equipped with an EH device and which is currently in RRC_Connected state (see for example FIG. 27 step 2700) utilizes, in a first step (see for example FIG. 27 step 2701), the Uu air interface to report its EH circuitry capability as part of its WTRU capability and receive (see for example FIG. 27 step 2703) configuration parameters pertaining to beam detection, measurements, and reporting as well as any mapping information for default/dynamic energy harvesting over the ZE air interface. In a second step, corresponding to an initializing operation in the RRC_Connected state (e.g., FIG. 27 step 2700), the WTRU utilizes its ZE receiver/transceiver and operate over the ZE air interface to harvest energy and/or perform Connected mode operations. Alternatively, the WTRU might utilize the ZE air-interface for energy harvesting only while the Uu air-interface is utilized for legacy RRC_Connected state operations. In a third step (being a summary of the further steps that occur in any of the technical realizations below), the WTRU utilizes the beam detection, measurements, and reporting configuration to assist the serving cell in beam determination and indication as part of beam management procedure.

Beam measurement reporting can either utilize the Uu or ZE air-interface where backscattering technique can be utilized with the ZE air-interface. Beam detection and measurement configuration over the ZE air-interface as well as parameters corresponding to EH circuitry/ZE receiver capability are presented in the previous section "Procedures supporting beamformed EH signal transmissions".

For the purpose of describing the following set of embodiments corresponding to technical realizations, the set of steps in the previous embodiment are assumed to be in common, and are not further described when discussing the following set of embodiments illustrated in FIGS. 27-33; the step numbering in the text describing FIGS. 27-33 therefore restarts from one (e.g., "first step").

Figure 27:
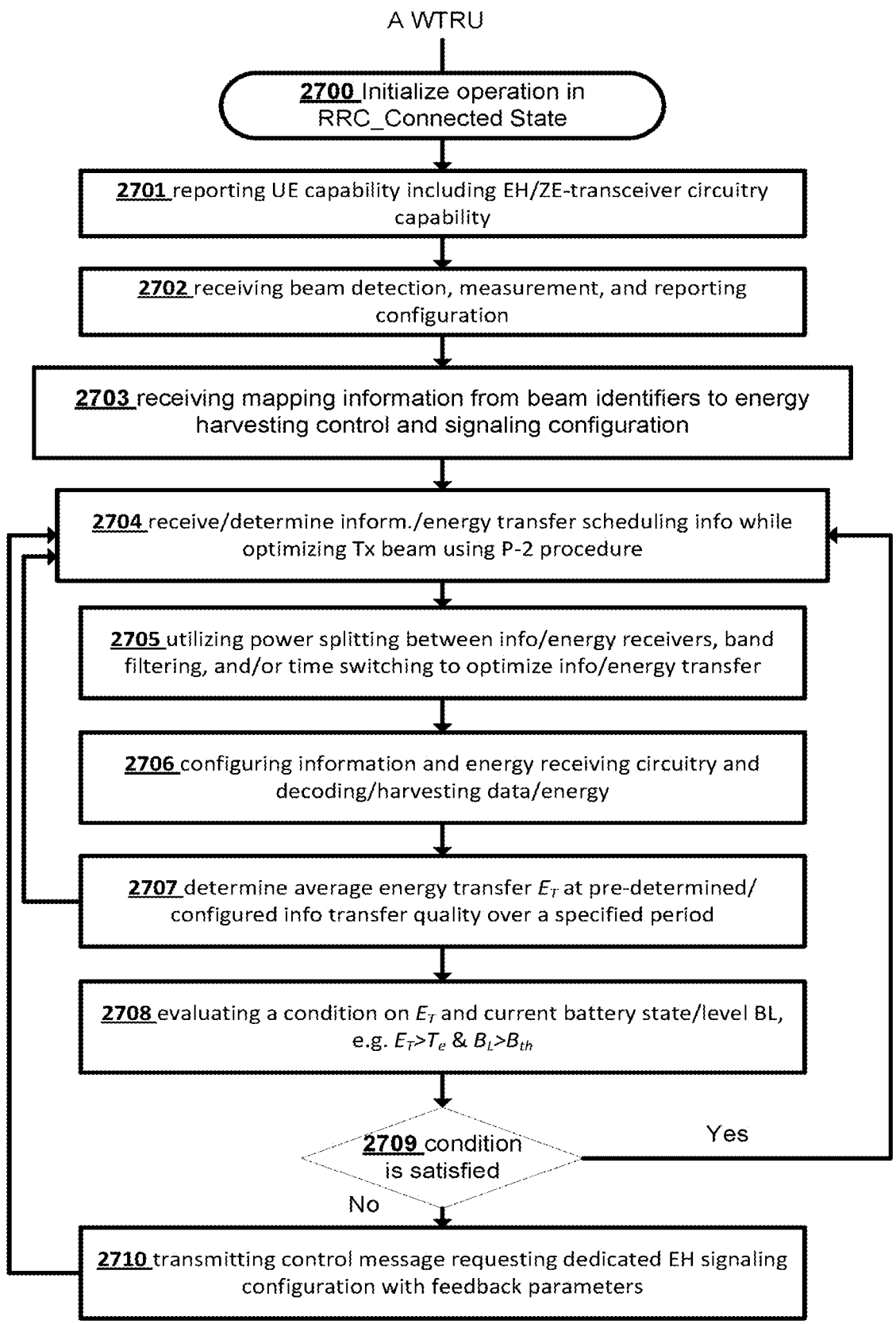
FIG. 27 is a flow chart describing a dedicated EH signaling configuration request capable WTRU's decision sequence for optimized beamformed energy harvesting when the WTRU is equipped with an omni-directional receiving antenna.

In a first technical realization depicted in FIG. 27, is considered an omni-directional reception WTRU that is capable of requesting dedicated EH signaling configuration, i.e. based on its subscription or class, to optimize energy transfer where information transfer scheduled resources collides mostly with default semi-static/dynamic EH signaling resources of the serving transmit beam. The WTRU, in step 2704, receives information transfer scheduling information while optimizing received signal strength for the transmit beam using P2 beam sweeping procedure. In a step 2705, the WTRU utilizes beam-to-EH signaling mapping information and power splitting between information and energy receivers to optimize energy transfer. The WTRU then, in a step 2706, utilizes default semi-static/dynamic EH signaling and/or dedicated EH signaling configuration for energy transfer while receiving information. In a step 2707, the WTRU determines the average energy transfer efficiency under a desired/specified information transfer quality over a predetermined/configured period of time. Next 2708, the WTRU evaluates a condition on the determined average energy transfer $E_T$ and current battery state/level $B_L$, e.g. $E_T > T_e$ and battery level $B_L > B_{th}$ for predetermined/configured thresholds $T_e$ and $B_{th}$. If the condition is satisfied (2709—Yes), the WTRU repeats steps 2704 through 2708. Otherwise (2709—No), the WTRU in a step 2710 transmits a control message over PUCCH requesting dedicated EH signaling configuration over the serving transmit beam where the control message may include additional information/measurements such as current received signal strength for the transmit/receive beam pair, current battery state/level, a considered power splitting ratio, and/or current experienced average energy harvested.

In a second technical realization also depicted in FIG. 27, is considered an omni-directional reception WTRU that is capable of requesting dedicated EH signaling configuration, i.e. based on its subscription or class, to optimize energy transfer where information transfer scheduled resources collides with default semi-static/dynamic EH signaling resources of the serving transmit beam in time/frequency but not frequency/time domain. The WTRU, in a step 2704, receives information transfer scheduling information while optimizing received signal strength for the transmit beam using P2 beam sweeping procedure. In a step 2705, the WTRU utilizes beam-to-EH signaling mapping information and band filtering/time switching techniques to optimize info/energy transfer by separating power associated with information/energy transfer between information and energy receivers. The WTRU then, in a step 2706, utilizes default semi-static/dynamic EH signaling and/or dedicated EH signaling configuration for energy transfer while receiving information. In a step 2707, the WTRU determines the average energy transfer efficiency under a desired/specified information transfer quality over a predetermined/configured period of time. Next (2708), the WTRU evaluates a condition on the determined average energy transfer $E_T$ and current battery state/level $B_L$, e.g. $E_T > T_e$ and battery level $B_L > B_{th}$ for predetermined/configured thresholds $T_e$ and $B_{th}$. If the condition is satisfied (2709—Yes), the WTRU repeats steps 2704 through 2708. Otherwise (2709—No), the WTRU in a step 2710 transmits a control message over PUCCH requesting dedicated EH signaling configuration over the serving transmit beam where the control message may include additional information/measurements such as current received signal strength for the transmit/receive beam pair, current battery state/level, a considered power splitting ratio, and/or current experienced average energy harvested.

Figure 28:
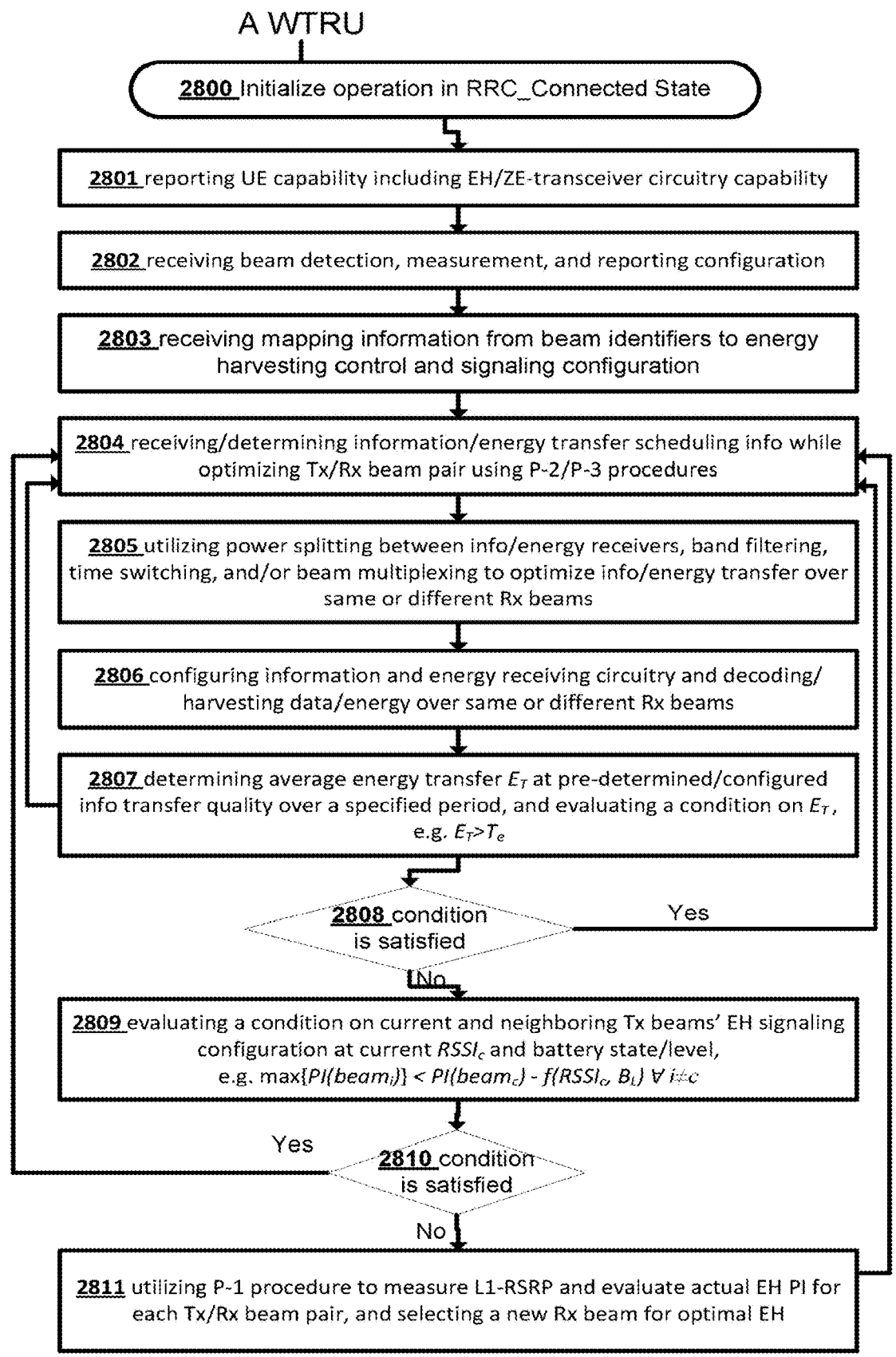
FIG. 28 is a flow chart describing a WTRU's decision sequence for optimized beamformed energy harvesting when the WTRU is capable of simultaneous reception over two or more beams.
Figure 29:
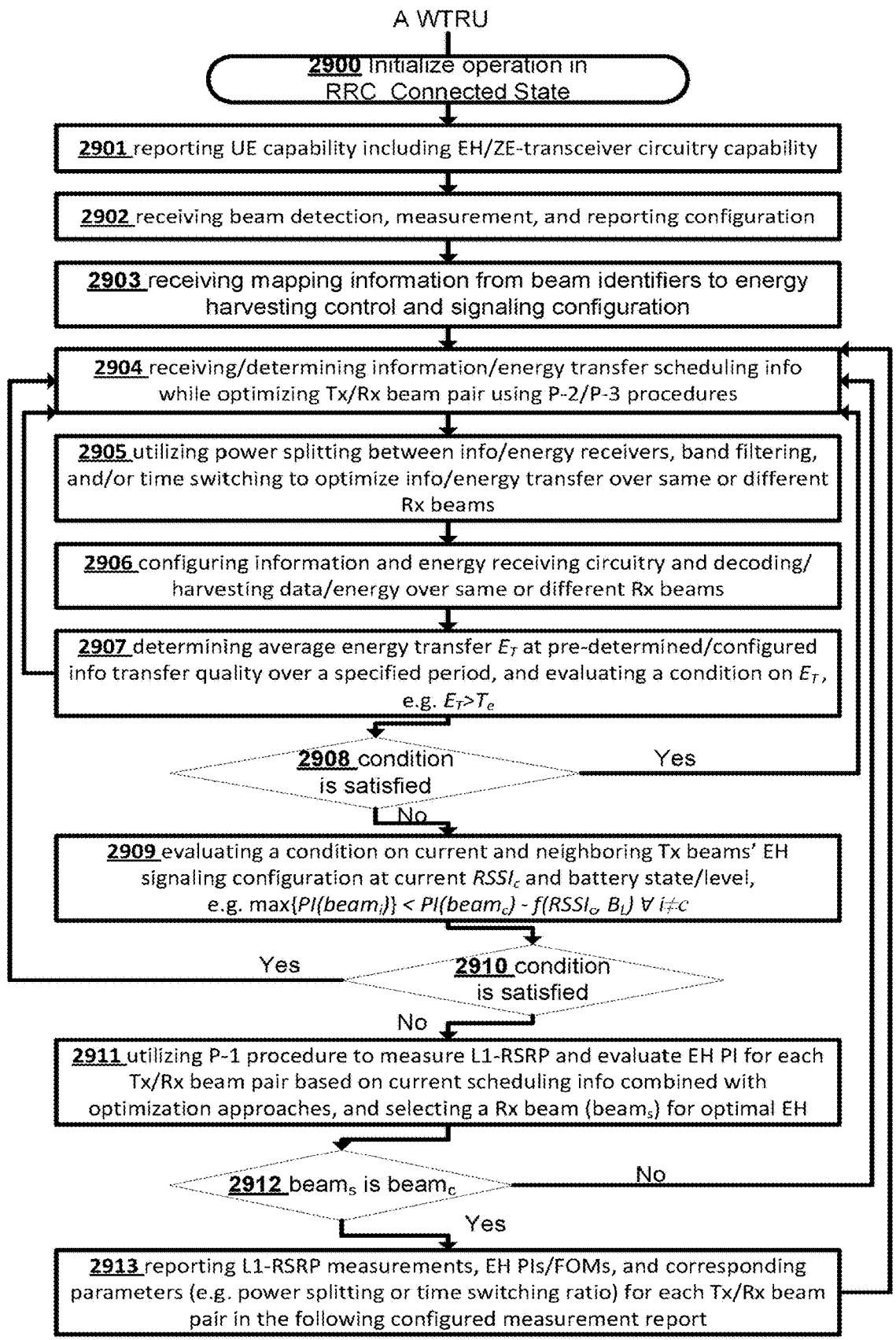
FIG. 29 is a flow chart describing a WTRU's decision sequence for optimized beamformed energy harvesting when the WTRU is capable of time-switched-based beamformed reception.

In a third technical realization depicted in FIG. 28, is considered a WTRU that is not capable of requesting dedicated EH signaling configuration, i.e. based on its subscription or class, to optimize energy transfer but is capable of simultaneous reception over two beams. The WTRU, in a step 2804, receives information transfer scheduling information while optimizing received signal strength for the transmit/receive beam pair using P2/P3 beam sweeping procedures. In a step 2805, the WTRU optimizes energy transfer utilizing beam-to-(default) EH signaling mapping information and one or combination of the following approaches based on one of the corresponding scenarios:

Power splitting between information and energy receivers when scheduled information and energy transfer resources overlap entirely/mostly in both time and frequency over the same receive beam;

Frequency band (e.g. one or more resource blocks) filtering when scheduled information and energy transfer resources overlap entirely/mostly in time but not frequency over the same receive beam;

Time switching between information and energy transfer utilizing the same or different receive beams when scheduled information and energy transfer time resources do not overlap;

Beam multiplexing when optimal information and energy transfer correspond to different optimal receive beams regardless of the time/frequency scheduled resources configuration for both information and energy transfer.

The WTRU then, in a step 2806, utilizes default semi-static/dynamic EH signaling for energy transfer while receiving information on the same or different receive beams. In a step 2807, the WTRU determines the average energy transfer efficiency under a desired/specified information transfer quality over a predetermined/configured period of time. Next (2808), the WTRU evaluates a condition on the determined average energy transfer $E_T$, e.g. $E_T > T_e$ for predetermined/configured threshold $T_e$. If the condition is satisfied (2808—Yes), the WTRU repeats steps 2804 through 2807. Otherwise (2808—No), the WTRU in a step 2809 evaluates a condition on current and neighboring transmit beams' EH signaling configuration at current received signal strength and battery state/level, e.g. $\max\{\text{EH PI}(\text{beam}_i)\} < \text{EH PI}(\text{beam}_c) - f(\text{RSSI}_c, B_L) \forall i \neq c$ where $\text{EH PI}(\cdot)$ is an expected EH performance indication based only on EH signaling configuration, and $f(\cdot)$ is a monotonically decreasing or increasing function of current beam's received signal strength ($\text{RSSI}_c$) at a fixed value of current battery state/level $B_L$ and monotonically increasing or decreasing function of current battery state/level $B_L$ at a fixed value of $\text{RSSI}_c$. If the previous condition is satisfied (2810—Yes), the WTRU repeats steps 2804 through 2809. Otherwise (2810—No), the WTRU in a step 2811 utilizes the P1 beam sweeping procedure to measure L1-RSRP for each transmit/receive beam pair, evaluate actual (not expected) EH PI/FOM for each beam pair, and select a new receive beam for optimal energy harvesting, which might be different than the current receive beam used for EH and the one used for information transfer.

In a fourth technical realization depicted in 29, is considered a WTRU that is not capable of requesting dedicated EH signaling configuration, i.e. based on its subscription or class, to optimize energy transfer but is capable of time-switched-based beamformed reception. The WTRU, in a step 2904, receives information transfer scheduling information while optimizing received signal strength for the transmit/receive beam pair using P2/P3 beam sweeping procedures. In a step 2905, the WTRU optimizes energy transfer utilizing beam-to-(default) EH signaling mapping information and one or combination of the following approaches based on one of the corresponding scenarios:

Power splitting between information and energy receivers when scheduled information and energy transfer resources overlap entirely/mostly in both time and frequency over the same receive beam;

Frequency band (e.g. one or more resource blocks) filtering when scheduled information and energy transfer resources overlap entirely/mostly in time but not frequency over the same receive beam;

Time switching between information and energy transfer utilizing the same or different receive beams when scheduled information and energy transfer time resources do not overlap.

The WTRU then, in a step 2906, utilizes default semi-static/dynamic EH signaling for energy transfer while receiving information on the same receive beam or different receive beams with beam switching over time. In a step 2907, the WTRU determines the experienced average energy transfer efficiency under a desired/specified information transfer quality over a predetermined/configured period of time. Next (2908), the WTRU evaluates a condition on the determined average energy transfer $E_T$, e.g. $E_T > T_e$ for predetermined/configured threshold $T_e$. If the condition is satisfied (2908—Yes), the WTRU repeats steps 2904 through 2907. Otherwise, the WTRU in a step 2909 evaluates a condition on current and neighboring transmit beams' EH signaling configuration at current received signal strength and battery state/level, e.g. $\max\{\text{EH PI}(\text{beam}_i)\} < \text{EH PI}(\text{beam}_c) - f(\text{RSSI}_c, B_L) \forall i \neq c$. If the previous condition is satisfied (2910—Yes), the WTRU repeats steps 2904 through 2909. Otherwise, the WTRU in a step 2911 utilizes the P1 beam sweeping procedure to measure L1-RSRP for each transmit/receive beam pair, evaluate actual (not expected) EH PI/FOM for each beam pair based on current information transfer scheduling information and one or combination of the power splitting, band filtering, or time switching information/energy transfer optimization approaches, and select a new receive beam for optimal energy harvesting. On a condition that the new selected transmit/receive beam pair for EH is determined the same as the prior one (2912—Yes), the WTRU reports (2913) L1-RSRP measurements, EH PI/FOM, and corresponding parameters (e.g. power splitting or time switching ratio or band filtering configuration) for each beam pair in the following configured measurement report. Otherwise (2912—No), return is to step 2904.

Figure 30:
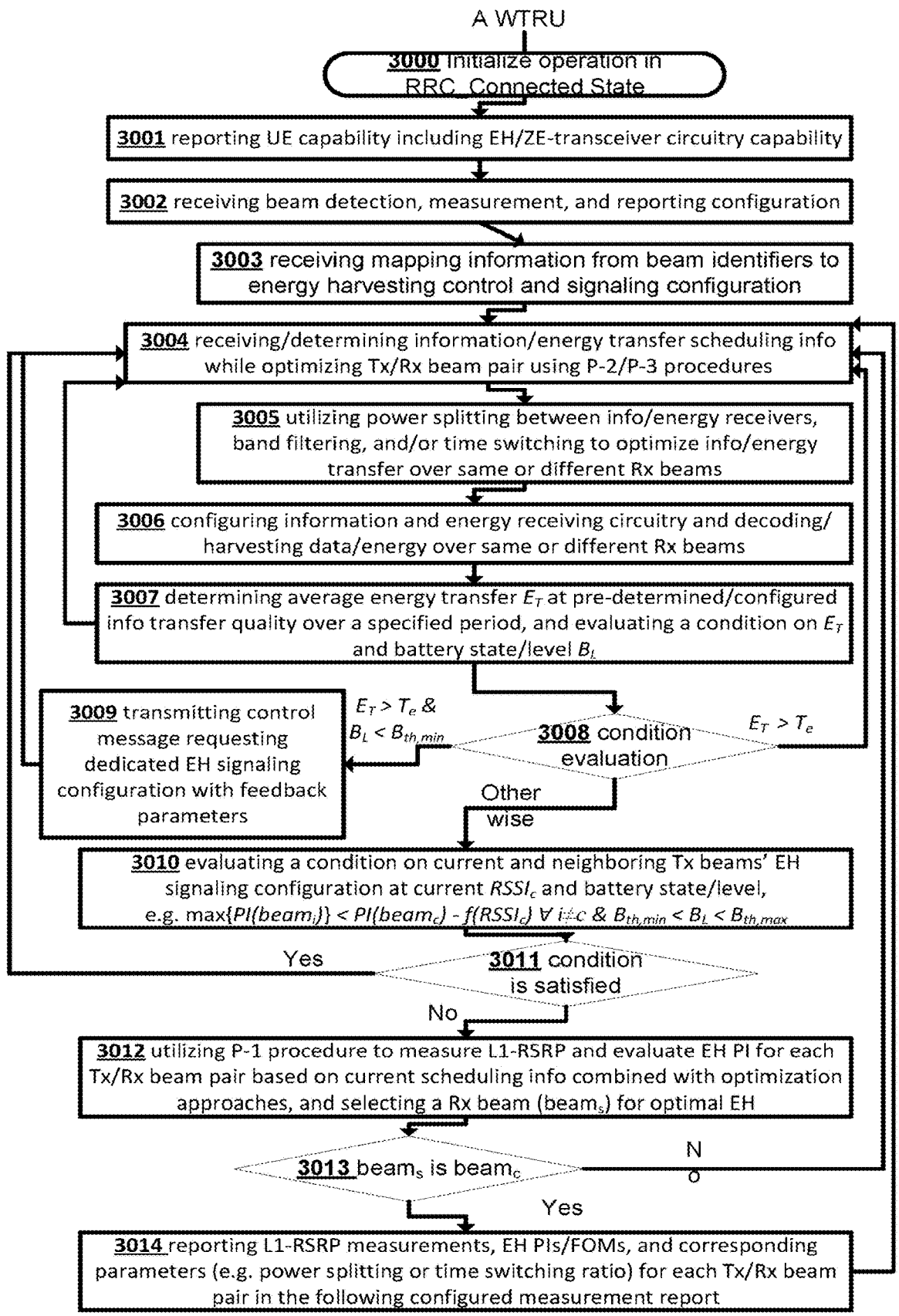
FIG. 30 is a flow chart describing a WTRU's decision sequence for optimized beamformed energy harvesting when the WTRU is capable of time-switched-based beamformed reception as well as dedicated EH signaling configuration request.

In an alternative to the fourth technical realization, depicted in FIG. 30, the WTRU is capable of requesting dedicated EH signaling configuration, i.e. based on its subscription or class, to optimize energy transfer and is also capable of time-switched-based beamformed reception. The WTRU, in step 3010, evaluates a condition on the determined average energy transfer $E_T$ and current battery state/level $B_L$, e.g. $E_T > T_e$ and/or ($E_T < T_e$ and battery level $B_L < B_{th,min}$) for predetermined/configured thresholds $T_e$ and $B_{th,min}$. If the condition $E_T > T_e$ is satisfied (arrow coming from the right side of the decision 3008), the WTRU repeats steps 3004 through 4 3007. If the condition $E_T < T_e$ and battery level $B_L < B_{th,min}$ is satisfied (arrow coming from the left side of decision 3008), the WTRU in step 3009 transmits a control message over PUCCH requesting dedicated EH signaling configuration over the serving transmit beam where the control message may include additional information/measurements such as current received signal strength for the transmit/receive beam pair, current battery state/level, a considered power splitting ratio, and/or current experienced average energy harvested, and returns to step 3004. Otherwise (3008—Otherwise), the WTRU in step 3010 evaluates a condition on current and neighboring transmit beams' EH signaling configuration at current received signal strength and battery state/level, e.g. $\max\{\text{EH PI}(\text{beam}_i)\} < \text{EH PI}(\text{beam}_c) - f(\text{RSSI}_c) \forall i \neq c$ and $B_{th,min} < B_L < B_{th,max}$ for predetermined/configured thresholds $B_{th,min}$ and $B_{th,max}$ where EH PI($\cdot$) is an expected EH performance indication based only on EH signaling configuration and $f(\cdot)$ is a monotonically decreasing or increasing function of current beam's received signal strength $RSSI_c$. The WTRU then follows the same steps as in the fourth technical realization.

Figure 31:
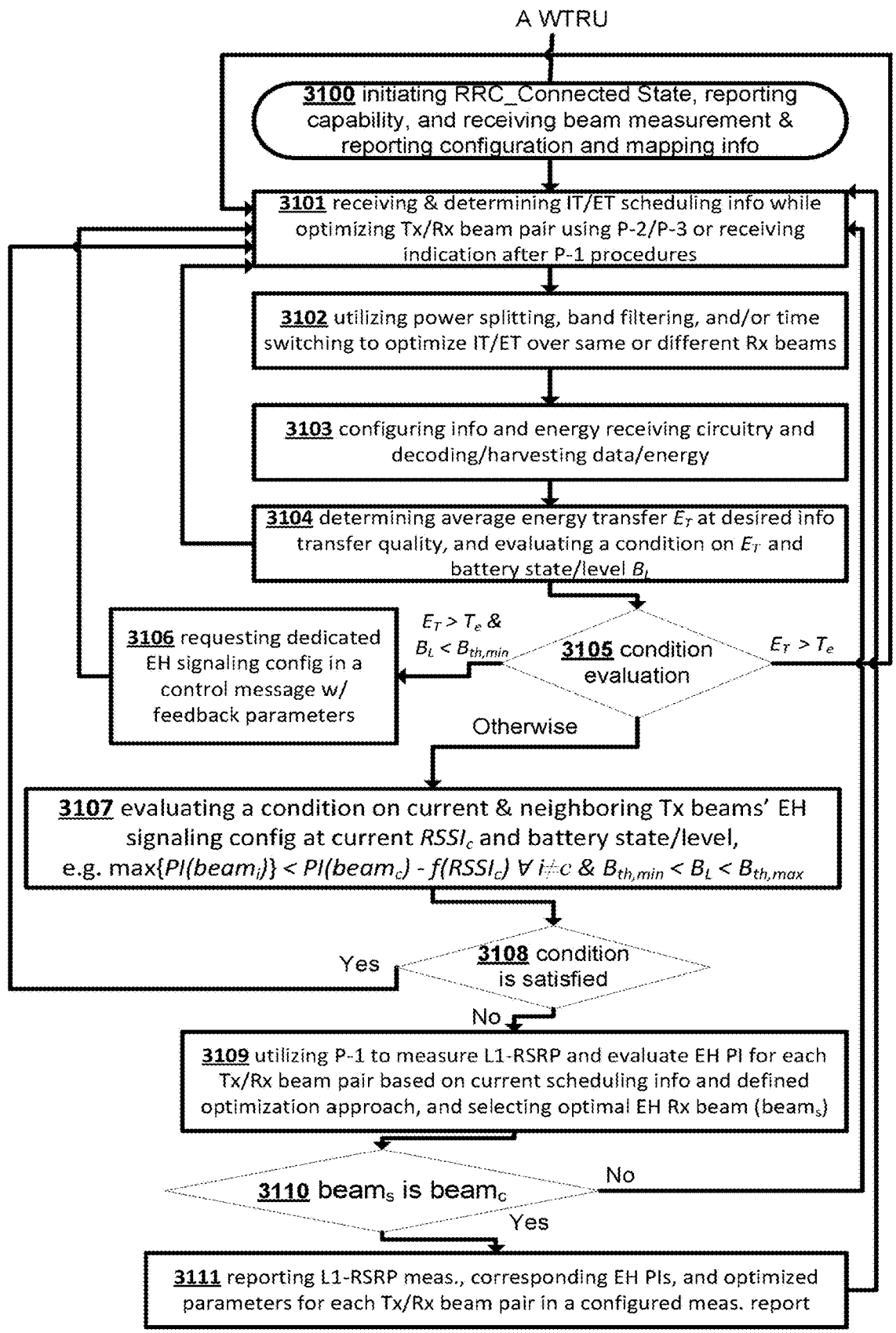
FIG. 31 is a simplified flow chart describing a WTRU's decision sequence for optimized beamformed EH when the WTRU is capable of time-switched-based beamformed reception as well as dedicated EH signaling configuration request.

In an exemplary embodiment describing the fourth technical realization above and depicted in the simplified flow chart in FIG. 31, a WTRU:
- initiating (3100) RRC Connected state, reporting capability, and receiving beam measurement & reporting configuration and mappings to default EH signaling configuration information;
- receiving/determining (3101) information/energy (default and/or dedicated) transfer scheduling information while optimizing/maintaining Transmit/Receive beam pair(s) using P-2/P-3 beam sweeping procedures or receiving beam indication after P-1 beam sweeping procedure;
- utilizing (3102), based on information/energy scheduled resources configuration, one or combination of the following approaches to optimize information/energy transfer:
  a. Power splitting, Frequency domain filtering, or time switching between information and energy transfer using same or different receive beam(s)
- configuring (3103) receiving circuitry and decoding/harvesting data/energy;
- determining (3104) experienced energy transfer $E_T$ for a configured information transfer quality and evaluating a condition on $E_T$ and current battery state/level $B_L$;
- if condition(s) fail(s) (3105—Otherwise), evaluating (3107) condition on current & neighboring transmit beams' EH signaling configuration at current received signal strength $RSSI_c$ and battery level $B_L$, e.g. $\max\{EH\ PI(beam_i)\} < EH\ PI(beam_c) - f(RSSI_c) \forall i \neq c$ and $B_{th,min} < B_L < B_{th,max}$ for defined function $f(\cdot)$ and thresholds $B_{th,min}$ and $B_{th,max}$;
- on the other hand (3105—arrow going left), if experienced energy transfer $E_T$ is determined above a specified threshold and current battery level $B_L$ is determined below another threshold, transmitting (3106) a control message over PUCCH requesting dedicated EH signaling configuration including additional information such as current received signal strength for the transmit/receive beam pair, current battery state/level, a considered power splitting ratio, and/or current experienced average energy harvested.
- if 2nd condition fails (3108—No), utilizing (3109) P-1 procedure to measure L1-RSRP, evaluate actual EH PI for each beam pair based on current information transfer scheduling information and defined optimization approach, and select an optimal EH receive beam; Otherwise (3108—Yes), continue utilizing the same beam pair(s) for information and energy transfer.
- determining (3110) that the new & current EH Transmit/Receive beam pair is the same and reporting (3111) L1-RSRP measurements, corresponding EH PIs, and optimized parameters (e.g. power splitting or time switching ratio) for each beam pair.

Figure 32:
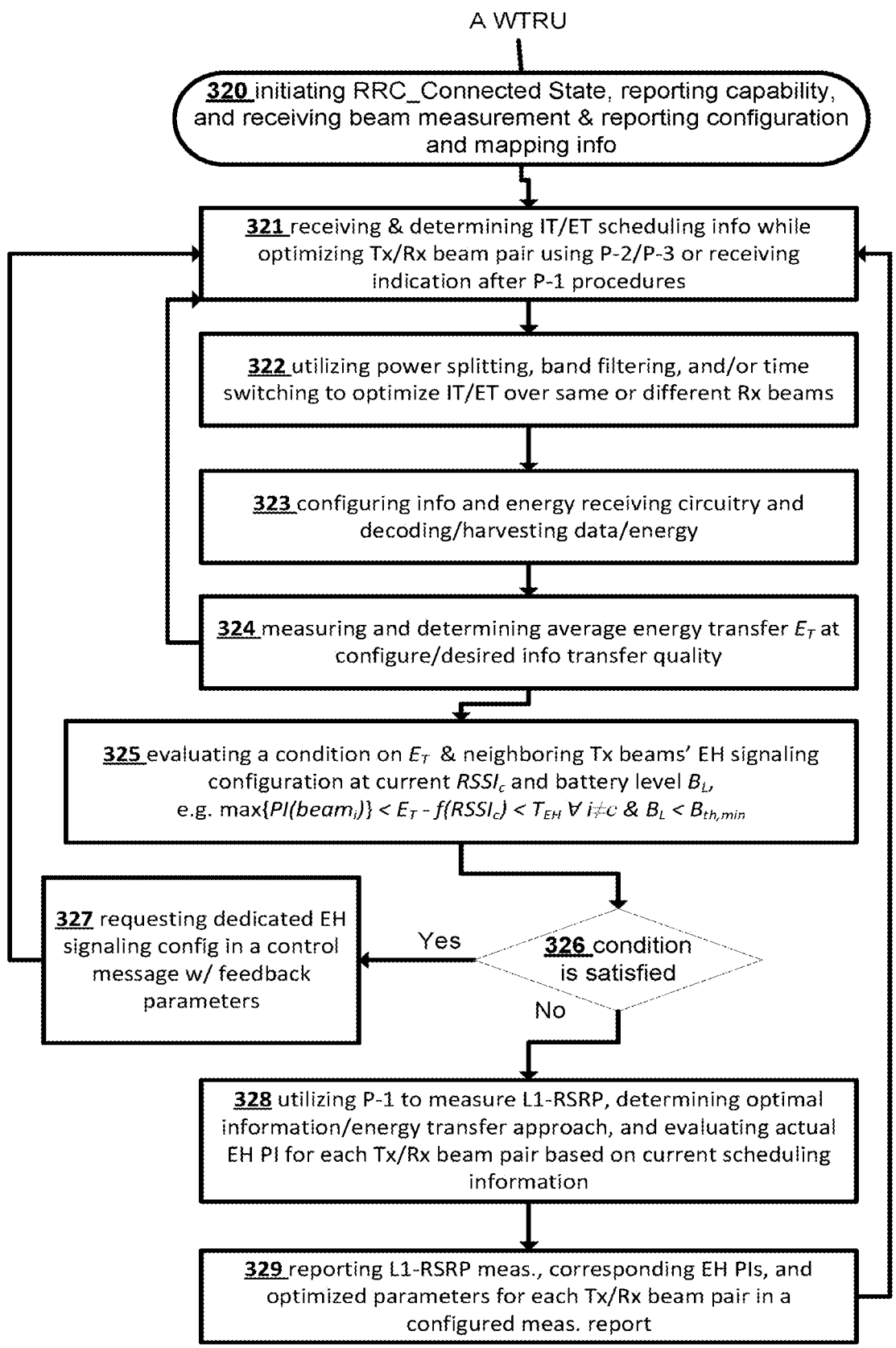
FIG. 32 is an alternative simplified flow chart describing a WTRU's decision sequence for optimized beamformed EH when the WTRU is capable of time-switched-based beamformed reception as well as dedicated EH signaling configuration request.

In another exemplary embodiment depicted as a flow chart in FIG. 32, a WTRU capable of time-switched-based beamformed reception and dedicated EH signaling configuration request:
- initiating (320) RRC Connected state, reporting capability, and receiving beam measurement & reporting configuration and mappings to default EH signaling configuration information;
- receiving/determining (321) information/energy (default and/or dedicated) transfer scheduling information while optimizing/maintaining Transmit/Receive beam pair(s) using P-2/P-3 beam sweeping procedures or receiving beam indication after P-1 beam sweeping procedure;
- utilizing (322), based on information/energy scheduled resources configuration and configured/desired quality, one or combination of the following approaches to optimize information/energy transfer:
  a. Power splitting, Frequency domain filtering, or time switching between information and energy transfer using same or different receive beam(s)
- configuring (323) receiving circuitry and decoding/harvesting data/energy;
- measuring (324) and determining experienced energy transfer $E_T$ for a configured/desired information transfer quality. The arrow from step 324 to step 321 represents a loop that indicates a duration over which the measurement and experienced energy transfer determination may occur;
- evaluating (325) a condition on experienced energy transfer $E_T$ & neighboring transmit beams' EH signaling configuration at current received signal strength $RSSI_c$, and battery level $B_L$, e.g. $\max\{EH\ PI(beam_j)\} < E_T - f(RSSI_c) < T_{EH} \forall i \neq c$ and $B_L < B_{th,min}$ for defined function $f(\cdot)$ and thresholds $B_{th,min}$ and $T_{EH}$;
- if the condition is not satisfied (326—No), utilizing (328) P-1 procedure to measure L1-RSRP, determining the optimal information/energy transfer approach, and evaluating actual EH PI for each beam pair based on current information/energy transfer scheduling information;
- reporting (329) L1-RSRP measurements, corresponding EH PIs, and optimized approach parameters (e.g. power splitting or time switching ratio) for each beam pair in a configured measurement report;
- otherwise (326—Yes), transmitting (327) a control message requesting dedicated EH signaling configuration over the serving transmit beam including information/measurements such as current received signal strength for the transmit/receive beam pair, current battery state/level, a considered power splitting/time switching ratio, and/or current experienced average energy harvested $E_T$, and returning to step 321.

Figure 33:
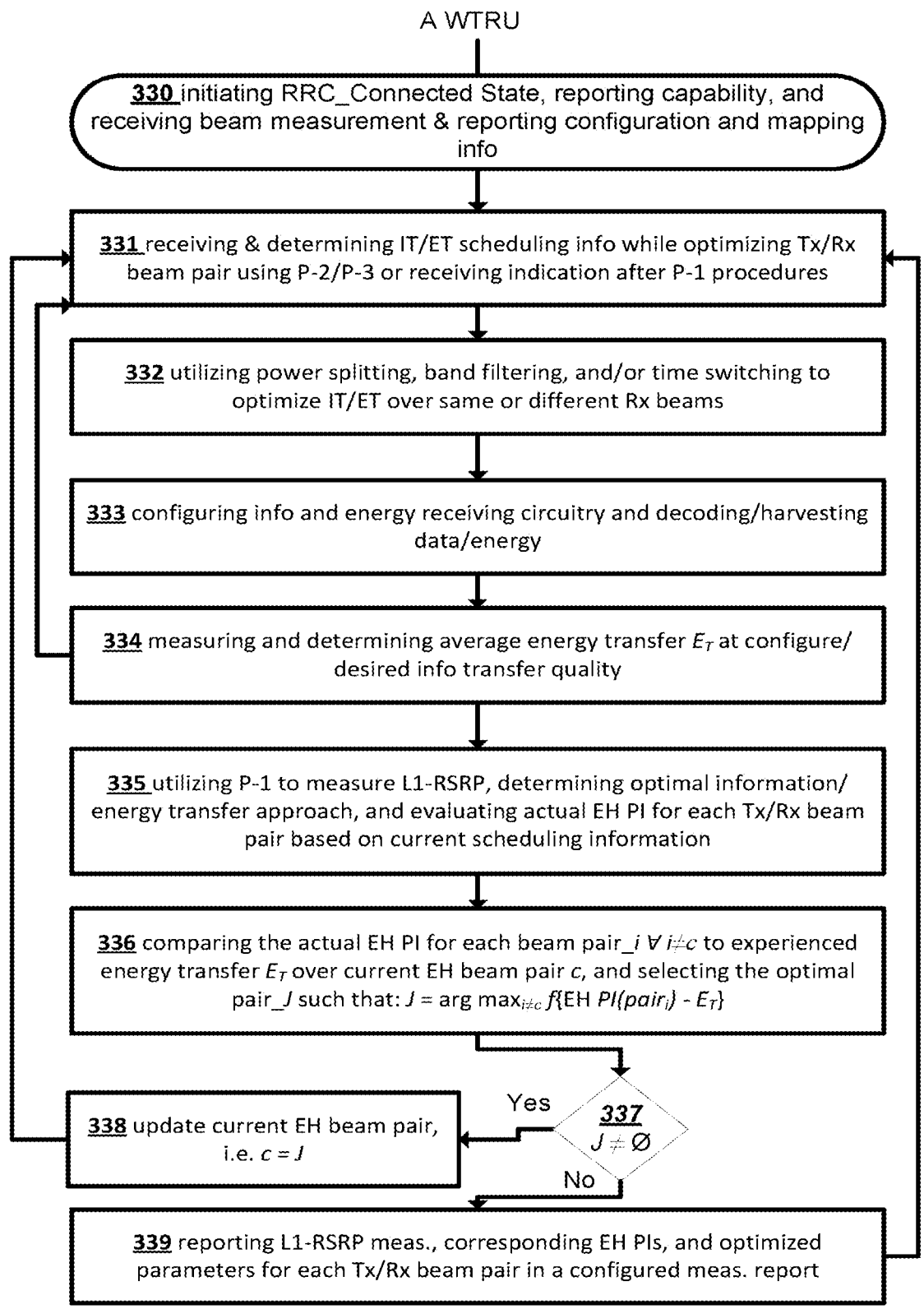
FIG. 33 is an alternative simplified flow chart describing WTRU's decision sequence for optimized beamformed EH when the WTRU is capable of time-switched-based beamformed reception but not dedicated EH signaling configuration request.

In another exemplary embodiment depicted as a flow chart in FIG. 33, a WTRU capable of time-switched-based beamformed reception but not dedicated EH signaling configuration request:
- initiating (330) RRC Connected state, reporting capability, and receiving beam measurement & reporting configuration and mappings to default EH signaling configuration information;
- receiving/determining (331) information/energy (default) transfer scheduling information while optimizing/maintaining Transmit/Receive beam pair(s) using P-2/P-3 beam sweeping procedures or receiving beam indication after P-1 beam sweeping procedure;
- utilizing (332), based on information/energy scheduled resources configuration and configured/desired quality, one or combination of the following approaches to optimize information/energy transfer:
  a. Power splitting, Frequency domain filtering, or time switching between information and energy transfer using same or different receive beam(s)
- configuring (333) receiving circuitry and decoding/harvesting data/energy;
- measuring and determining (334) experienced energy transfer $E_T$ for a configured/desired information transfer quality. Arrow from step 334 to step 331 represents a loop that indicates a duration over which the measurement and experienced energy transfer determination may occur;

utilizing (335) P-1 procedure to measure L1-RSRP, determining the optimal information/energy transfer approach, and evaluating actual EH PI for each beam pair based on current information/energy transfer scheduling information;

comparing (336) the actual EH PI for each beam pair $i \forall i \neq c$ to experienced energy transfer $E_T$ over current EH beam pair c, and selecting the optimal EH beam pair J such that e.g. J=arg $\max_{i \neq c} f\{$EH PI$(pair_i) - E_T\}$ where $f\{x\}$ is monotonically increasing function in x for x>0 and not defined for x≤0;

on condition that the selected optimal EH beam pair j is determined the same as the current one (337—No), i.e. J=ϕ, (i.e., J equal to phi) reporting (339) L1-RSRP measurements, corresponding EH PIs, and optimized approach parameters (e.g. power splitting or time switching ratio) for each beam pair in a configured measurement report;

otherwise (337—Yes), updating (338) the current EH beam pair to be the optimal pair, i.e. c=J, and continuing (331) information/energy transfer according to the newly optimized parameters.

Figure 34:
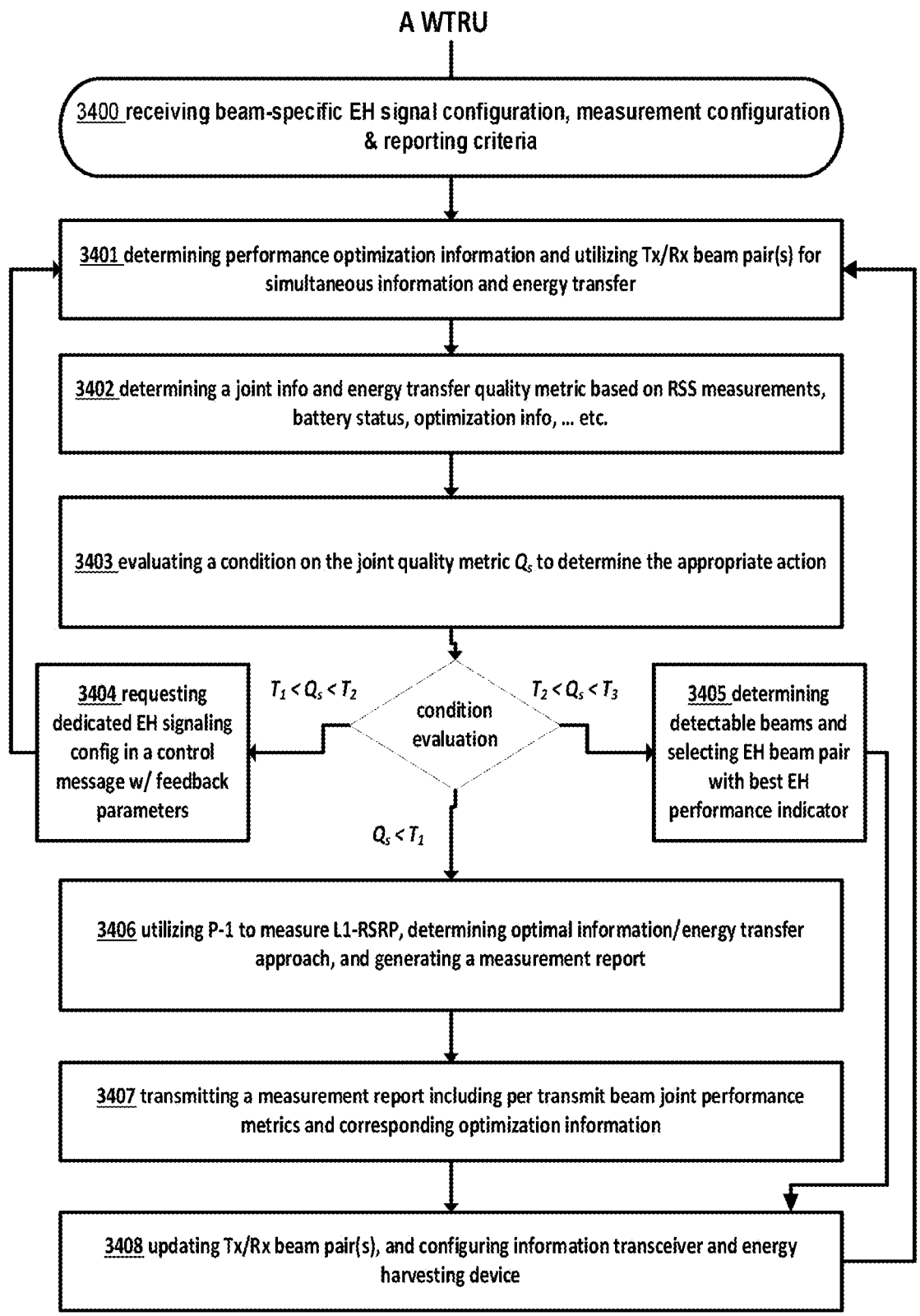
FIG. 34 is a simplified flow chart describing a WTRU's decision sequence for optimized beamformed EH when the WTRU is capable of time-switched-based beamformed reception as well as dedicated EH signaling configuration request utilizing the joint performance metric.

In another exemplary embodiment depicted as a flow chart in FIG. 34, a WTRU capable of time-switched-based beamformed reception and dedicated EH signaling configuration request:

receiving (3400) beam-specific EH signal configuration, measurement configuration & reporting criteria;

determining (3401) performance optimization information and utilizing transmit/receive beam pair(s) for simultaneous information and energy transfer;

determining (3402) a joint information and energy transfer quality metric based on received signal strength measurements, current battery status, desired/specified information and EH performance quality, EH performance indicator metric, and performance optimization information evaluating (3403) a condition on the joint information and energy transfer quality metric $Q_s$ to determine the appropriate action on the condition that the joint quality metric falls below a first threshold $Q_s < T_1$, utilizing (3406) P-1 procedure to measure L1-RSRP, determining the optimal information/energy transfer approach, and generating a measurement report;

+(3407) transmitting a measurement report including per transmit beam joint performance metrics and corresponding optimization information;

on the condition that the joint quality metric falls between a first and second thresholds $T_1 < Q_s < T_2$, transmitting (3404) a control message requesting dedicated EH signaling configuration over the serving transmit beam including information/measurements such as current received signal strength for the transmit/receive beam pair, current battery state/level, a considered power splitting/time switching ratio, and/or current experienced average energy harvested $E_T$, and configuring information and energy transfer circuitry;

otherwise, determining (3405) detectable beams and selecting EH beam pair with best EH performance indicator as described earlier.

updating (3408) transmit/receive beam pair(s) for information and energy transfer, and configuring information transceiver and energy harvesting device.

Reference Signals, Measurement Metrics, and Reporting Aspects

The rest of this section expands on the measurement and reporting steps described/mentioned in any of the embodiments in Section "EH-Aware RRC Connected State Beam Management".

According to an embodiment, a WTRU utilizes legacy reference signal for L1-RSRP measurements and default EH signaling configuration for EH PI metric evaluation. The EH PI can be any of the metrics defined in Sections "(Sub-)beam (re-)selection" and "Procedures supporting beamformed EH signal transmissions". The determined EH PI value can be dependent on scheduled resources for information transfer, how they relate to resources scheduled for EH signaling, and optimization approach considered by the WTRU. For example, the WTRU might determine that for a specific transmit/receive beam pair, current scheduled resources for information transfer (IT) overlaps with default EH signaling resources for that beam in both time and frequency. Therefore, the WTRU determines that power splitting with a specific ratio between the information and energy receivers is optimal for energy transfer (ET) at a specific IT quality, e.g. BLER. The WTRU then utilizes a configured measurement report to feedback L1-RSRP measurements for each beam pair or a subset of beam pairs depending on report configuration, corresponding EH PI metrics, and the considered parameters for ET/IT optimization.

According to an alternative embodiment, a WTRU receives WTRU/UE-specific reference signals that can be utilized for joint RSRP and EH PI measurement/evaluation. The reference signal may be beam specific and have a specific waveform that is dependent on the default EH signaling configuration and that can result in an exact EH PI evaluation and a representative RSRP measurement, a representative EH PI evaluation and exact RSRP measurement, a representative RSRP and EH PI measurement/evaluation, or an exact RSRP and EH PI measurement/evaluation. The reference signal can also be used by the WTRU for dedicated EH while performing measurements/metric evaluation. The WTRU then utilizes the configured reference signal(s) for individually measuring L1-RSRP and evaluating/determining EH PI metric or evaluating a new joint service quality metric $Q_s$ that can convey information about both information transfer quality (as represented by L1-RSRP measurement) and energy transfer quality (as represented by EH PI metric). For example, the joint metric might be used, based on the reference signal characteristics/waveform and optimization approach considered by the WTRU, to indicate:

suitability for both information transfer and energy transfer if $Q_s > T_{Q,2}$;

suitability for energy transfer but not information transfer if $T_{Q,2} > Q_s > T_{Q,1}$;

suitability for information transfer but not energy transfer if $T_{Q,1} > Q_s > T_{Q,0}$;

unsuitability for either information transfer or energy transfer if $Q_s < T_{Q,0}$.

The WTRU may then decide to report a wideband/subband joint metric only or the joint metric in conjunction with the optimization approach parameters, e.g. depending on measurement report configuration and WTRU's capability.

According to an alternative embodiment, a WTRU receives on-demand WTRU/UE-specific reference signals that can be utilized for individual or joint RSRP and EH PI measurement/evaluation. The WTRU detects, in a second step, a condition that requires measurements for optimizing information and/or energy transfer experience. The WTRU then, in a third step, requests initiation/enablement of on-demand reference signal transmission and receives network confirmation. In a fourth step, the WTRU utilizes the configured reference signal(s) for individually measuring L1-RSRP and evaluating/determining EH PI metric or evaluating a joint service quality metric $Q_s$. The WTRU might also consider the enabled reference signal(s) for energy harvesting. The WTRU may then decide to report a wideband/sub-band joint metric only or the joint metric in conjunction with the optimization approach parameters, e.g. depending on measurement report configuration and WTRU's capability.

According to another embodiment, the WTRU may be configured to report the last N wideband and/or sub-band beam pair measurements, or a function/filtered value thereof, either periodically or aperiodically. The aperiodic measurement reporting can be triggered either by the network or by an event detected by the WTRU. The triggering event can be based on one or combination of the following criteria:

Joint condition on serving information and energy transfer beam pairs, e.g.:
  a. $(M_{IT}<T_{report,min}^{IT}$ and $M_{ET}<T_{report,min}^{ET})$ or $(M_{IT}>T_{report,max}^{IT}$ and $M_{ET}>T_{report,max}^{ET})$
  b. $\min(M_{IT}, M_{ET})<T_{report,min}$ or $\max(M_{IT}, M_{ET})>T_{report,max}$
  c. $f_{min}(M_{IT}, M_{ET})<T_{report,min}$ or $f_{max}(M_{IT}, M_{ET})>T_{report,max}$
  d. $Q_s<T_{report,min}$ or $Q_s>T_{report,max}$ Independent conditions on serving information and energy transfer beam pairs, e.g.:
  a. $(M_{IT}<T_{report,min}^{IT}$ or $M_{ET}<T_{report,min}^{ET})$
  b. $(M_{IT}>T_{report,max}^{IT}$ or $M_{ET}>T_{report,max}^{ET})$ where $T_{report,min}^{IT}$, $T_{report,max}^{IT}$, $T_{report,min}^{ET}$, and $T_{report,max}^{ET}$ are pre-configured or signaled measurement reporting thresholds; $f_{min}(x, y)$ and $f_{max}(x, y)$ are joint functions of the input variables x and y, e.g. $f_{min}(x, y)=\alpha x+\beta y$ for some scalar values $\alpha$ and $\beta$; and $M_{IT}$ and $M_{ET}$ are measurement quantities associated with information transfer and energy transfer, respectively. The measurement quantities $M_{IT}$ or $M_{ET}$ can be obtained by filtering or applying a function to the last $N_0=N$ or $N_0\neq N$ measurements/determined values of any of the following: L1-RSRP measurements, determined EH PI values, or determined values of newly defined metrics that take into account both the received signal strength and energy harvesting performance.

According to another embodiment, the content of the measurement report might be configured to be inclusive or conditional on measurement values and/or triggering events. For example, the WTRU may be configured to report, among other options/conditions/criteria, any of the following The last N measurements/values/parameters, or function thereof, of per beam pair wideband and/or sub-band L1-RSRP measurements, corresponding EH PI values, and optimized approach parameters, e.g. when the triggering event is a joint condition on $M_{IT}$ and $M_{ET}$ with $f_{min}(M_{IT}, M_{ET})<T_{report,min}$ The last N measurements/values/parameters, or function thereof, of the M beam pairs with largest wideband and/or sub-band L1-RSRP measurements, e.g. when the triggering event is a joint condition on $M_{IT}$ & $M_{ET}$ with $f_{max}(M_{IT}, M_{ET})>T_{report,max}$.

The last N measurements/values/parameters, or function thereof, of the M beam pairs with largest wideband and/or sub-band L1-RSRP measurements, e.g. when the triggering event is a joint condition on $M_{IT}$ & $M_{ET}$ with $f_{max}(M_{IT}, M_{ET})>T_{report,max}$ and $M_{IT}<T_{IT,ref}$.

The last N measurements/values/parameters, or function thereof, of the M beam pairs with largest EH PI values, e.g. when the triggering event is a joint condition on $M_{IT}$ & $M_{ET}$ with $f_{max}(M_{IT}>M_{ET})>T_{report,max}$ and $M_{ET}<T_{ET,ref}$.

The last N measurements/values/parameters, or function thereof, of the $M_1$ beam pairs with largest wideband and/or sub-band L1-RSRP measurements and the $M_2$ beam pairs with largest EH PI values, e.g. when the triggering event is a joint condition on $M_{IT}$ & $M_{ET}$ with $f_{min}(M_{IT}, M_{ET})<T_{report,min}$.

The last N measurements/values/parameters, or function thereof, of the M beam pairs with largest wideband and/or sub-band L1-RSRP measurements, e.g. when the triggering event is a joint condition on $M_{IT}$ & $M_{ET}$ with $f_{min}(M_{IT}, M_{ET})<T_{report,min}$ and $M_{ET}>T_{IT,ref}$.

The last N measurements/values/parameters, or function thereof, of the M beam pairs with largest EH PI values, e.g. when the triggering event is a joint condition on $M_{IT}$ & $M_{ET}$ with $f_{min}(M_{IT}, M_{ET})<T_{report,min}$ and $M_{IT}>T_{IT,ref}$.

The last N measurements/values/parameters, or function thereof, of per beam pair joint metric measurements $Q_s$, and optimized approach parameters, e.g. when the triggering event is a joint condition on $M_{IT}$ and $M_{ET}$ with $f_{min}(M_{IT}, M_{ET})<T_{report,min}$.

The last N measurements/values/parameters, or function thereof, of the M beam pairs with largest joint metric measurements $Q_s$, e.g. when the triggering event is a joint condition on $M_{IT}$ & $M_{ET}$ with $f_{max}(M_{IT}, M_{ET})>T_{report,max}$.

Note that $f_{min}$ and $f_{max}$ can be replaced by any joint measurement quantity on information and energy transfer quality of the serving beam, e.g. $Q_s$; also the joint condition triggering events can simply be replace by representative independent conditions on serving beam measurements.

The contents of the following reference is incorporated by reference herein: A. Collado, and A. Georghiades, "Optimal Waveforms for Efficient Wireless Power Transmission", IEEE Microwave and Wireless Components Letters, Vol. 24, No. 5, May 2014.

While not explicitly described, the present embodiments may be employed in any combination or sub-combination. For example, the present principles are not limited to the described variants, and any arrangement of variants and embodiments may be used. Moreover, the present principles are not limited to the described channel access methods and any other type of channel access methods with different priority levels is compatible with the present principles.

Besides, any characteristic, variant or embodiment described for a method is compatible with an apparatus device comprising means for processing the disclosed method, with a device comprising a processor configured to process the disclosed method, with a computer program product comprising program code instructions and with a non-transitory computer-readable storage medium storing program instructions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, WTRU, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed".

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (e.g., but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "WTRU" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any WTRU recited herein, are provided below with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc.

As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (WTRU), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed"

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed:
1. A method for use in a wireless transmit/receive unit, WTRU, the method comprising:
   receiving, from a network, first configuration information indicating, for at least one transmit beam, energy harvesting signal configuration;

receiving, from the network, second configuration information comprising indications for measuring information and energy transfer quality metrics for the at least one transmit beam, and comprising criteria for reporting, to the network, the measured information and energy transfer quality metrics;

determining the information and energy transfer quality metrics for the at least one transmit beam based on the received first and second configuration information; and on a condition that the determined information and energy transfer quality metrics for the at least one transmit beam satisfy the criteria for reporting, transmitting a report to the network, comprising, for the at least one transmit beam, the determined information and energy transfer quality metrics.

2. The method of claim 1, wherein the determined information and energy transfer quality metrics for the at least one transmit beam satisfy the criteria for reporting when the determined information and energy transfer quality metrics for all of the at least one transmit beam are below a first threshold.

3. The method of claim 1, further comprising:
receiving specific reference signals for measuring reference signal received power and energy harvesting performance indicator, for determining the information and energy transfer quality metrics.

4. The method of claim 2, further comprising, on condition that the determined information and energy transfer quality metrics are, for at least one of the at least one transmit beam, between the first and a second threshold higher than the first threshold:
transmitting a control message to the network requesting dedicated energy harvesting signaling configuration.

5. The method of claim 4, wherein the control message comprises at least one of:
a received signal strength for the at least one of the at least one transmit beam for which the determined information and energy transfer quality metrics fall between the first and the second threshold;
a current battery state of the WTRU;
a considered power splitting/time switching ratio; and
a current experienced energy harvested.

6. The method of claim 2, further comprising, on condition that the determined information and energy transfer quality metrics are, for at least one of the at least one transmit beam, between a second threshold higher than the first threshold and a third threshold higher than the second threshold:
selecting, from the at least one of the at least one transmit beam for which the determined information and energy transfer quality metrics are between the second threshold and the third threshold, a transmit beam with best expected energy harvesting performance indicator, and configuring the WTRU for information and energy transfer using the selected transmit beam.

7. The method of claim 2, wherein the information and energy transfer quality metrics comprise at least one of: received signal strength measurements of signals received by the WTRU, current battery status of the WTRU, desired and/or specified information and energy harvesting performance of the WTRU, energy harvesting performance of the WTRU, performance optimization information for the WTRU.

8. A wireless receive/transmit unit device, WTRU, comprising at least one processor, configured to:

receive, from a network, first configuration information indicating, for at least one transmit beam, an energy harvesting signal configuration;

receive, from the network, second configuration information comprising indications for measuring information and energy transfer quality metrics for the at least one transmit beam, and comprising criteria for reporting, to the network, the measured information and energy transfer quality metrics;

determine the information and energy transfer quality metrics for the at least one transmit beam based on the received first and second configuration information; and on a condition that the determined information and energy transfer quality metrics for the at least one transmit beam satisfy the criteria for reporting, transmit a report to the network, comprising, for the at least one transmit beam, the determined information and energy transfer quality metrics.

9. The WTRU of claim 8, wherein the at least one processor is configured to determine that the information and energy transfer quality metrics for the at least one transmit beam satisfy the criteria for reporting when the determined information and energy transfer quality metrics for all of the at least one transmit beam are below a first threshold.

10. The WTRU of claim 8, wherein the at least one processor is configured to receive specific reference signals for measuring reference signal received power and energy harvesting performance indicator, for determining the information and energy transfer quality metrics.

11. The WTRU of claim 9, wherein the at least one processor is configured to, on condition that the determined information and energy transfer quality metrics are, for at least one of the at least one transmit beam, between the first and a second threshold higher than the first threshold:
transmit a control message to the network requesting dedicated energy harvesting signaling configuration.

12. The WTRU of claim 11, wherein the control message comprises at least one of:
a received signal strength for the at least one of the at least one transmit beam for which the determined information and energy transfer quality metrics fall between the first and the second threshold;
a current battery state of the WTRU;
a considered power splitting/time switching ratio; and
a current experienced energy harvested.

13. The WTRU of claim 9, wherein the at least one processor is configured to, on condition that the determined information and energy transfer quality metrics are, for at least one of the at least one transmit beam, between a second threshold higher than the first threshold and a third threshold higher than the second threshold:
select, from the at least one of the at least one transmit beam for which the determined information and energy transfer quality metrics are between the second threshold and the third threshold, a transmit beam with best expected energy harvesting performance indicator, and configure the WTRU for information and energy transfer using the selected transmit beam.

14. The WTRU of claim 9, wherein the information and energy transfer quality metrics comprise at least one of: received signal strength measurements of signals received at the WTRU, current WTRU battery status, desired and/or specified information and energy harvesting performance of the WTRU, energy harvesting performance of the WTRU, performance optimization information for the WTRU.

* * * * *